United States Patent
Dietle et al.

(10) Patent No.: US 9,086,151 B2
(45) Date of Patent: *Jul. 21, 2015

(54) LOW TORQUE HYDRODYNAMIC LIP GEOMETRY FOR ROTARY SEALS

(75) Inventors: Lannie L. Dietle, Houston, TX (US); John E. Schroeder, Richmond, TX (US)

(73) Assignee: Kalsi Engineering Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/242,107

(22) Filed: Sep. 23, 2011

(65) Prior Publication Data
US 2012/0013078 A1    Jan. 19, 2012

Related U.S. Application Data

(63) Continuation of application No. 12/480,530, filed on Jun. 8, 2009, now Pat. No. 8,056,904, which is a continuation of application No. 11/386,209, filed on Mar. 22, 2006, now Pat. No. 7,562,878.

(60) Provisional application No. 60/664,662, filed on Mar. 22, 2005, provisional application No. 60/755,975, filed on Jan. 4, 2006.

(51) Int. Cl.
F16J 15/32    (2006.01)

(52) U.S. Cl.
CPC ............ *F16J 15/324* (2013.01); *F16J 15/3208* (2013.01); *F16J 15/3236* (2013.01); *F16J 15/3244* (2013.01)

(58) Field of Classification Search
CPC .................................................. F16J 15/3244
USPC ......................................................... 277/559
See application file for complete search history.

(56) References Cited

U.S. PATENT DOCUMENTS

| | | | |
|---|---|---|---|
| 2,188,857 | A | 1/1940 | Chievitz |
| 3,497,225 | A | 2/1970 | Workman |
| 3,730,284 | A | 5/1973 | Striegler |
| 3,744,805 | A | 7/1973 | Heinrich |
| 3,838,862 | A | 10/1974 | Fern |
| 3,868,105 | A | 2/1975 | Bentley |
| 3,901,517 | A | 8/1975 | Heathcott |

(Continued)

FOREIGN PATENT DOCUMENTS

GB    499480    1/1939

*Primary Examiner* — Vishal Patel
(74) *Attorney, Agent, or Firm* — Douglas W. Rommelmann; Andrews Kurth LLP

(57) ABSTRACT

A hydrodynamically lubricating geometry for the generally circular dynamic sealing lip of rotary seals that are employed to partition a lubricant from an environment. The dynamic sealing lip is provided for establishing compressed sealing engagement with a relatively rotatable surface, and for wedging a film of lubricating fluid into the interface between the dynamic sealing lip and the relatively rotatable surface in response to relative rotation that may occur in the clockwise or the counter-clockwise direction. A wave form incorporating an elongated dimple provides the gradual convergence, efficient impingement angle, and gradual interfacial contact pressure rise that are conducive to efficient hydrodynamic wedging. Skewed elevated contact pressure zones produced by compression edge effects provide for controlled lubricant movement within the dynamic sealing interface between the seal and the relatively rotatable surface, producing enhanced lubrication and low running torque.

32 Claims, 24 Drawing Sheets

(56) References Cited

U.S. PATENT DOCUMENTS

| | | |
|---|---|---|
| 3,921,987 A | 11/1975 | Johnston et al. |
| 3,927,600 A | 12/1975 | Peisker |
| 3,929,340 A | 12/1975 | Peisker |
| 3,973,781 A | 8/1976 | Grorich |
| 3,984,113 A | 10/1976 | Bentley |
| 4,067,407 A | 1/1978 | Berg |
| 4,094,519 A | 6/1978 | Heyn et al. |
| 4,118,856 A | 10/1978 | Bainard et al. |
| 4,183,543 A | 1/1980 | Antonini |
| 4,193,606 A | 3/1980 | Iverson |
| 4,231,579 A | 11/1980 | Scannell |
| 4,281,724 A | 8/1981 | Garrett |
| 4,283,064 A | 8/1981 | Staab et al. |
| 4,288,083 A | 9/1981 | Braconier |
| 4,336,945 A | 6/1982 | Christiansen et al. |
| 4,372,400 A | 2/1983 | Beimgraben |
| 4,383,691 A | 5/1983 | Potter |
| 4,387,902 A | 6/1983 | Conover |
| 4,399,998 A | 8/1983 | Otto |
| 4,440,405 A | 4/1984 | Schaus et al. |
| 4,441,722 A | 4/1984 | Pichler |
| 4,451,050 A | 5/1984 | Repella |
| 4,476,944 A | 10/1984 | Beimgraben |
| 4,484,753 A | 11/1984 | Kalsi |
| 4,531,747 A | 7/1985 | Miura |
| 4,542,573 A | 9/1985 | Bainard |
| 4,610,319 A | 9/1986 | Kalsi |
| 4,619,534 A | 10/1986 | Daly et al. |
| 4,671,519 A | 6/1987 | Bras et al. |
| 4,705,277 A | 11/1987 | Repella |
| 4,729,569 A | 3/1988 | Muller et al. |
| 4,739,998 A | 4/1988 | Steusloff et al. |
| 4,750,747 A | 6/1988 | Holzer |
| 4,770,548 A | 9/1988 | Otto |
| 4,783,086 A | 11/1988 | Bras |
| 4,789,166 A | 12/1988 | Rericha et al. |
| 5,002,289 A | 3/1991 | Yasui et al. |
| 5,139,275 A | 8/1992 | Ehrmann et al. |
| 5,143,385 A | 9/1992 | Sponagel et al. |
| 5,178,215 A | 1/1993 | Yenullis et al. |
| 5,190,299 A | 3/1993 | Johnston |
| 5,195,754 A | 3/1993 | Dietle |
| 5,195,757 A | 3/1993 | Dahll, V |
| 5,224,557 A | 7/1993 | Yenulis |
| 5,230,520 A | 7/1993 | Dietle et al. |
| 5,427,387 A | 6/1995 | Johnston |
| 5,511,886 A | 4/1996 | Sink |
| 5,647,444 A | 7/1997 | Williams |
| 5,662,181 A | 9/1997 | Williams et al. |
| 5,678,829 A | 10/1997 | Kalsi et al. |
| 5,692,757 A | 12/1997 | Straub |
| 5,711,534 A | 1/1998 | Bengoa et al. |
| 5,738,358 A | 4/1998 | Kalsi et al. |
| 5,791,658 A | 8/1998 | Johnston |
| 5,823,541 A | 10/1998 | Dietle et al. |
| 5,873,576 A | 2/1999 | Dietle et al. |
| 5,915,696 A | 6/1999 | Onuma et al. |
| 5,921,555 A | 7/1999 | Johnston |
| 6,007,105 A | 12/1999 | Dietle et al. |
| 6,016,880 A | 1/2000 | Hall et al. |
| 6,036,192 A | 3/2000 | Dietle et al. |
| 6,105,968 A | 8/2000 | Yeh et al. |
| 6,109,618 A * | 8/2000 | Dietle .......... 277/559 |
| 6,120,036 A | 9/2000 | Kalsi et al. |
| 6,139,020 A | 10/2000 | Friend et al. |
| 6,189,896 B1 | 2/2001 | Dickey et al. |
| 6,227,547 B1 | 5/2001 | Dietle et al. |
| 6,315,302 B1 | 11/2001 | Conroy et al. |
| 6,334,619 B1 | 1/2002 | Dietle et al. |
| 6,354,385 B1 | 3/2002 | Ford et al. |
| 6,382,634 B1 | 5/2002 | Dietle et al. |
| 6,439,866 B1 | 8/2002 | Farkas et al. |
| 6,494,462 B2 * | 12/2002 | Dietle .......... 277/549 |
| 6,554,016 B2 | 4/2003 | Kinder |
| 6,561,520 B2 | 5/2003 | Kalsi et al. |
| 6,685,194 B2 | 2/2004 | Dietle et al. |
| 6,767,016 B2 | 7/2004 | Gobeli et al. |
| 7,052,020 B2 | 5/2006 | Gobeli et al. |
| 2001/0020770 A1 | 9/2001 | Dietle et al. |
| 2001/0024016 A1 | 9/2001 | Gobeli et al. |
| 2001/0045704 A1 | 11/2001 | Kalsi et al. |
| 2004/0104536 A1 | 6/2004 | Gobeli et al. |
| 2006/0214379 A1 | 9/2006 | James et al. |
| 2006/0214380 A1 | 9/2006 | Dietle et al. |

* cited by examiner

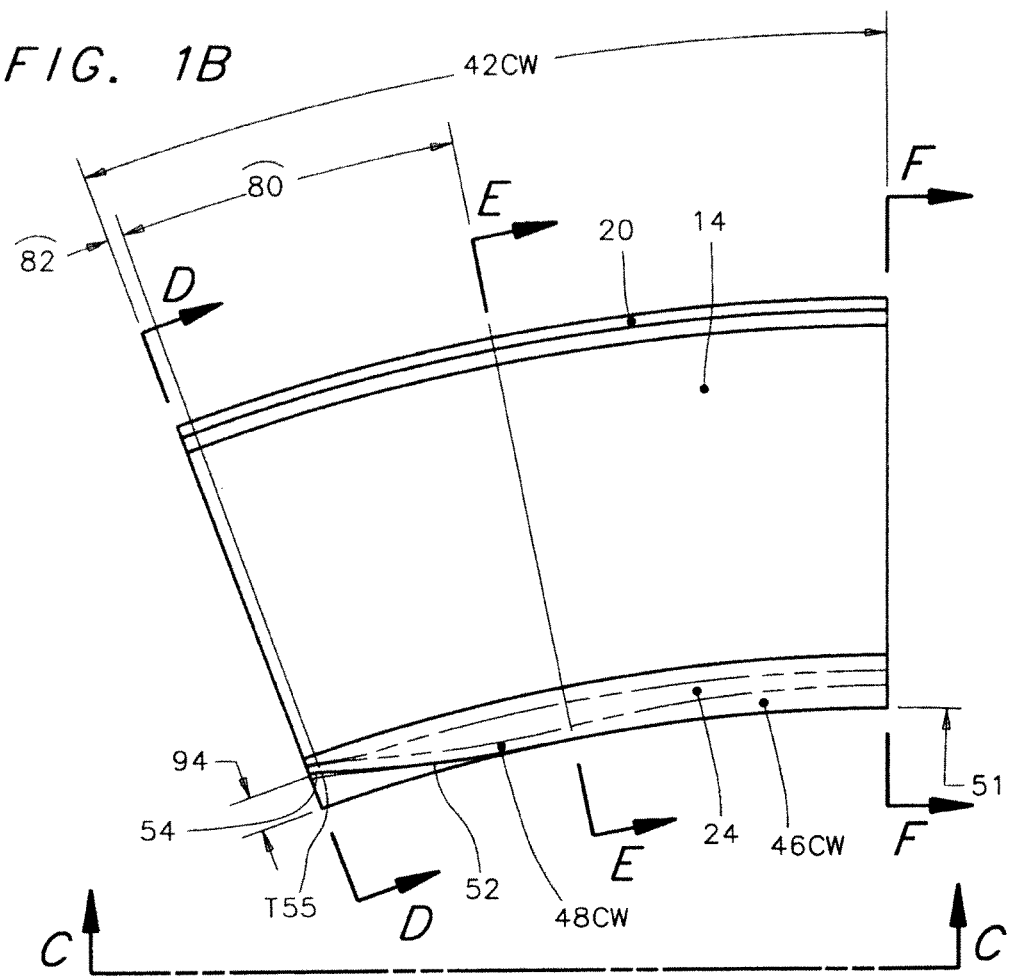
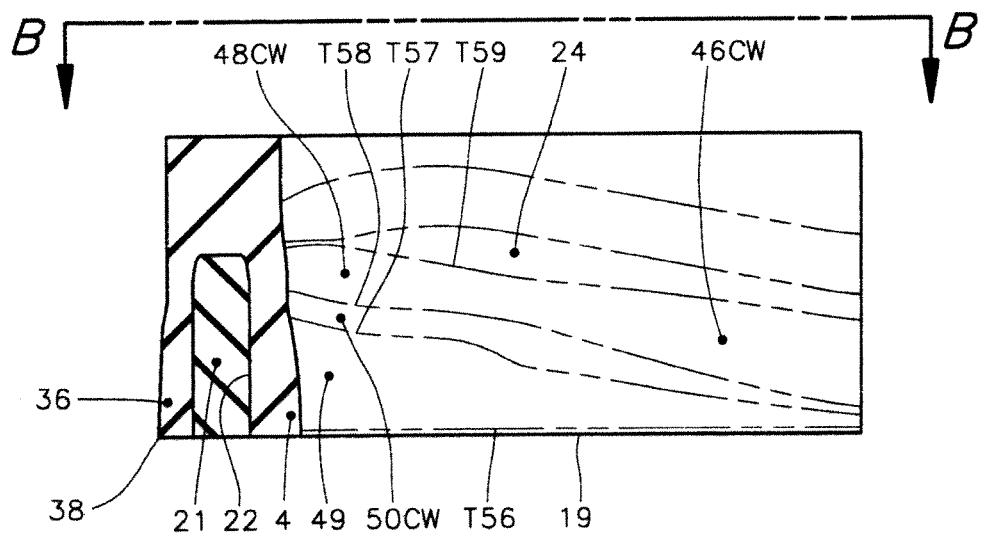

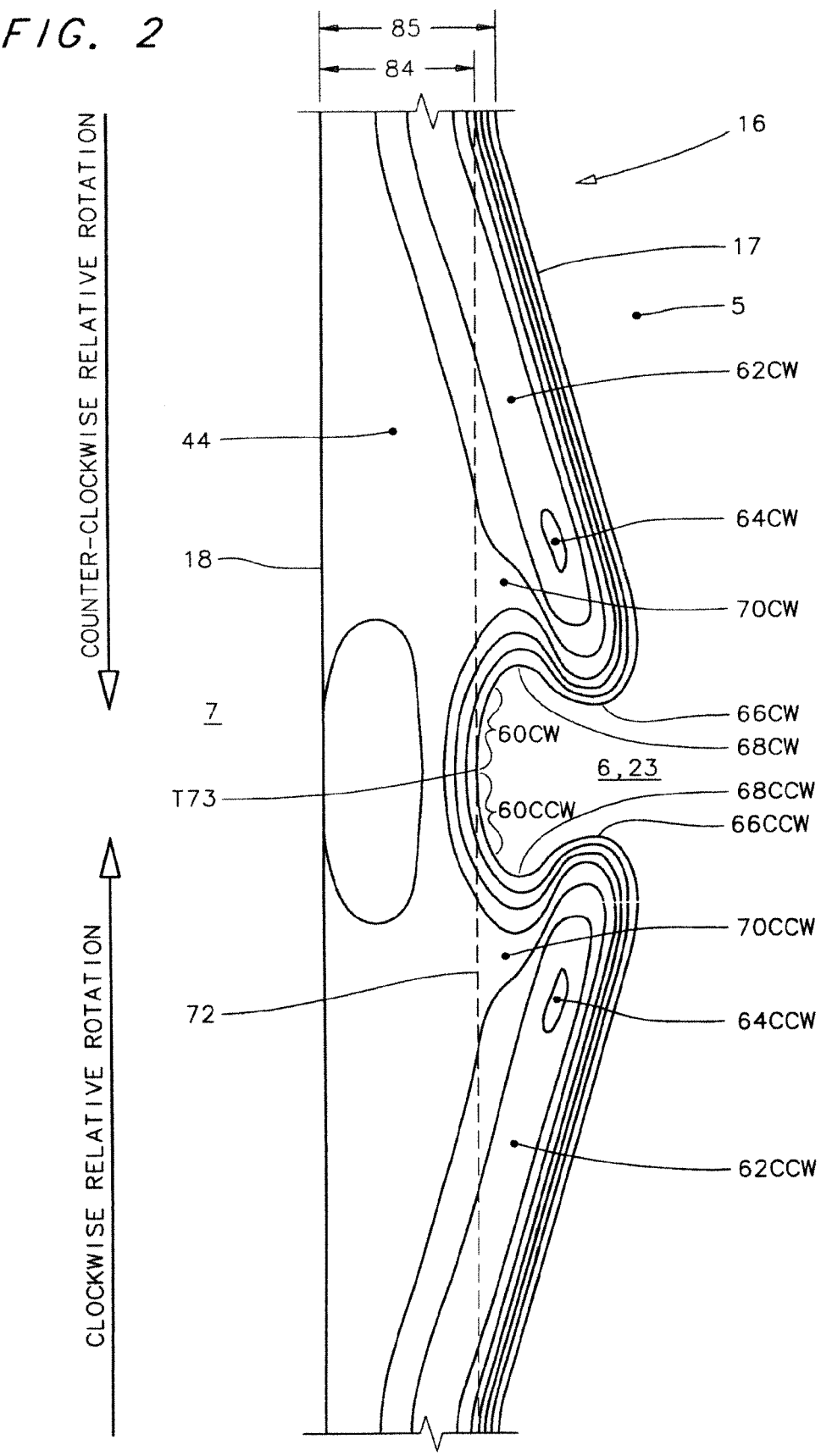

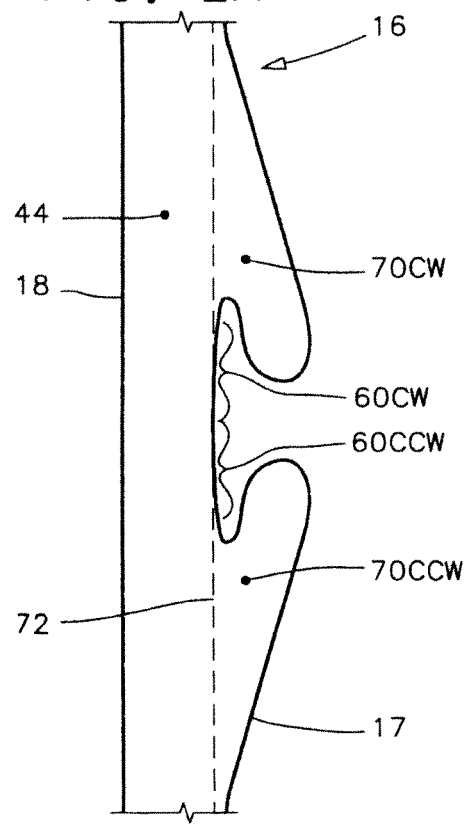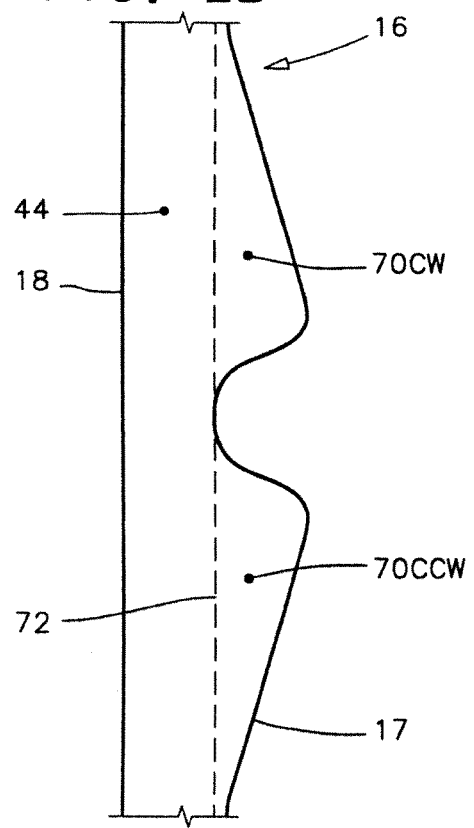

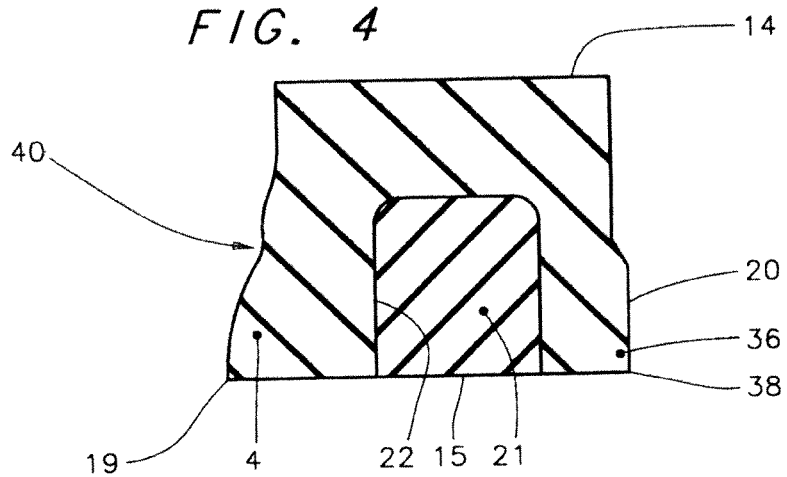
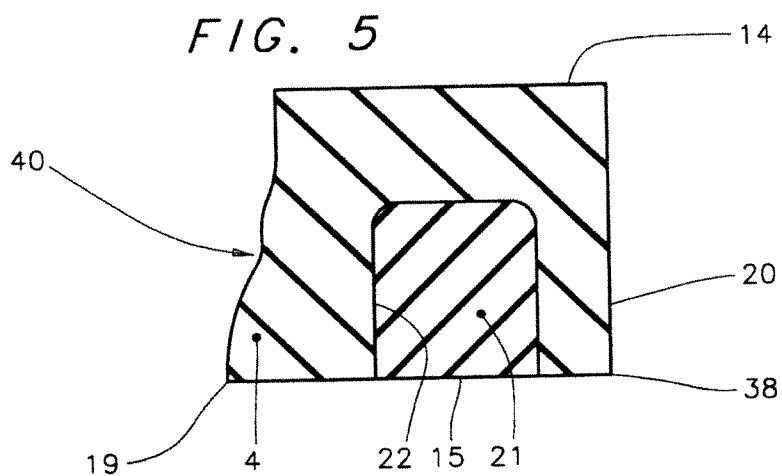
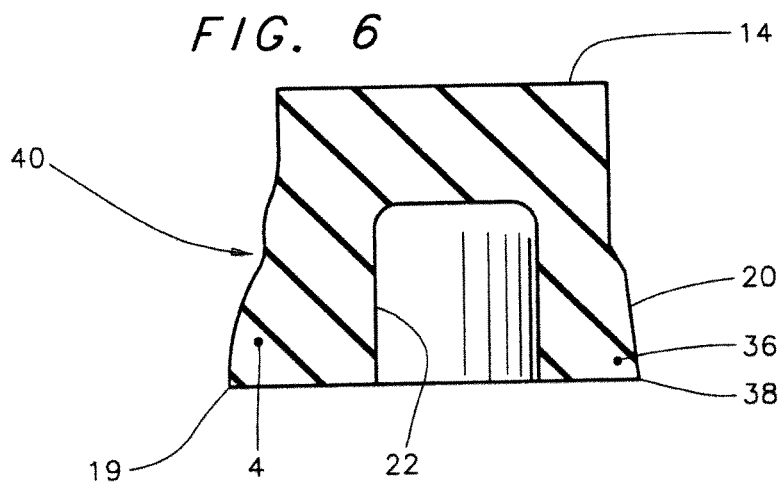

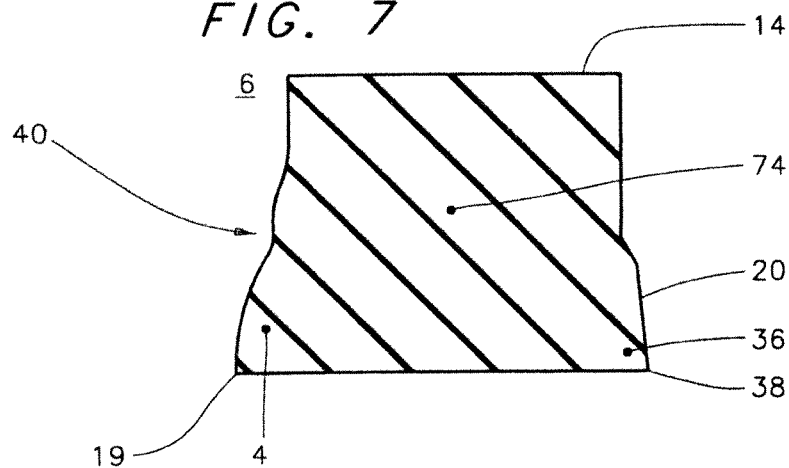
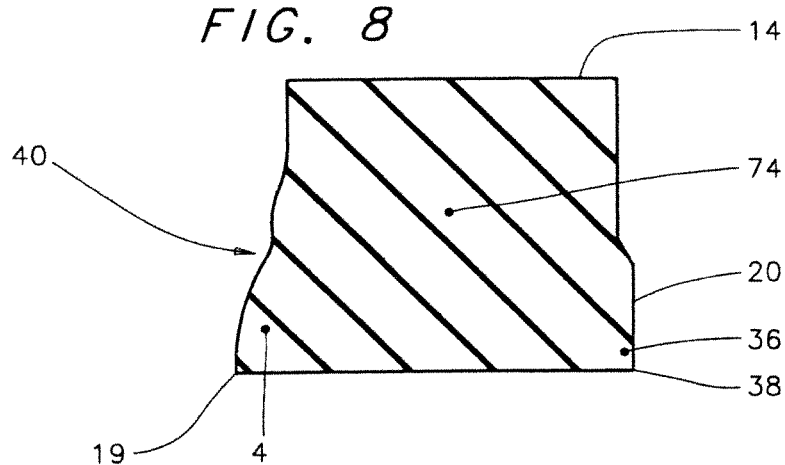
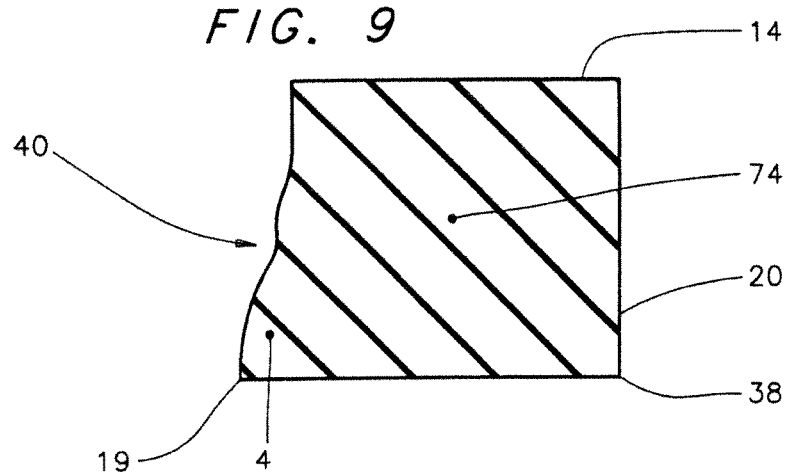

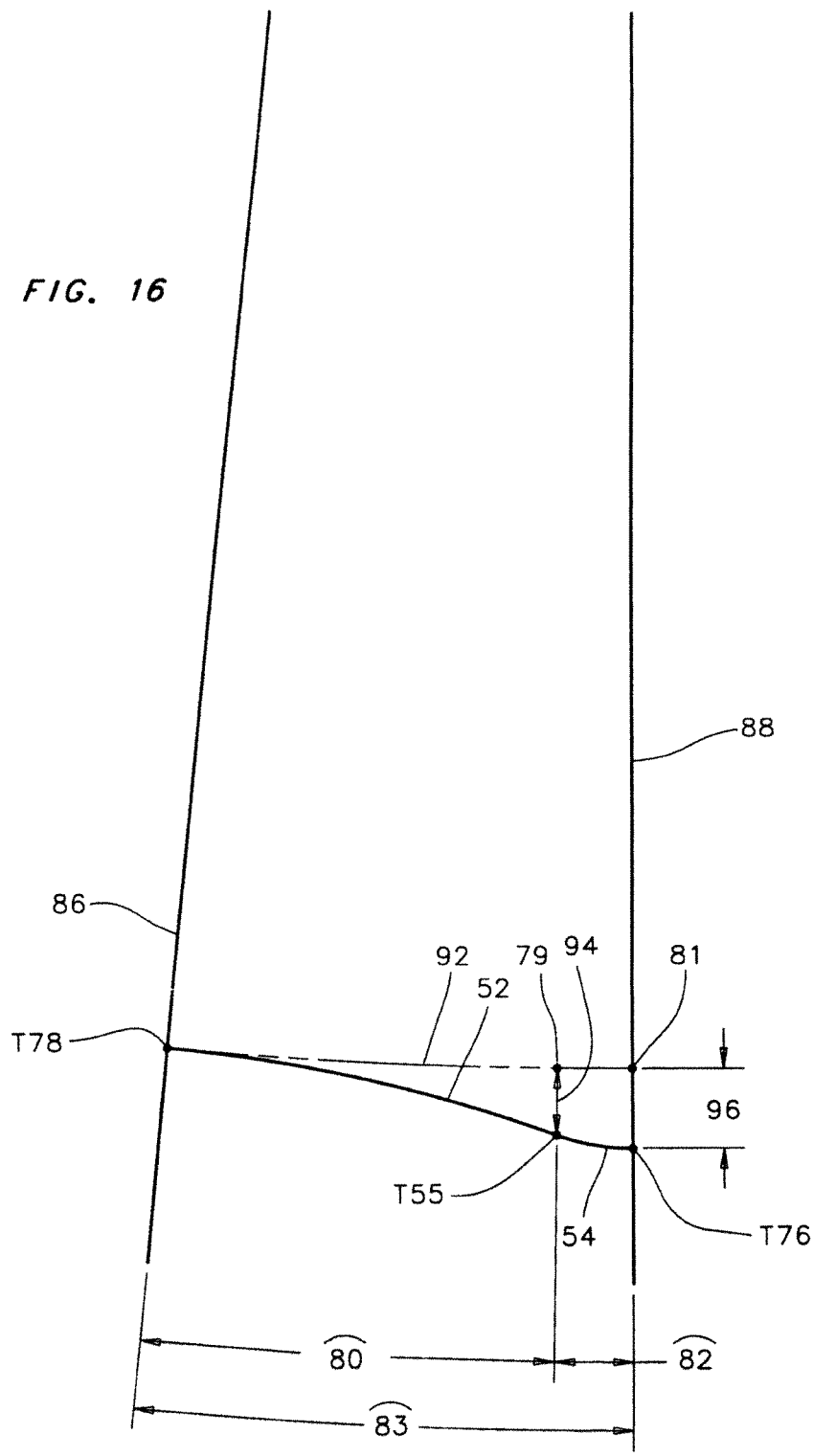

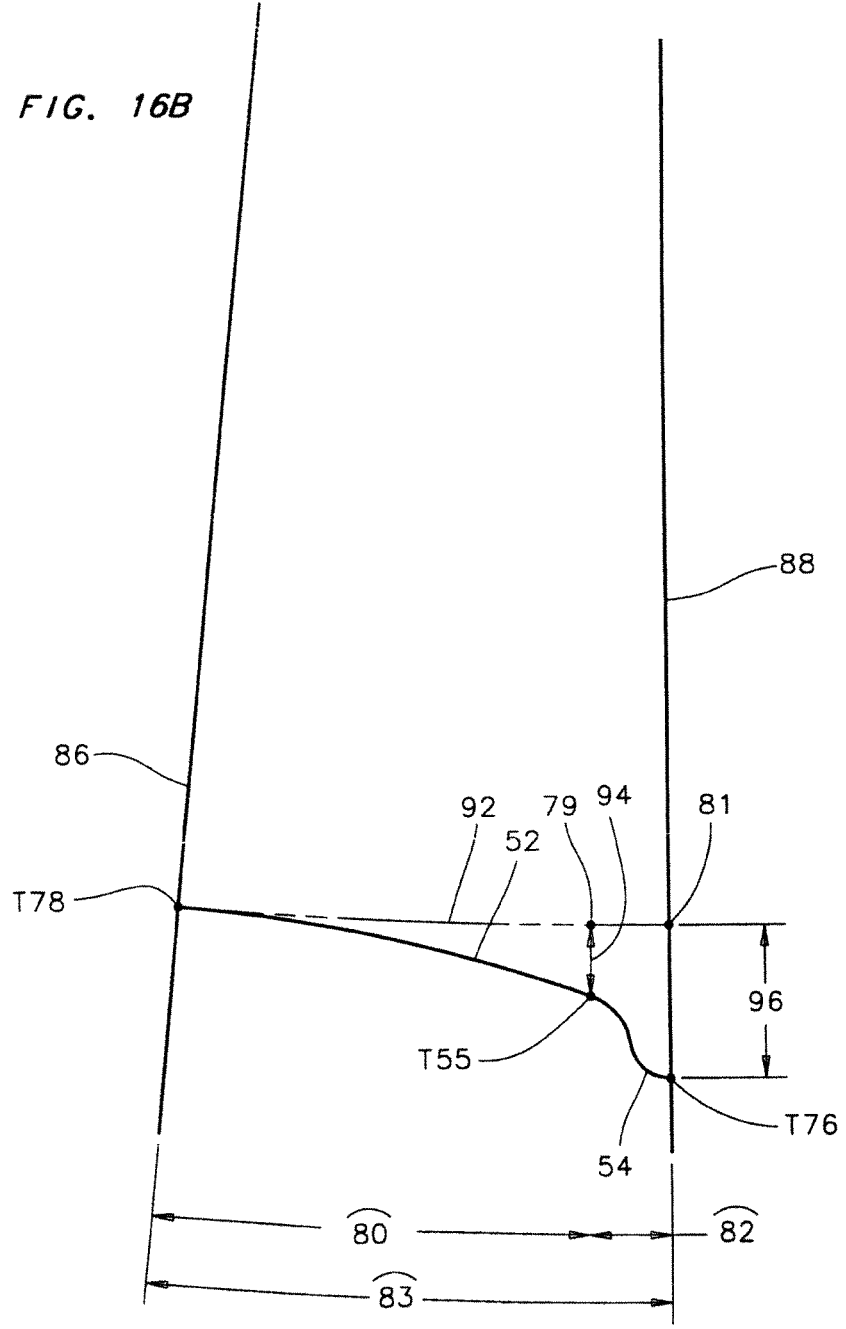

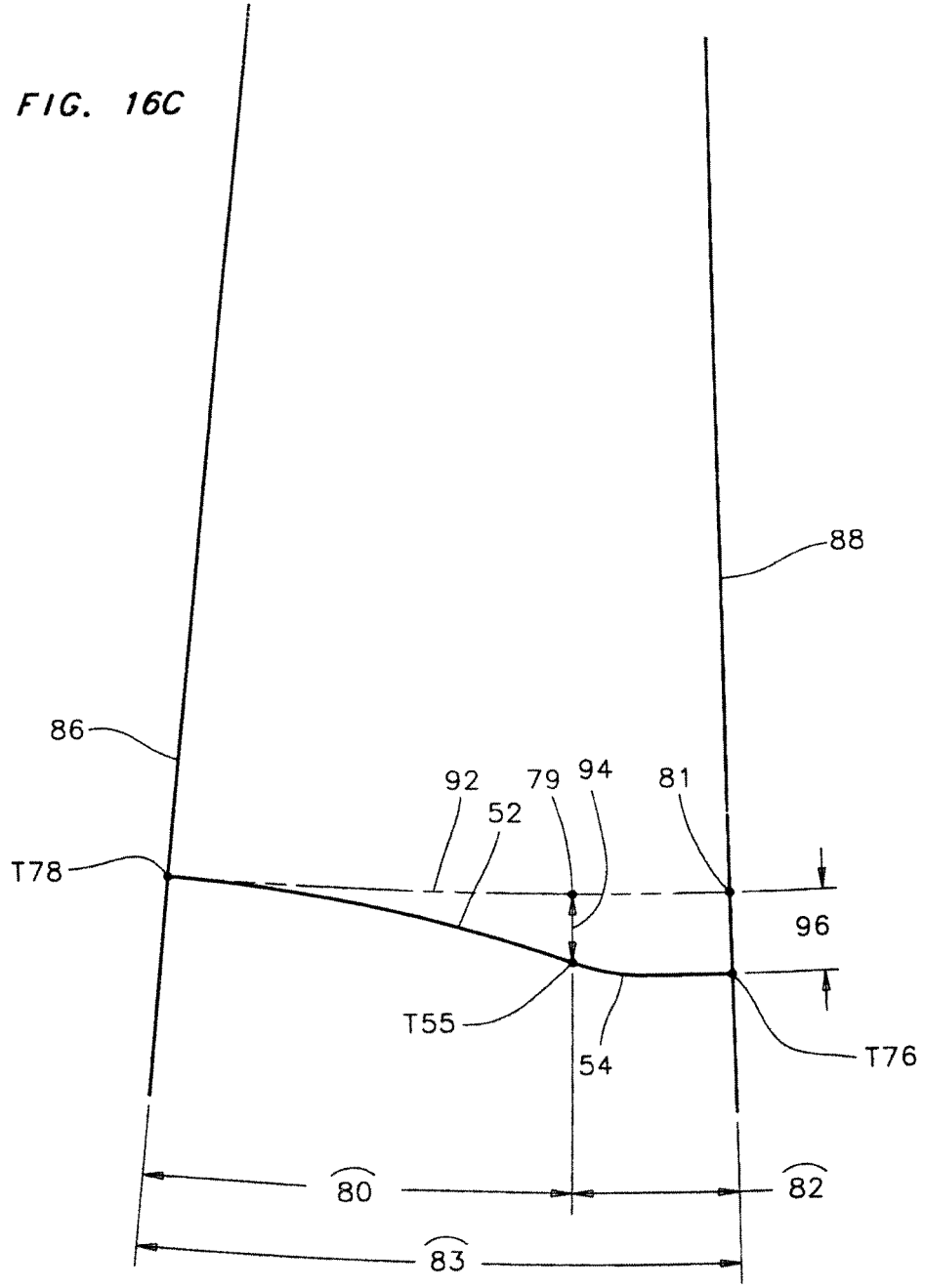

LOW TORQUE HYDRODYNAMIC LIP GEOMETRY FOR ROTARY SEALS

CROSS-REFERENCE TO RELATED APPLICATIONS

This application is a continuation application of U.S. application Ser. No. 12/480,530, filed Jun. 8, 2009 now U.S. Pat. No. 8,056,904, which is a continuation of U.S. application Ser. No. 11/386,209, filed Mar. 22, 2006, issued as U.S. Pat. No. 7,562,878, which claims the benefit of U.S. Provisional Application Ser. No. 60/664,662 filed on Mar. 22, 2005, entitled "Rotary Shaft Seal," and claims the benefit of U.S. Provisional Application Ser. No. 60/755,975 filed Jan. 4, 2006, entitled "Hydrodynamic Rotary Seal."

STATEMENT REGARDING FEDERALLY SPONSORED RESEARCH OR DEVELOPMENT

This invention was made with United States government support under Contract No. DE-FG02-05ER84206 awarded by the Department of Energy. The United States government therefore has certain rights in this invention.

BACKGROUND OF THE INVENTION

1. Field of the Invention

The present invention relates generally to lubrication of rotary seals in order to prolong seal life and reduce running torque, wear and self-generated heat. The rotary seals are suitable for environmental exclusion and lubricant retention, and more particularly relate to lubrication of seals that may be exposed to high differential pressure, to a high percentage of compression, and to rotation in the clockwise and counter-clockwise directions.

One aspect of the preferred embodiment of the present invention includes a hydrodynamically lubricating seal lip geometry suitable for both compression-type (i.e., interference-type) and flexing, cantilever lip-type rotary seals.

2. Description of the Related Art

Oilfield mud motor sealed bearing assemblies, rotary steerable tools, rotary blowout preventers and other oilfield equipment present a number of difficult rotary sealing challenges, as detailed in commonly assigned U.S. Pat. Nos. 4,610,319; 5,195,754; 5,230,520; 5,738,358; 5,823,541; 5,873,576; 6,007,105; 6,036,192; 6,109,618; 6,120,036; 6,227,547; 6,315,302; 6,334,619; 6,382,634; 6,494,462; and 6,561,520. For examples of mud motor sealed bearing assemblies, see U.S. Pat. Nos. 3,730,284; 4,372,400; 4,476,944; and 6,439,866. For examples of rotary blowout preventers, see U.S. Pat. Nos. 4,281,724; 5,178,215; 5,224,557; 5,647,444; 5,662,181; 6,016,880; 6,354,385; and 6,554,016.

The current state of the art seals for such equipment are the family of hydrodynamically lubricated seals manufactured and sold under the above-referenced commonly assigned patents. These seals—known in the industry by the registered trademark "KALSI SEALS"—typically have a sinusoidal wave-type hydrodynamic geometry for introducing a lubricant film into the dynamic sealing interface between a dynamic seal surface and a rotatable member. Although such seals perform well under certain conditions, there are other conditions in which their performance is deficient. One such set of difficult conditions is where the seal is subject to both clockwise and counter-clockwise rotation and where increased lubricant film thickness is desirable. An example of such an application is the mud motor. Mud motor rotary seals are subject to clockwise rotation during normal drilling and counterclockwise rotation due to counter-clockwise windmilling that can occur as the drillstring is lowered.

In the prior art seals having a sinusoidal wave-type hydrodynamic geometry, the film thickness is greatest in the region of the sinusoidal waves because much of the lubricant that enters at the wave leading edge simply leaks out at the wave trailing edge. As a result, the dynamic sealing interface is less well lubricated toward the environment-side which causes undesirable wear, torque and seal-generated heat—particularly when one or more of the following conditions are encountered:

Thin viscosity lubricants, which are less than optimum for lubrication;
High differential pressure across the seal;
High ambient geothermal temperature;
Shaft materials and configurations that interfere with heat transfer;
High initial seal compression;
High rotary speeds; and
Closely spaced redundant seals that concentrate seal-generated heat.

Running torque is related to lubricant shearing action and asperity contact in the dynamic sealing interface. Although the prior art hydrodynamic seals run much cooler than non-hydrodynamic seals, torque-related heat generation is still a critical consideration. The prior art seals are typically made from elastomers, which are subject to accelerated degradation at elevated temperature. For example, media resistance problems, gas permeation problems, swelling, compression set and pressure-related extrusion damage all become worse at higher temperatures.

The prior art seals cannot be used in some high speed or high-pressure applications simply because the useful temperature range of the seal material is exceeded due to seal-generated heat. Additionally, the bi-directional rotation prior art seals do not provide sufficient lubrication if the sealing lip incorporates harder materials—such as reinforced polytetrafluoroethylene ("PTFE") based plastic.

Typically, seal life is ultimately limited by susceptibility of the seal to compression set (i.e., permanent deformation), abrasive wear, and extrusion damage. Many applications would benefit from a hydrodynamic seal having the ability to operate with greater initial compression to enable the seal to tolerate greater mechanical misalignment, run-out, tolerances, compression set, and wear. Many applications would benefit from a seal that is better lubricated in extreme operating conditions, and suffers less wear. Many applications would also benefit from a cooler-running seal that would sustain less temperature-related loss of modulus of elasticity, and would therefore have increased high pressure extrusion resistance.

FIGS. 10-13D of U.S. Pat. No. 6,109,618 show a convex hydrodynamic inlet geometry—a rounded surface shape that in a circumferentially aligned cross-section would have a radiused appearance that is similar to the leading edge of a traditional sled runner. Seals manufactured in accordance with FIGS. 10-13D of U.S. Pat. No. 6,109,618 have an inherent but subtle limitation which is this: a given size of a substantially circumferentially oriented convex hydrodynamic inlet cannot provide the same rate of convergence with respect to the shaft across a family of seals for different shaft diameters.

Shaft diameter has a significant effect on the rate of convergence of a given convex hydrodynamic inlet size. Smaller diameter shafts converge with the inlet at a faster rate, creating more abrupt convergence. This affects lubricant wedging efficiency. With the same convex inlet size, a smaller diameter seal based on FIGS. 10-13D of U.S. Pat. No. 6,109,618 will lubricate less well and produce less flushing action, and a larger diameter seal will lubricate better and produce more flushing action.

FIG. 17 of this specification schematically shows the uncompressed relationship between various shaft diameters and circumferentially oriented hydrodynamic inlet radii. Even though FIG. 17 is not a representation of installed convergence, it provides insight into the relationship between shaft diameter and inlet convergence.

As can be readily seen from FIG. 17, the rate of convergence of a 2.00" convex inlet radius against a 2.75" diameter shaft is approximately double what it would be against a 16.50" shaft. As can also be seen, the rate of convergence of a 2.00" convex inlet radius against a 0.50" diameter shaft is even more abrupt. As a result, better lubrication and a higher flushing rate occur with a 16.50" shaft, compared to when the same inlet size is used on a 0.50" or 2.75" shaft.

As can be seen from the dashed line on FIG. 17A, if the rate of convergence of a 2.00" inlet radius against a 16.50" diameter shaft were to be duplicated on a 0.50" diameter shaft, it is now understood (as a result of recent research by the inventors performed under United States Department of Energy contract no. DE-FG02-05ER84206) that the inlet radius would have to be concave instead of convex. In other words, it is now understood that small diameter seals have to incorporate concave inlets in order to achieve the same degree of hydrodynamic lubrication as larger diameter seals that have convex inlets. U.S. Pat. No. 6,109,618 does not contemplate the use of a concave inlet. In fact, the manufacturing methods used to create the tooling for the seals represented by FIGS. 10-13D of U.S. Pat. No. 6,109,618 cannot accommodate a concave inlet.

Miniaturization Problems

As downhole tools are miniaturized, a number of design issues arise because some parameters cannot be scaled down linearly due to practical manufacturing constraints, tolerances and application specific requirements.

As the rotary seal is scaled down, the smaller radial cross-sectional depth results in less dimensional compression for a given percentage of initial compression. Tolerances cannot be scaled down below certain practical limits, thus contributing to larger compression variability. Shaft stiffness also scales down non-linearly, contributing to larger radial deflection and runout. This causes higher compression on one side of the seal, and lower compression on the other side.

A certain minimum level of dimensional compression is required so that a seal can accommodate tolerances, misalignment, seal abrasion, and compression set without losing sealing contact with the shaft. The factors stated above dictate that the initial percentage of compression of miniature seals be increased, compared to larger cross-section seals, to achieve the necessary dimensional compression.

Contact pressure at the dynamic sealing interface is related to the percentage of compression and the modulus of elasticity of the seal material. A higher percentage of compression leads to higher seal-to-shaft interfacial contact pressure, which reduces hydrodynamic lubricant film thickness, causing higher friction, seal-generated heat and wear. The compression limitations of the prior art seal designs impose corresponding limits on the minimum cross-section that is practical to manufacture. To compensate for this, seals capable of stronger hydrodynamic action in either direction of rotation are needed.

SUMMARY OF THE INVENTION

Briefly, the invention is preferably a generally circular, hydrodynamically lubricating, dynamic sealing lip geometry that is directed at prolonging seal life in applications where the lubricant pressure may be significantly higher than the environment pressure, and where the environment may contain abrasive particulate matter.

The present invention relates generally to rotary seals for establishing sealing between relatively rotatable machine components for lubricant retention and environment exclusion, where seal geometry interacts with the lubricant during relative rotation to wedge a film of lubricant into the dynamic sealing interface between the seal and the relatively rotatable surface. More specifically, the present invention concerns a unique hydrodynamic wave geometry for dynamic lips that is suitable for clockwise and counterclockwise rotation, and controls interfacial contact pressure within the dynamic sealing interface for efficient hydrodynamic lubrication. This permits the dynamic lip to have relatively high initial compression and relatively low torque, and helps the lip to withstand relatively high differential pressure.

Each of the waves of the preferred embodiment of the present invention incorporate an elongated dimple that provides gradual convergence with the relatively rotatable surface in the circumferential direction, an efficient impingement angle, and a gradual interfacial contact pressure rise in the circumferential direction. These factors are conducive to efficient hydrodynamic wedging. Skewed elevated contact pressure zones produced by compression edge effects provide for controlled lubricant movement across the dynamic sealing interface and toward the environment, for enhanced lubrication, low running torque, enhanced service life, and the ability to operate hydrodynamically at lower speeds. Some of the lubricant migrates past the elevated contact pressure zones, providing lubrication at the elevated contact pressure zones. A net leakage of lubricant occurs as lubricant is transferred across the dynamic sealing interface and into the environment.

The wave geometry of the present invention is suitable for both compression-type (i.e. interference-type) and flexing, cantilever lip-type rotary seals. The geometry can be configured for face sealing where a dynamic lip projects substantially axially for contact with a relatively rotatable surface of planar form. Alternately, the geometry can be configured for radial sealing where a dynamic lip projects substantially radially for contact with a relatively rotatable surface of cylindrical form.

The inlet geometry that is produced by the elongated dimple geometry can be generally convex or generally concave, or convex at some locations and concave at others, as dictated by the diameter of the dynamic lip, and the desired rate of convergence with the relatively rotatable surface.

BRIEF DESCRIPTION OF THE SEVERAL VIEWS OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate typical embodiments of this invention, and are therefore not to be considered limiting of its scope, for the invention may admit to other equally effective embodiments.

In the Drawings:

FIG. 1B is a fragmentary plan view showing a clockwise wave of the seal shown in FIGS. 1 and 1A;

FIG. 1C is a view taken along lines C-C of FIG. 1B;

FIG. 2 is a view of the interfacial contact footprint of two complete waves of the dynamic lip of the seal of FIG. 1A, the view incorporating contour-type mapping of the relative magnitude of interfacial contact pressure within the footprint;

FIGS. 2A and 2B are views of alternative footprint shapes of the dynamic lip of the seal according to the present invention;

FIGS. 4-9 are cross-sectional views of simplified embodiments of the hydrodynamic seal according to the present invention, the views taken at the center of the elongated dimple with the seal in an uncompressed state;

DETAILED DESCRIPTION OF THE INVENTION

Figure 1:
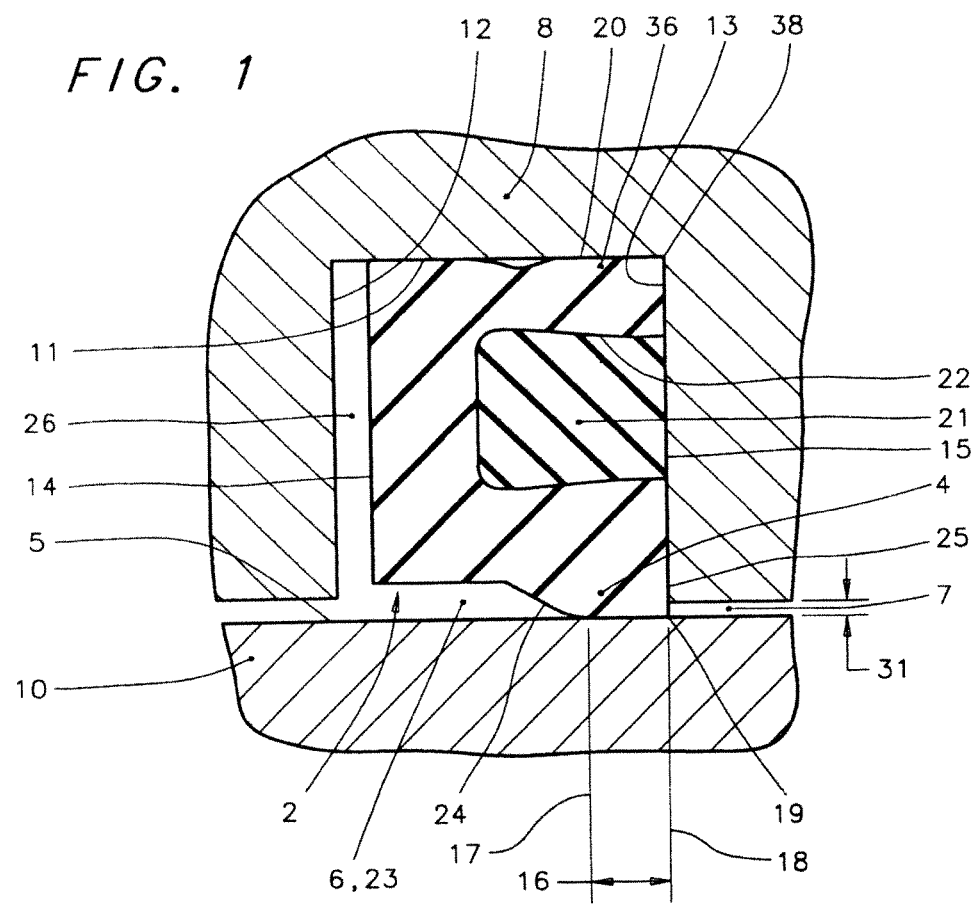
FIG. 1 is a fragmentary cross-sectional view representing the cross-sectional configuration of a ring shaped hydrodynamic seal embodying the principles of the present invention.

FIGS. 1-2B should be studied together, in order to attain a more complete understanding of the invention, because the total concept cannot be perfectly conveyed by any single figure. Features throughout this specification that are represented by like numbers have the same function. For orientation purposes, it should be understood that in the cross-sectional views of FIGS. 1, 1D-1F and 4-13, the cutting plane of the cross-section is aligned with and passes through the theoretical axis of the seal; and the sketching plane of the schematic views of FIGS. 16-17 is at right angles to the theoretical axis of a seal that is configured for sealing against a relatively rotatable shaft.

Description of FIG. 1

FIG. 1 is a fragmentary cross-sectional view that provides a general overview of how the preferred embodiment of the present invention is employed when assembled into a machine. A rotary seal 2 of generally circular, ring-like configuration includes at least one dynamic lip 4 that is also generally circular (i.e., ring-like) in form. Dynamic lip 4 incorporates the unique hydrodynamic features of the present invention (described in conjunction with subsequent figures) that allow dynamic lip 4 to run cooler with less wear, making it more compatible with running on shafts that have poor thermal conductivity, and making it more suitable for use with the high percentage of compression associated with miniature interference-type seal cross-sections.

The unique hydrodynamic features of the present invention can be incorporated on the dynamic lip of many different types of rotary seals, such as direct interference-type seals, or spring-energized cantilever lip seals. For purposes of illustration, the seal 2 that is portrayed in FIG. 1 is a typical direct interference-type seal that is installed in compression between first machine component 8 and relatively rotatable surface 5.

The purpose of seal 2 is to establish sealing engagement with the relatively rotatable surface 5, to retain a volume of a first fluid 6, to partition the first fluid 6 from a second fluid 7, and to exclude the second fluid 7 and prevent intrusion of the second fluid 7 into the first fluid 6. For the purposes of this specification, the term "fluid" has its broadest meaning, encompassing both liquids and gases.

Seal 2 is typically oriented (e.g. positioned) by the first machine component 8. For the purpose of illustrating a typical application, the first machine component 8 is illustrated as having a generally circular seal groove 26 that includes a first groove wall 12 and a second groove wall 13 that are in generally opposed relation to one another. The provisions for orienting the seal can take other specific forms without departing from the spirit or scope of the invention.

Figure 12:
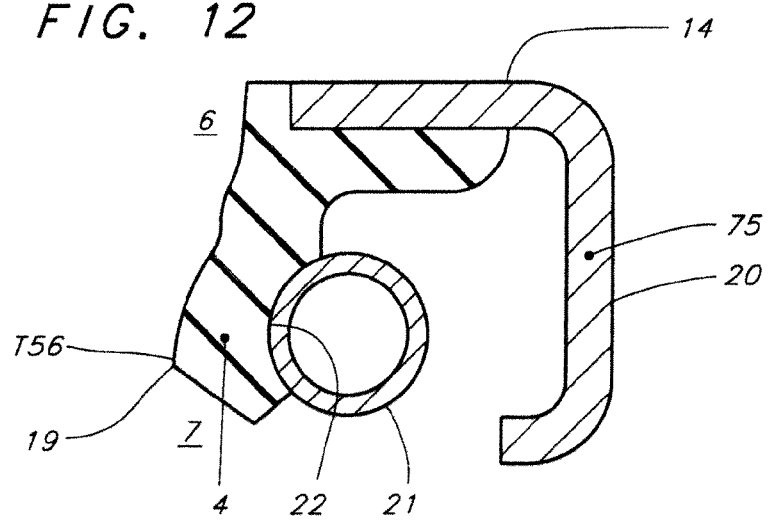
Figure 12A:
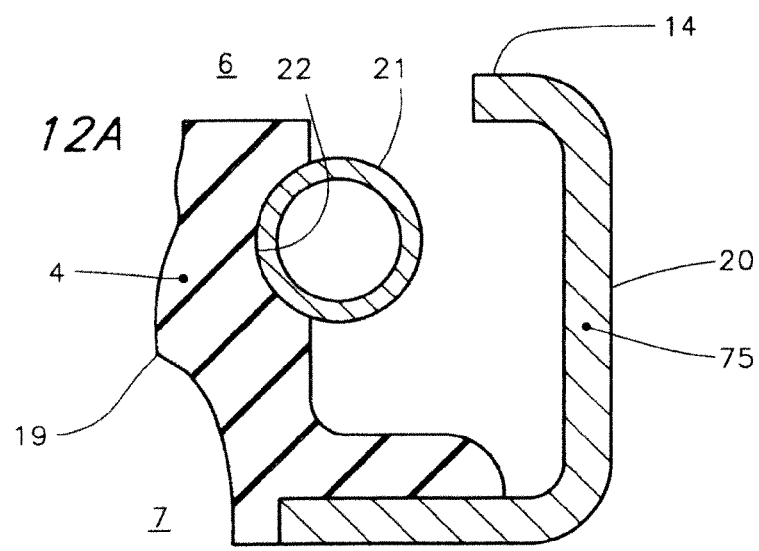

In the hydrodynamic seal industry, first groove wall 12 is often referred to as the "lubricant-side gland wall," and second groove wall 13 is often referred to as the "environment-side gland wall." Although first groove wall 12 and second groove wall 13 are shown to be in fixed, permanent relation to one another, such is not intended to limit the scope of the invention, for the invention admits to other equally suitable forms. For example, first groove wall 12 and/or second groove wall 13 could be configured to be detachable from first machine component 8 for ease of maintenance and repair, but then assembled in more or less fixed location for locating the seal. For another example, if the seal were a cased-type cantilever lip seal such as shown in FIGS. 12-12A, only one seal-locating wall would typically be employed. In other words, such seals would typically be installed in a counterbore.

At least a portion of the dynamic lip 4 is held in compressed, contacting relation with a relatively rotatable surface 5 of a second machine component 10. In dynamic operation, the relatively rotatable surface 5 has relative rotation with respect to dynamic lip 4 of seal 2 and with respect to first machine component 8. This invention has application where either the first machine component 8 or the second machine component 10, or both, are individually rotatable.

Seal 2, being a generally circular entity, defines a theoretical centerline (not shown), and the cross-section of FIG. 1 is a longitudinal cross-sectional illustration taken at a cutting plane that passes through that theoretical centerline; i.e., the theoretical centerline lies on the cutting plane. The circumferential direction of relative rotation is normal (perpendicular) to the plane of the cross-section, and the theoretical centerline of seal 2 generally coincides with the axis of relative rotation.

Seal 2 preferably defines a first seal end 14 that generally faces the first groove wall 12 and first fluid 6. Seal 2 preferably also defines a second seal end 15 that generally faces second groove wall 13 and second fluid 7. In the hydrodynamic seal industry, first seal end 14 is often referred to as the "lubricant end," and second seal end 15 is often referred to as the "environment-end." The first seal end 14 is preferred to be in generally opposed relation to the second seal end 15. First seal end 14 and second seal end 15 can take other specific forms without departing from the spirit or scope of the invention.

Although first seal end 14 is shown as having a clearance relationship with first groove wall 12, the unique hydrodynamic geometry of the present invention is also suitable for seals built to withstand simultaneous contact with both the first groove wall 12 and the second groove wall 13 in accordance with the teachings of commonly assigned U.S. Pat. Nos. 5,873,576; 6,036,192; and 6,315,302.

Relatively rotatable surface 5 can take the form of an externally or internally oriented substantially cylindrical surface, as desired, with seal 2 compressed radially between first machine component 8 and second machine component 10, in which case the axis of relative rotation would be substantially parallel to relatively rotatable surface 5. In a radial sealing configuration, dynamic lip 4 is oriented for compression in a substantially radial direction, and peripheral wall 11 may be of substantially cylindrical configuration, and first groove wall 12, second groove wall 13, first seal end 14 and second seal end 15 may, if desired, be of substantially planar configuration.

Alternatively, relatively rotatable surface 5 can take the form of a substantially planar surface, with seal 2 compressed axially between first machine component 8 and second machine component 10 in a "face-sealing" arrangement, in which case the axis or relative rotation would be substantially perpendicular to relatively rotatable surface 5. In an axial (face) sealing configuration, dynamic lip 4 would be oriented for compression in a substantially axial direction, peripheral wall 11 may be of substantially planar configuration, and first groove wall 12, second groove wall 13, first seal end 14 and second seal end 15 may, if desired, be of substantially cylindrical configuration.

The compression (i.e., compressed, contacting relation) of dynamic lip 4 against relatively rotatable surface 5 establishes and defines an interfacial contact footprint 16 between dynamic lip 4 and relatively rotatable surface 5. The footprint 16 has a non-circular first footprint edge 17 that faces the first fluid 6, and a second footprint edge 18 of preferably circular configuration that faces the second fluid 7.

Dynamic lip 4 preferably incorporates a dynamic exclusionary intersection 19 of abrupt circular form that is substantially aligned with the direction of relative rotation, and is adapted to exclude intrusion of the second fluid 7, in accordance with the teachings of commonly assigned U.S. Pat. No. 4,610,319. Dynamic exclusionary intersection 19 is of a configuration developing substantially no hydrodynamic wedging activity during relative rotation between dynamic lip 4 and relatively rotatable surface 5. Dynamic exclusionary intersection 19 presents a scraping edge to help exclude contaminant material from the interfacial contact footprint 16 in the event of any relative movement occurring perpendicular to the direction of relative rotation between dynamic lip 4 and relatively rotatable surface 5. Dynamic exclusionary intersection 19 need not be present unless abruptness and circularity are desired for more efficient environment exclusion.

Relatively rotatable surface 5 of second machine component 10 and peripheral wall 11 of first machine component 8 are in spaced relation to each other. For a compression-type seal such as shown in FIG. 1, the spacing of relatively rotatable surface 5 and peripheral wall 11 is sized to hold seal 2 in compression. In the same manner as any conventional interference-type seal, such as an O-ring or an O-ring energized lip seal, the compression of seal 2 establishes a sealing interface between a static sealing surface 20 of seal 2 and peripheral wall 11 of first machine component 8. The compression also establishes the aforementioned interfacial contact footprint 16 between dynamic lip 4 and relatively rotatable surface 5.

During the presence of relative rotation between dynamic lip 4 and relatively rotatable surface 5, the interfacial contact footprint 16 is a dynamic sealing interface, with sliding occurring between dynamic lip 4 and relatively rotatable surface 5. In the absence of relative rotation between dynamic lip 4 and relatively rotatable surface 5, the interfacial contact footprint 16 is a static sealing interface.

Peripheral wall 11 can be substantially parallel to relatively rotatable surface 5 as shown, or could be angulated with respect to relatively rotatable surface 5 as shown, for example, by the prior art of FIG. 4, 6, 7, 8 or 9 of commonly assigned U.S. Pat. No. 5,230,520.

In the preferred embodiment of the present invention, footprint 16 has a shape that varies in width around the circumference thereof due to the unique hydrodynamic geometry shown in subsequent figures herein. The first footprint edge 17 is preferably non-circular (i.e., wavy) due to the unique hydrodynamic geometry and produces a hydrodynamic wedging action in response to relative rotation between the seal 2 and relatively rotatable surface 5. This hydrodynamic wedging action forces a film of lubricating fluid (i.e., a film of the first fluid 6) into the interfacial contact footprint 16 between the dynamic lip 4 and the relatively rotatable surface 5 for lubrication purposes, which reduces wear, torque and heat generation. In other words, dynamic lip 4 slips or hydroplanes on a film of lubricating fluid during periods of relative rotation between dynamic lip 4 and relatively rotatable surface 5. When relative rotation stops, the hydroplaning activity stops, and a static sealing relationship is reestablished between dynamic lip 4 and relatively rotatable surface 5 due to the initial compression of dynamic lip 4 against relatively rotatable surface 5.

The hydroplaning activity minimizes or prevents the typical dry rubbing wear and high friction associated with conventional non-hydrodynamic rubber and plastic seals, prolonging the life of the seal 2 and the life of the relatively rotatable surface 5, and makes higher speed, compression and differential pressure practical, even when part of dynamic lip 4 is comprised of a plastic, such as reinforced PTFE.

If a seal incorporating the improved geometry of the present invention is mounted in a floating pressure compensation piston, its reduced running torque is less likely to cause the piston to spin within the mating housing bore. The reduced seal running torque also makes undesirable slippage of seal 2 with respect to second machine component 10 less likely compared to the prior art, which is an important consideration in large diameter seals. The slippage can vary around the circumference of a large seal, causing localized circumferential stretching that promotes tensile failure. A seal that has lower running torque is less likely to experience such failure.

The second footprint edge 18 (sometimes called the "environment edge") of the interfacial contact footprint 16 is preferably substantially circular and substantially aligned with the possible directions of relative rotation between dynamic lip 4 and relatively rotatable surface 5. Second footprint edge 18 is established by compression of dynamic exclusionary intersection 19 against relatively rotatable surface 5. Due to second footprint edge 18 being substantially circular and substantially aligned with the possible directions of relative rotation, second footprint edge 18 does not produce a hydrodynamic wedging action in response to relative rotation between the dynamic lip 4 and the relatively rotatable surface 5, thereby facilitating exclusion of second fluid 7 in accordance with the teachings of commonly assigned U.S. Pat. No. 4,610,319.

Figure 13:
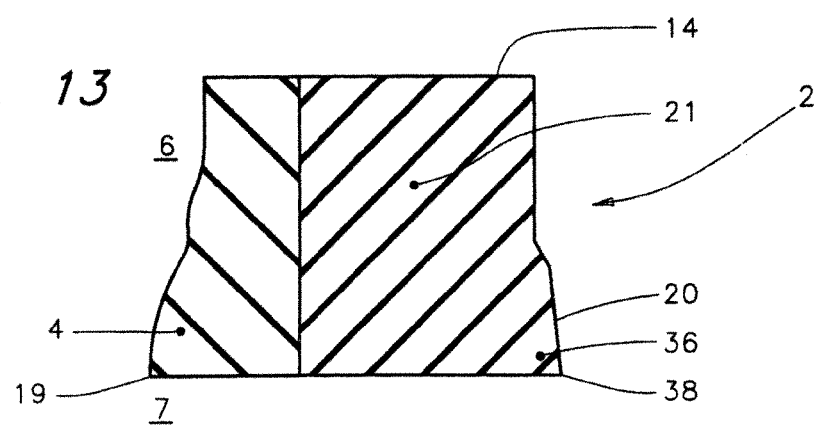
FIG. 13 is a cross-sectional view of an alternative embodiment of the hydrodynamic seal according to the present invention, the view taken at the center of the elongated dimple with the seal in an uncompressed state.

Dynamic lip 4 may be composed of any suitable sealing material or combination of materials, including elastomeric or rubber-like materials including, but not limited to, carbon, fiber or fabric reinforced elastomers, plastic materials, and different materials bonded together to form a composite structure such as, but not limited to, a plastic sheath attached to an elastomer structure (for an example of a possible arrangement, see FIG. 13).

Dynamic lip 4 is ideally constructed of a sealing material selected for its wear and extrusion resistance characteristics, and has a modulus of elasticity. In the embodiment of FIG. 1, an energizer 21 is provided to load dynamic lip 4 against relatively rotatable surface 5, and to help control seal deformation and interfacial contact force between dynamic lip 4 and relatively rotatable surface 5. Energizer 21 may also, if desired, load static sealing surface 20 against peripheral wall 11, as shown in FIG. 1. The energizer 21 can take any of a number of suitable forms known in the art including, but not limited to, elastomeric rings and various forms of springs without departing from the scope or spirit of the invention. If desired, energizer 21 can be located by an annular recess 22 of any suitable form.

Simplified embodiments are possible wherein one or more features are omitted. For example, the energizer 21 can be eliminated such that seal 2 has one or more flexible lips, or such that the seal 2 is solid and consists of a single material, as shown in FIGS. 6 and 7 respectively.

As shown in FIG. 1, energizer 21 can be a resilient material having a modulus of elasticity that may be identical or different than the modulus of elasticity of dynamic lip 4. For example, energizer 21 could be an elastomer having a higher compression set resistance than the elastomer forming dynamic lip 4, yet both elastomers could have substantially the same modulus of elasticity. For another example, the modulus of elasticity of energizer 21 could be lower than the modulus of elasticity of dynamic lip 4 in order to manage interfacial contact pressure to optimum levels for lubrication and low torque as taught by commonly assigned U.S. Pat. No. 5,738,358.

The contact pressure at the interface between the dynamic lip 4 and the mating relatively rotatable surface 5 is one of several important factors controlling seal-generated heat because it influences hydrodynamic film thickness, which in turn influences the shear rate of the lubricant film and the amount of asperity contact, if any, between dynamic lip 4 and relatively rotatable surface 5. Higher flushing rates can also be obtained with the present invention by using sealing arrangements that have low initial interfacial contact pressure.

Energizer 21 may be bonded to or integrally molded with the rest of seal 2 to form a composite structure, or can simply be a separate piece that is mechanically assembled to the rest of seal 2 using techniques common to the prior art. Several examples of other suitable types of energizers are shown in FIGS. 10-13 herein. In FIG. 1, seal 2 is illustrated as a compression-type seal, but the basic concept can be converted to a flexing cantilever lip type seal by substitution of an energizer 21 taking the form of a mechanical spring, as shown by FIGS. 10-12B herein. In a simplification of the invention, the energizer 21 can be eliminated such that the seal has a solid monolithic cross-section, as shown in FIGS. 7-9 herein.

First machine component 8 and second machine component 10 together typically define at least a portion of a chamber 23 for locating the first fluid 6 and defining a lubricant supply. The first fluid 6 is exploited in this invention to lubricate the dynamic sealing interface between seal 2 and second machine component 10 during relative rotation thereof. First fluid 6 is preferably a liquid-type lubricant such as a synthetic or natural oil, although other fluids including greases, water, and various process fluids are also suitable in some applications. The second fluid 7 may be any type of fluid that seal 2 may be exposed to in service, such as any type of liquid or gaseous environment including, but not limited to, a lubricating media, a process media, a drilling fluid, etc.

The dynamic lip 4 has a first lip side 24 that faces the first fluid 6 and a second lip side that faces the second fluid 7 when installed. In the hydrodynamic seal industry, the first lip side 24 is often referred to as the "lubricant side" of the lip, and the second lip side 25 is often referred to as the "environment side" of the lip. The first lip side 24 is located in spaced relation with respect to the dynamic exclusionary intersection 19 and the second lip side 25.

In FIG. 1, seal 2 is shown located in a position within seal groove 26 that would occur if the pressure of first fluid 6 were higher than the pressure of second fluid 7. In such pressure conditions, the hydrostatic force resulting from the lubricant pressure acting over the area between relatively rotatable surface 5 and peripheral wall 11 forces the seal 2 against the second groove wall 13. Owing to the complimentary shapes of the second seal end 15 and the mating second groove wall 13, the seal 2 is well supported by the second groove wall 13 at all locations except clearance gap 31 which exists between the first machine component 8 and the second machine component 10. The clearance gap 31, which is often referred to as the "extrusion gap," is preferably kept small so that the rigidity of the seal material can better bridge the gap and resist pressure deformation.

It is known in the art that at high differential pressure, a small portion of the sealing lip will tend to bulge or extrude into the extrusion gap, and pulsating pressure and runout can flex the extruded material, resulting in extrusion damage.

Testing of the improved hydrodynamic geometry of the present invention has demonstrated that it allows the seal to run cooler compared to the commercial prior art seals of U.S. Pat. No. 5,230,520, allowing it to bridge larger extrusion gaps and/or higher differential pressures, due to the dynamic lip 4 having a higher retained modulus as a result of the cooler running conditions.

Figure 1A:
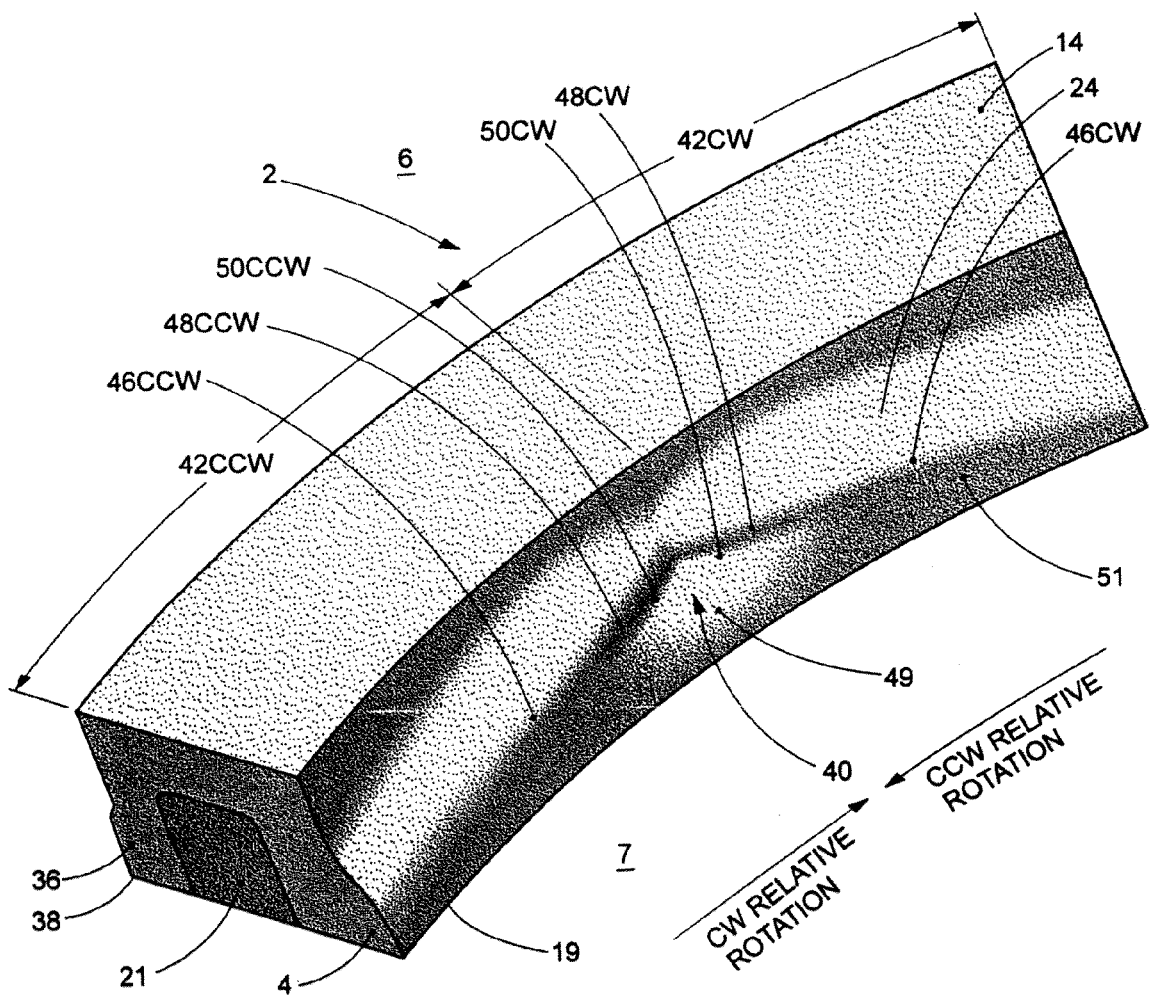
FIG. 1A is an enlarged fragmentary shaded perspective view of the hydrodynamic seal of FIG. 1 in an uncompressed state and configured for radial compression, the view showing an elongated dimple and two complete waves of the dynamic lip.

It has previously been mentioned that the present invention is suitable for both radial compression arrangements and axial compression arrangements. In the case of very large diameter, and hence very flexible seals, dynamic lip 4 can simply be manufactured in the generally internally oriented configuration that is shown in FIG. 1A (for the sake of mold construction convenience), as it would be configured for sealing against a relatively rotatable surface 5 that defines an externally oriented cylindrical surface (i.e., such as the surface of a shaft).

Large diameter seals are torsionally limp, and therefore the cross-section of large diameter seals can be rotated 90° so that dynamic lip 4 becomes a generally axially oriented lip configured for sealing against a relatively rotatable surface 5 of substantially planar form, or can be rotated 180° so that dynamic lip 4 becomes an outer, generally radially oriented lip that is configured for sealing against a relatively rotatable surface 5 that is an internally oriented cylindrical surface (i.e., such as the bore of a housing).

The relative torsional stiffness of small diameter seals is much higher, and therefore, for small seals, the dynamic lip 4 should be manufactured in the desired radial or axial sealing configuration as may be required by a particular sealing application.

In summary, the seal can be used as a face seal or a radial seal by configuring (by twisting or by manufacture) the dynamic lip 4 to be located at either the inside diameter, the outside diameter, or the end of the seal, while maintaining the lubricating advantages of the invention that are disclosed herein.

Description of FIG. 1A

FIG. 1A is an enlarged fragmentary shaded perspective view, showing two complete waves of the dynamic lip 4 of the same seal 2 that was shown in FIG. 1, but in the uncompressed state, and configured (by twisting or manufacture) for radial compression. In the following discussion, the abbreviation "CW" is used to designate "clockwise," and the abbreviation "CCW" is used to designate "counter-clockwise."

First seal end 14, energizer 21, dynamic exclusionary intersection 19 and seal dynamic surface 51 are labeled in FIG. 1A for orientation purposes. Dynamic lip 4 may be implemented in generally opposed relation to a projecting static sealing lip 36 of generally circular configuration. Projecting static sealing lip 36 preferably incorporates a static exclusionary intersection 38 of abrupt circular form that is substantially aligned with the direction of relative rotation, and is adapted to exclude intrusion of the second fluid 7.

Figure 1D:
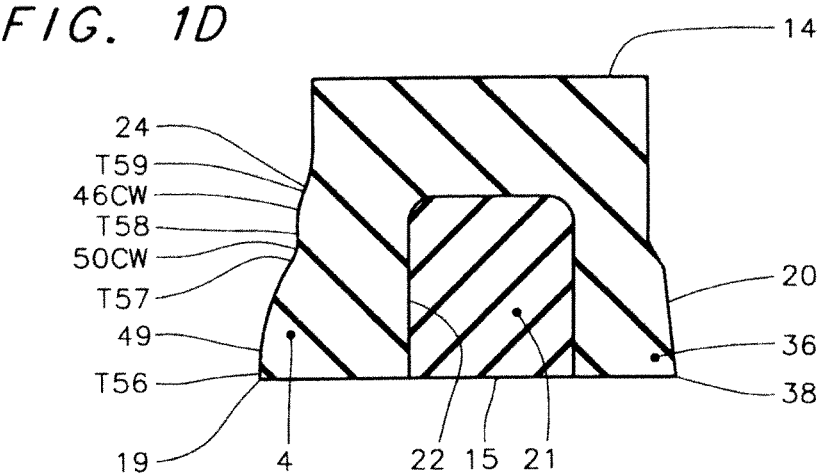
FIGS. 1D, 1E and 1F are section views taken along lines D-D, E-E and F-F, respectively, of FIG. 1B.
Figure 1E:
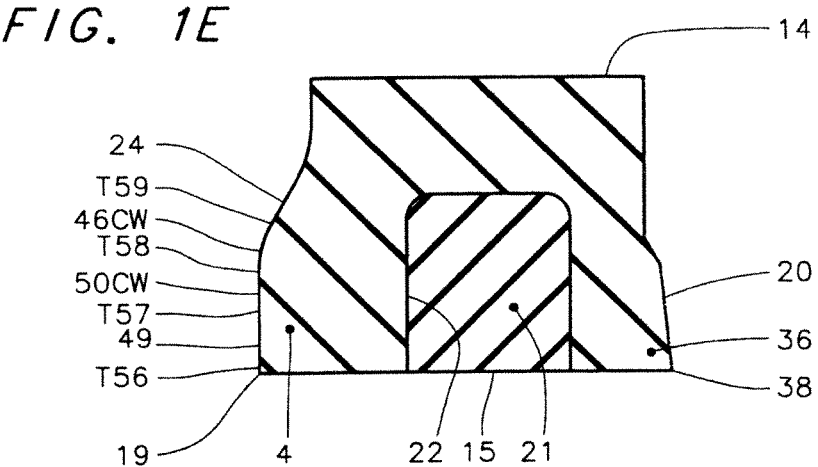
Figure 1F:
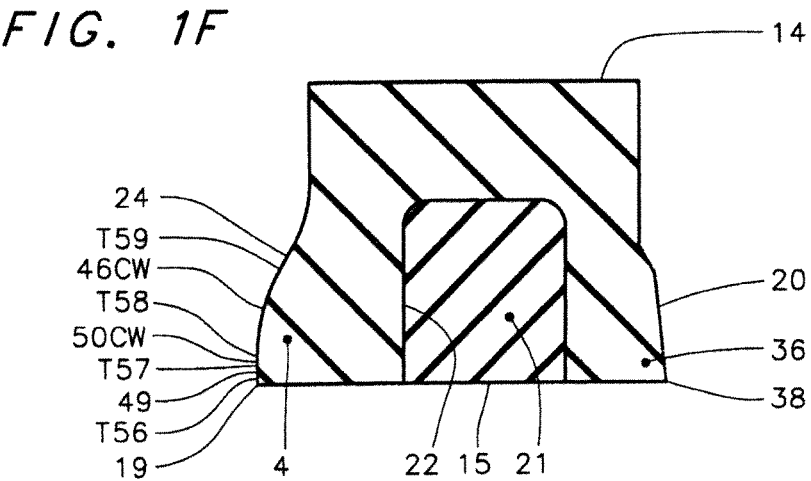

Projecting static sealing lip 36 provides a degree of compressive symmetry that minimizes the potential for twisting of seal 2 that would otherwise occur when installed, in accordance with the teachings of commonly assigned U.S. Pat. Nos. 5,230,520 and 6,767,016. In the embodiment shown in FIG. 1A, projecting static sealing lip 36 is larger in diameter than dynamic lip 4, and static sealing surface 20 is preferably a sloping surface as shown in FIGS. 1D-1F that provides additional seal compression near static exclusionary intersection 38.

Figure 12B:
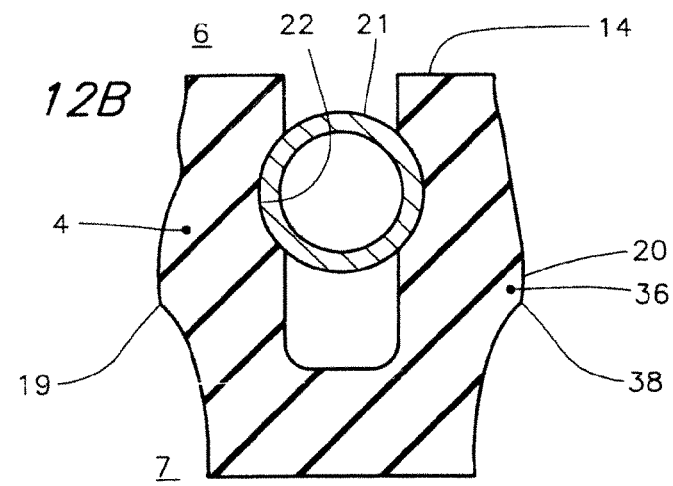

The geometry of projecting static sealing lip 36 can take other forms without departing from the spirit or scope of the present invention; for example any of the static lip forms shown in commonly assigned U.S. Pat. Nos. 5,230,520 and 6,767,016 could be employed if desired. FIGS. 4, 8 and 12B herein illustrate several alternate geometries of projecting static sealing lip 36.

The embodiments illustrated herein that incorporate a projecting static sealing lip 36 can also be simplified, if, desired, by elimination of projecting static sealing lip 36—for example, as shown in FIGS. 5, 9, 12 and 12A.

The segment of lip geometry that is illustrated in FIG. 1A appears generally like a single, conventional-appearing hydrodynamic wave geometry of the type taught by commonly assigned U.S. Pat. No. 5,230,520 (i.e., a wave having a trough (low point), a crest (high point) and a second trough), but with an elongated dimple 40 in the middle. Indeed the thought process leading to the preferred embodiment of the present invention involved visualization of exactly that—a conventional-appearing hydrodynamic wave geometry, but with an elongated dimple 40 in the middle that from a functionality standpoint, bifurcates the geometry into a clockwise wave 42CW and counter clockwise wave 42CCW that are preferably mirror images of each other. In FIG. 1A, the elongated dimple 40 is located approximately mid-way between the troughs at the left and right end portions of the seal shown in FIG. 1A. The extension and dimension lines in FIG. 1A indicate the circumferential extent and the two ends of each of the complete waves 42CW and 42CCW. Each complete wave 42CW, 42CCW includes a wave shape having two troughs and a crest. Regarding wave 42CW of FIG. 1A, a first trough is formed by a dimple flank 49 of the dimple 40, a second trough is formed by the location where a multi-function edge 46CW approaches closest to the dynamic exclusionary intersection 19, and the crest is formed by a ramp section 48CW of the multi-function edge 46CW. To a certain extent, this complex wave shape resembles a cresting ocean wave. Likewise, regarding wave 42CCW of FIG. 1A, one trough is created by the dimple flank 49 of the dimple 40 and the other is produced by the location where a multi-function edge 46CCW approaches closest to the dynamic exclusionary intersection 19, and the crest is formed by a ramp section 48CCW of the multi-function edge 46CCW. The wave shapes are more easily comprehended with reference to FIG. 2. FIG. 2 is a view of the interfacial contact footprint 16 of the two complete waves 42CW, 42CCW, of the dynamic lip 4 of the seal of FIG. 1A with the relatively rotatable surface 5. The footprint crest and troughs that are produced by each wave 42CW, 42CCW, on the dynamic lip 4 are readily apparent. Referring back to FIG. 1A, one can see that the extension and dimension lines used to identify the extent of the waves 42CW, 42CCW, are aligned with the troughs of the waves. The elongated dimple 40 preferably defines a hydrodynamic inlet for both clockwise wave 42CW and counter-clockwise wave 42CCW.

When the elongated dimple 40 is compressed against the relatively rotatable surface 5 (FIG. 1), both ends thereof produce a gradually converging relationship with relatively rotatable surface 5, as viewed in the circumferential direction, forming a hydrodynamic entrance zone of clearance that gradually tapers to nothing at the point of contact between dynamic lip 4 and relatively rotatable surface 5, for efficient wedging of a film of first fluid 6 into the interfacial contact footprint 16 between dynamic lip 4 and relatively rotatable surface 5 in response to relative rotation there between.

Seal running torque is influenced by the total footprint contact area (i.e., lubricant shearing area) and degree of asperity contact between dynamic lip 4 and relatively rotatable surface 5. Compared to the commonly assigned prior art seals of U.S. Pat. Nos. 4,610,319 and 5,230,520, the elongated dimple 40 removes seal material from compression and eliminates unnecessary locations of high interfacial contact pressure, and reduces total footprint contact area and total contact force between dynamic lip 4 and relatively rotatable surface 5—without needing to reduce the minimum width of the interfacial contact footprint 16. This factor alone reduces both running and breakout torque as compared to the prior art.

Running torque is also influenced by the effectiveness of the lubrication of the interfacial contact footprint 16. The elongated dimple 40 functions to dramatically improve lubrication of the interfacial contact footprint 16, as disclosed below in detail. The improved lubrication allows the seals to operate with higher levels of interfacial contact pressure that are associated with the higher percentage of compression that is necessary with miniature seals, and/or the higher contact pressure resulting from higher differential pressure acting across the seal, and/or the higher contact pressure resulting from the use of higher modulus sealing materials, such as reinforced plastics.

For bi-directional rotation service, dynamic lip 4 incorporates at least one clockwise wave 42CW and at least one counter-clockwise wave 42CCW. The first lip side 24 of a dynamic lip 4 is preferably skewed with respect to the possible directions of relative rotation between dynamic lip 4 and relatively rotatable surface 5, and defines the flanks of the clockwise wave 42CW and the counter-clockwise wave 42CCW. Both the clockwise wave 42CW and the counter-clockwise wave 42CCW are adapted for hydrodynamic self-lubrication with a film of the first fluid 6 in response to clockwise or counter-clockwise relative rotation between the dynamic lip 4 and the relatively rotatable surface 5.

Clockwise wave 42CW is adapted for diverting a film of the first fluid 6 toward the second lip side 25 (and through the generally circular sealing band 44 shown in FIG. 2) and into the second fluid 7 in response to clockwise relative rotation between dynamic lip 4 and the relatively rotatable surface 5, and thereby provides for hydrodynamically lubricating the footprint 16 (See FIGS. 1 and 2) during clockwise relative rotation.

Counter-clockwise wave 42CCW is adapted for diverting a film of the first fluid 6 toward the second lip side 25 (and through the generally circular sealing band 44 shown in FIG. 2) and into the second fluid 7 in response to counter-clockwise relative rotation between dynamic lip 4 and the relatively rotatable surface 5, and thereby provides for hydrodynamically lubricating the footprint 16 during counter-clockwise relative rotation.

Clockwise wave 42CW and counter-clockwise wave 42CCW are preferably mirror images of one another, as shown in FIG. 1A, and are preferably in abutting relation with one another, as shown, for prevention of side leakage from the footprint 16 back into the chamber 23. By employing at least one clockwise wave 42CW and at least one counter-clockwise wave 42CCW, the dynamic lip 4 is bi-directional in the sense that it achieves efficient hydrodynamic lubrication and efficient diversion of the film of the first fluid 6 toward the second lip side 25 in response to either clockwise or counter-clockwise relative rotation. In FIG. 1A, since clockwise wave 42CW and counter-clockwise wave 42CCW are illustrated and described as being mirror images of one another, it logically follows that various features of the waves, such as the multi-function edges 46CW and 46CCW, are also mirror images of one another—as indeed FIG. 1A shows them to be. Being specific features of the mirror image waves 42CW, 42CCW, each multi-function edge 46CW, 46CCW has a limited circumferential extent.

The exact number of clockwise waves 42CW and counter-clockwise waves 42CCW that are employed is dependent on the diameter of the seal 2. In larger diameter seals more waves would be used—typically in a repetitive pattern, and in smaller diameter seals fewer waves would be used. In extremely small diameter seals for bi-directional rotation, as few as one clockwise wave 42CW and one counter-clockwise wave 42CCW might be employed. The exact number of clockwise waves 42CW and counter-clockwise waves 42CCW that are employed is also dependent on the degree of lubrication that is required in each direction of relative rotation. For example, if the differential pressure were high in the clockwise direction of rotation, and low in the counter-clockwise direction of rotation, it may be desirable to have a greater number of clockwise waves 42CW, and a lesser number of counter-clockwise waves 42CCW. In seals where the number of clockwise waves 42CW and counter-clockwise waves 42CCW are unequal, there are some locations where a clockwise wave abuts another clockwise wave, or where a counter-clockwise wave abuts another counter-clockwise wave. In such circumstances, at the abutting location, both waves would share the same cross-sectional profile so that the transition from one wave to another is smooth. For example, if a clockwise wave 42CW abuts another clockwise wave 42CW, the trough formed by the dimple flank 49 of one wave abuts the trough formed by the multi-function edge 46CW of the other wave, and at the abutting location, both waves would share the same cross-sectional profile so that the transition from one wave to another is smooth.

Proximate to first lip side 24, the clockwise wave 42CW and the counter-clockwise wave 42CCW incorporate multi-function edge 46CW and multi-function edge 46CCW, respectively. The extent of multi-function edge 46CW and multi-function edge 46CCW may be more easily understood by studying FIGS. 1C-1F. Multi-function edges 46CW and 46CCW each have at least a portion thereof that is skewed (i.e., not parallel) with respect to the direction of possible relative rotation. Preferably, nearly all of multi-function edge 46CW and multi-function edge 46CCW are skewed with respect to the direction of possible relative rotation and with respect to dynamic exclusionary intersection 19. Preferably, the skewed portion of multi-function edge 46CW is skewed oppositely from the skewed portion of multi-function edge 46CCW.

At least a portion of multi-function edge 46CW, 46CCW forms ramp section 48CW, 48CCW, respectively. Each of the ramp sections 48CW and 48CCW help to form part of one side of elongated dimple 40. When seal 2 is compressed against a relatively rotatable surface 5 (FIG. 1), it is preferable that at least a part of each ramp section 48CW and 48CCW is compressed against relatively rotatable surface 5, and at least a part of each ramp section does not contact relatively rotatable surface 5, and instead has clearance with relatively rotatable surface 5. Ramp sections 48CW and 48CCW slope/curve toward relatively rotatable surface 5 at a gentle angle to form a hydrodynamic wedging geometry.

Preferably, elongated dimple 40 also incorporates a dimple flank 49 that has a generally convex curve-like profile when viewed in longitudinal transverse cross-section (as best seen in FIG. 1D). The size of the curve-like profile preferably varies along the length of the wave, as disclosed in more detail below in conjunction with FIGS. 1B-1F. Dynamic lip 4 also preferably incorporates a dimple fillet 50CW and 50CCW that preferably have a generally concave curve-like profile when viewed in longitudinal transverse cross-section (as best seen in FIG. 1D) and have a sloping, inclined profile in the circumferential direction. Preferably at least a portion of dimple fillet 50CW, 50CCW is recessed compared to ramp sections 48CW and 48CCW, respectively. Dimple fillets 50CW and 50CCW are preferably both tangent or substantially tangent to the dimple flank 49. Dimple fillets 50CW and 50CCW are also preferably tangent or substantially tangent to the ramp sections 48CW and 48CCW, respectively. The curve-like cross-sectional profile of dimple flank 49, dimple fillet 50CW, 50CCW, and ramp section 48CW, 48CCW, can take any suitable form, such as a radius or a portion of an elliptical curve, or a portion of a parabolic curve, a combination of curves, etc.

The lubricant (first fluid 6) within a machine tends to collect contaminants during operation. As the relative rotation occurs, a portion of the first fluid 6, and the contaminants floating within it, rotate circumferentially within chamber 23 and have relative rotation with respect to dynamic lip 4. As a result of the skewed nature of multi-function edges 46CW and 46CCW, some of the first fluid slips around the dynamic lip 4 rather than entering into the dynamic interfacial footprint 16. This diverting action helps to direct contaminants within first fluid 6 away from the elongated dimple 40, thereby helping to prevent wear of the dynamic surfaces of dynamic lip 4.

Description of FIGS. 1B-1F

FIG. 1B is a fragmentary plan view showing a clockwise wave 42CW of the seal 2 shown in FIGS. 1 and 1A. FIG. 1C is a view taken along view plane C-C of FIG. 1B. FIGS. 1D, 1E and 1F are section views taken along cutting planes D-D, E-E and F-F of FIG. 1B, respectively. In FIGS. 1D-1F, first seal end 14, second seal end 15, static sealing surface 20, energizer 21, annular recess 22, first lip side 24, projecting static sealing lip 36 and static exclusionary intersection 38 are labeled for orientation purposes. Several of these features are also numbered in FIGS. 1B and 1C for orientation purposes. In FIG. 1B, primary arc length 80, secondary arc length 82 and primary arc depth 94 correlate to like-numbered elements that are described in detail in conjunction with the schematics of FIGS. 16 and 16A.

In FIG. 1B, first seal end 14 is parallel to the viewing plane (i.e. to the third angle projection plane). Ramp section 48CW, which is angled with respect to first seal end 14 (as can be seen in FIGS. 1A and 1C), therefore appears foreshortened in FIG. 1B. In this foreshortened view, it can be seen that ramp section 48CW slopes away from the seal dynamic surface 51. As shown in FIG. 1B, it is preferred that the sloping nature of ramp section 48CW be a compound curve, comprised of a primary curve 52 and a secondary curve 54, which are preferably tangent to one another at a tangency location T55. One example of construction of the aforementioned compound curve is shown schematically in FIGS. 16 and 16A; this method automatically adjusts the curvature of primary curve 52 to maintain the same rate of convergence against the shaft over a family of different seal diameters that are sized to fit varying equipment envelope constraints. Ramp section 48CW is a part of multi-function edge 46CW. Multi-function edge 46CW preferably extends from Section D-D to Section F-F as shown in FIG. 1B. In any case, regardless of the extent of multi-function edge 46CW, clockwise wave 42CW and counter-clockwise wave 42CCW would remain in abutting relation at the location of the shared geometry of the elongated dimple 40—except in cases where there are a different number of clockwise waves than counter-clockwise waves.

Primary curve 52, which is preferably substantially tangent to the seal dynamic surface 51, controls the rate of convergence that the ramp section 48CW (and to a certain extent, dimple fillet 50CW) of dynamic lip 4 have with the relatively rotatable surface 5, as viewed in the circumferential direction. The rate of convergence is a critical aspect of hydrodynamic performance because it controls the rate of increase in contact pressure (known as DPDX) in the circumferential direction between dynamic lip 4 and the relatively rotatable surface 5.

Because the dimple fillet 50CW of the elongated dimple 40 is tangent to the ramp section 48CW and to the dimple flank 49, the curvature of the ramp section 48CW is one of the three main factors controlling the installed convergence of the elongated dimple 40 with the relatively rotatable surface 5. The other two of the three main factors are the rate and extent of the variation in the variable curvature of the dimple fillet 50CW and 50CCW and the rate of variation in the variable curvature of the dimple flank 49, which subjects are described in more detail below.

It can be appreciated that the circumferential length of clockwise wave 42CW must necessarily vary across a family of seal diameters because the same length will not divide evenly into every seal circumference. This wave length variation also occurs in prior art sine wave seals (becoming more acute with smaller diameter seals. In the prior art seals, the wave length variation affects the rate of convergence between the seal and the relatively rotatable surface. For additional information on the changing convergence of prior art seals as a function of wave length, see U.S. Pat. No. 6,382,634. The ability of the present invention to hold the rate of convergence constant over a range of seal diameters is a fundamental improvement over the prior art. This ability is discussed in more detail in conjunction with FIGS. 16-16C.

Primary curve 52 may take any suitable form for producing hydrodynamic wedging without departing from the spirit or scope of the invention, such as a radius (including an infinitely sized radius; e.g. a straight line), a portion of an ellipse, a portion of a sine wave curve, a portion of a parabolic curve, a portion of a cycloid curve, a portion of witch/versiera curves, a combination of curves, a combination of curves and straight lines, etc.

The projection view of FIG. 1C and the longitudinal transverse cross-sections of FIGS. 1D, 1E and 1F show a preferred way of forming the surface configuration of the dynamic lip 4 of the present invention. Phantom lines are used in FIG. 1C to show locations of the preferred substantial tangency T56, T57, T58 and T59 between various surface portions of the dynamic lip 4.

When viewed in longitudinal transverse cross-section, such as in FIGS. 1D, 1E and 1F, the surface between dynamic exclusionary intersection 19 and T56 is preferred to be a substantially straight line, which in the uncompressed state may be either sloped or substantially parallel to the intended relatively rotatable surface 5, as desired.

When viewed in longitudinal transverse cross-section, such as in FIGS. 1D, 1E and 1F, the dimple flank 49 surface between T56 and T57 is preferably a generally convex curve. Over at least a portion of the distance between Section D-D (FIG. 1D) and Section E-E (FIG. 1E), the curve between T56 and T57 preferably increases in size non-linearly, and preferably at some point becomes an infinitely sized curve (i.e. a straight line) or becomes a curve that for practical purposes approximates a straight line over the short distances involved in a typical rotary seal. This variation in curvature of the surface between T56 and T57 is the preferred method of forming dimple flank 49, although as a simplification the curvature could be fixed instead of variable.

For example, the curve between T56 and T57 could be a radius that increases in size from 0.15" to 400.00" between Section D-D and E-E, and remains a 400" radius between Section E-E and F-F. It is to be understood that a 400.00" radius is the same as a straight line for all practical purposes, when applied over the distances between T56 and T57 that are typical to the width of a typical rotary seal dynamic lip.

The variable size aspect of the curvature between T56 and T57 provides the footprint 16 with the preferred curve-like nature of the mouth flank edges 60CW and 60CCW that are shown in FIG. 2. In the example shown in FIG. 1-1F, the generally convex curve between T56 and T57 preferably increases in size (i.e., has less and less curvature) from Section D-D to Section E-E, becoming a curve approximating a straight line at Section E-E, and remaining the same approximation of a straight line from Section E-E to Section F-F.

When viewed in longitudinal transverse cross-section, such as in FIGS. 1D, 1E and 1F, the surface between T57 and T58 (dimple fillet 50CW) is preferably a generally concave curve. Over at least a portion of the distance between Section D-D (FIG. 1D) and Section E-E (FIG. 1E), the generally concave curve between T57 and T58 preferably increases in size in a non-linear fashion, and preferably by Section E-E becomes an infinitely sized curve (i.e., a straight line) or becomes a curve that for practical purposes approximates a straight line when applied over the distances typical to the size of a typical dynamic lip 4. In the example shown in FIGS. 1-1F, the generally concave curve between T57 and T58 increases in size (i.e., has less and less curvature) from Section D-D to Section E-E, becoming a large curve approximating a straight line at Section E-E, and then remains the same size from Section E-E to Section F-F. As a simplification the curvature of dimple fillet 50CW could be fixed instead of variable.

Preferably, the size of the generally concave curve between T57 and T58 is a fraction of the size of the adjacent generally convex curve located between T56 and T57 that forms dimple flank 49. A fraction of about ⅒ to ½ appears to be very suitable, such that at any longitudinal transverse cross-section between Section D-D (FIG. 1D) and Section F-F (FIG. 1F) the curve between T57 and T58 is in the range of about ⅒ to ½ the size of the curve between T56 and T57.

The seal dynamic surface 51, at least in the seal of FIGS. 1-1D, is a region where the variable curves forming dimple fillet 50CW and dimple flank 49 preferably have become infinitely sized curves (i.e., straight lines) or have become curves that for practical purposes approximates straight lines when applied over the distances typical to the size of a typical dynamic lip 4.

When viewed in the longitudinal transverse cross-sections of FIGS. 1D, 1E and 1F, multi-function edge 46CW preferably has a generally convex curve-like profile between the locations of substantial tangency T58 and T59. One functional objective of the curve-like profile is to help achieve a gradually converging relationship between dynamic lip 4 and relatively rotatable surface 5 to serve as a hydrodynamic inlet for promoting hydrodynamic wedging activity in the counter-clockwise direction of relative rotation between dynamic lip 4 and relatively rotatable surface 5. Another objective is to create an elevated contact pressure zone 62CW within footprint 16 (see FIG. 2) that serves to divert lubricant toward dynamic exclusionary intersection 19 in the opposite direction of rotation. Multi-function edge 46CW is sized to produce the desired level of contact pressure within elevated contact pressure zone 62CW of the footprint 16. If desired, the size of the curve-like profile of multi-function edge 46CW may vary along the length thereof for management of contact pressure within elevated contact pressure zone 62CW of the footprint 16, which influences torque, hydrodynamic in-pumping in one direction of relative rotation, and influences lubricant film diversion in the opposite direction of relative rotation. For example, if it is desired to reduce the magnitude of the elevated contact pressure zone 62CW of the footprint 16 in order to divert less of the film of first fluid 6 toward dynamic exclusionary intersection 19 and the corresponding second footprint edge 18 and to produce less hydrodynamic leakage, the generally convex curve-like surface between T58 and T59 can increase in size over part or all the distance between Section E-E (FIG. 1E) and Section F-F (FIG. 1F). In the example shown in FIGS. 1-1F, the generally convex curve-like surface between T58 and T59 increases in size (i.e., has less and less curvature) between Section E-E and Section F-F; in FIG. 1C note the diverging nature of T58 and T59 as a result of the change in curvature.

The aforementioned curves between T56 and T57, between T57 and T58, and between T58 and T59 can be any suitable form of curve, or portion of a curve or combinations thereof, or a combination of curves and straight lines (e.g., infinitely sized curves). For example, the curves could be selected from the group of curves that include circles, ellipses, sine waves, parabolic curves, cycloid curves, and witch/versiera curves. However, in the example shown in FIGS. 1-1F, the curves between T56 and T57, between T57 and T58, and between T58 and T59 are illustrated as radiuses.

Description of FIGS. 2-2B

FIG. 2 shows a flat development of the interfacial contact footprint 16 of two complete waves of the dynamic lip 4 of the seal 2 of FIGS. 1-1F when installed against a relatively rotatable surface 5. The clockwise and counter-clockwise references on FIG. 2 are oriented as if one were looking at a footprint imprint left on the relatively rotatable surface 5 (rather than looking at dynamic lip 4).

As described previously in conjunction with FIG. 1, footprint 16 has a first footprint edge 17 and a second footprint edge 18. When the dynamic exclusionary intersection 19 of dynamic lip 4 is compressed against a relatively rotatable surface 5, the generally circular second footprint edge 18 is produced that is substantially aligned with the potential directions of relative rotation, and therefore second footprint edge 18 does not generate a hydrodynamic wedging action with the second fluid 7 in response to relative rotation, and thereby functions to exclude second fluid 7 from footprint 16 per the teachings of commonly assigned U.S. Pat. No. 4,610,319.

FIG. 2 also incorporates a contour-type mapping of the relative magnitude of interfacial contact pressure within the footprint 16. The contact pressure shown by the contours of FIG. 2 was established via finite element analysis, with a simulated axial spring load of 15 pounds per square inch ("psi") applied via a washer (for prevention of skewing, as described in SPE/IADC Paper No. 37627). Per the pressure contours in FIG. 2, the highest contact pressure occurs at peak pressure locations 64CW and 64CCW, and the lowest contact pressure occurs along first footprint edge 17. The footprint shape and contact pressure contours remain about the same as shown in FIG. 2 at various simulated temperatures that are within the operating range of typical sealing materials.

Elevated contact pressure zones 62CW and 62CCW, which are oppositely skewed with respect to the potential directions of relative rotation, are produced by the compression of multi-function edges 46CW and 46CCW of dynamic lip 4 against a relatively rotatable surface 5. The reason that the contact pressure is elevated at elevated contact pressure zones 62CW and 62CCW is due to classical compression edge effects, the cross-sectional shape of multi-function edges 46CW and 46CCW, and the unavoidable compression of some of the seal material located between multi-function edges 46CW and 46CCW and first seal end 14.

Elevated contact pressure zones 62CW and 62CCW are designed to have a gradual enough rate of contact pressure rise in the circumferential direction to allow at least some lubricant to pass through them during both clockwise and counter-clockwise relative rotation.

First footprint edge 17 has mouth flank edges 60CW and 60CCW that are produced by the compression of dimple flank 49 against a relatively rotatable surface 5. At least a portion, and preferably all, of mouth flank edges 60CW and 60CCW are skewed with respect to the potential directions of relative rotation, except at tangency location T73. The skew causes one or the other of mouth flank edges 60CW and 60CCW to act as a hydrodynamic inlet in either direction of relative rotation. The compression of dimple flank 49 against a relatively rotatable surface 5 produces a contact pressure that rises gradually in the circumferential direction, as can be seen by the contact pressure contours in FIG. 2.

First footprint edge 17 preferably has circumferentially projecting edges 66CW and 66CCW that extend circumferentially past/beyond reentrant footprint edges 68CW and 68CCW, respectively. Circumferentially projecting edges 66CW and 66CCW are produced by the compression of ramp sections 48CW and 48CCW, respectively, against a relatively rotatable surface 5. Reentrant footprint edges 68CW and 68CCW are produced by compression of dimple flank 49 and dimple fillet 50CW and 50CCW against a relatively rotatable surface 5.

Conceptually, footprint 16 can be divided into clockwise footprint wave zone 70CW, counter-clockwise footprint wave zone 70CCW, and generally circular sealing band 44, which are delineated by dashed delineation line 72, which is tangent to the first footprint edge 17 at tangency location T73. Clockwise footprint wave zone 70CW corresponds to clockwise wave 42CW of dynamic lip 4, and is the result of compression of a portion of the clockwise wave 42CW against relatively rotatable surface 5. Likewise, counter-clockwise footprint wave zone 70CCW corresponds to counter-clockwise wave 42CCW of dynamic lip 4, and is the result of compression of a portion of the counter-clockwise wave 42CCW against relatively rotatable surface 5. Generally circular sealing band 44 is the generally circular region of footprint 16 that is located between dashed delineation line 72 and second footprint edge 18 (i.e., generally circular sealing band 44 is located between the second footprint edge 18 and the clockwise and counterclockwise footprint wave zones 70CW and 70CCW).

Footprint 16 has a minimum mouth width 84, and a minimum diverter width 85, which may be identical or different in size, as desired. Preferably, minimum mouth width 84 is smaller than minimum diverter width 85, for reasons that are discussed in conjunction with FIG. 2C.

The surface of relatively rotatable surface 5 is wetted by the first fluid 6, which is preferably a liquid oil-type lubricant. As clockwise relative rotation occurs, the rotational velocity drags a thin film of first fluid 6 past mouth flank edge 60CW, reentrant footprint edge 68CW and circumferentially projecting edge 66CW, and into clockwise footprint wave zone 70CW of the interfacial contact footprint 16. This introduction of lubricant film causes hydrodynamic lifting force within footprint 16 that causes a slight lifting of dynamic lip 4 that eliminates most direct rubbing contact between dynamic lip 4 and relatively rotatable surface 5. Once the film is within clockwise footprint wave zone 70CW, the rotational velocity causes it to tend to travel generally circumferentially in a clockwise direction within clockwise footprint wave zone 70CW, and some of the film exits clockwise footprint wave zone 70CW by escaping past the elevated contact pressure zone 62CW and reentering the chamber 23 that is shown in FIG. 1. The elevated contact pressure zone 62CW, which is skewed with respect to the direction of relative rotation, pinches off the film thickness slightly, and causes a portion of the film that was moving circumferentially within clockwise footprint wave zone 70CW to be urged into generally circular sealing band 44, and toward the generally circular second footprint edge 18. Once the film enters generally circular sealing band 44, it is displaced by more lubricant entering generally circular sealing band 44, and travels more or less in a spiral, exiting footprint 16 past second footprint edge 18. The result is a net leakage of first fluid 6 into the second fluid 7, and lubrication of the generally circular sealing band 44. This migration of first fluid 6 into the second fluid 7 provides a flushing action that helps to remove any contaminant particulates that might be present within footprint 16, and helps to prevent migration of contaminants toward the chamber 23. The magnitude of the leakage and flushing action can be varied from small to large by changing parameters of the seal geometry, such as changing the curvature of primary curve 52 to change convergence between the dynamic lip 4 and the relatively rotatable surface 5 at the elongated dimple 40.

The diversion action ensures lubrication of the mating surfaces of the seal 2 and relatively rotatable surface 5 over the entire interfacial contact footprint 16 during rotation, even during conditions where the pressure of the first fluid 6 may be hundreds or even thousands of pounds per square inch higher than that of the second fluid 7.

The clockwise relative rotation also drags a thin film of first fluid 6 past the elevated contact pressure zone 62CCW, and into counter-clockwise footprint wave zone 70CCW. Once the film is within the counter-clockwise footprint wave zone 70CCW, the rotational velocity causes it to tend to travel generally circumferentially in a clockwise direction until it exits counter-clockwise footprint wave zone 70CCW at the mouth flank edge 60CCW, reentrant footprint edge 68CCW and circumferentially projecting edge 66CCW. This generally circumferential travel of the film within counter-clockwise footprint wave zone 70CCW provides excellent lubrication of counter-clockwise footprint wave zone 70CCW without adding appreciably to seal torque.

An immutable law of physics is that two different objects cannot occupy the same space at the same time. Over the entire circumferential length of counter-clockwise footprint wave zone 70CCW, the presence of a generally circumferentially traveling film within counter-clockwise footprint wave zone 70CCW minimizes or prevents any side leakage from generally circular sealing band 44 into counter-clockwise footprint wave zone 70CCW, and thereby minimizes or prevents side leakage into the first fluid 6 within chamber 23, and thereby helps to preserve sufficient film thickness within generally circular sealing band 44 to assure adequate lubrication.

Because of the generally circumferential travel of film within counter-clockwise footprint wave zone 70CCW during clockwise relative rotation, a constant flushing action takes place within counter-clockwise footprint wave zone 70CCW, which transfers seal-generated heat from footprint 16 into the main volume of the first fluid 6 within chamber 23. This helps to maintain the temperature of dynamic lip 4 closer to that of the temperature of the first fluid 6.

In an interference-type seal, such as illustrated in FIGS. 1-1F, the regions of elevated contact pressure zones 62CW and 62CCW that approach the closest to second footprint edge 18 are also in a region that is directly in line with the compressive force resulting from contact between static sealing surface 20 and peripheral wall 11. Therefore, there is a tendency for the magnitude of contact pressure within elevated contact pressure zones 62CW and 62CCW to increase in the portions thereof that are closest to second footprint edge 18. The preferred variable curvature size of the multi-function edges 46CW and 46CCW shown in FIG. 1A helps to control the magnitude of contact pressure within the portions of elevated contact pressure zones 62CW and 62CCW that are closest to second footprint edge 18. As a simplification, the curvature of the multi-function edges 46CW and 46CCW can be fixed, rather than variable. In FIG. 1B, which is a line drawing of the seal shown in FIG. 1A, the curvature of the multi-function edges 46CW and 46CCW varies sinusoidally from a minimum size at Section E-E to a maximum size at Section F-F. The curvature of multi-function edges 46CW and 46CCW also varies in FIG. 3B, but as a simplification does not vary in FIGS. 3, 3A, 14 and 15.

In regard to the first fluid 6 that enters clockwise footprint wave zone 70CW during clockwise relative rotation, the lower the contact pressure within elevated contact pressure zone 62CW, the less of first fluid 6 will be diverted toward second footprint edge 18, and the lower the hydrodynamic leak rate of the first fluid 6 into the second fluid 7. However, in regard to the first fluid 6 that enters counter-clockwise footprint wave zone 70CCW during clockwise relative rotation, the lower the contact pressure within elevated contact pressure zone 62CCW, the more of first fluid 6 will enter the counter-clockwise footprint wave zone 70CCW.

In general, it is desirable from a torque reduction standpoint to design the hydrodynamic in-pumping ability of the elongated dimple 40 to be as aggressive as possible, bringing as much lubricant as possible into footprint 16, and to design elevated contact pressure zones 62CW and 62CCW to be only as aggressive as necessary to divert sufficient film across generally circular sealing band 44 to provide adequate lubrication for the contemplated operating conditions. The variable curvature size of the multi-function edges 46CW and 46CCW that are shown in FIGS. 1A, 1B and 3B helps to control the magnitude of film diversion by removing seal material from compression to control the magnitude of interfacial contact pressure within elevated contact pressure zones 62CW and 62CCW.

Counter-clockwise footprint wave zone 70CCW is preferably a mirror image of clockwise footprint wave zone 70CW for identical function in the opposite direction of rotation compared to that of clockwise footprint wave zone 70CW.

During counterclockwise relative rotation, the same hydrodynamic lubrication activity occurs as described above but in a counter-clockwise direction. In other words, the functions of clockwise footprint wave zone 70CW and counter-clockwise footprint wave zone 70CCW are swapped when the direction of rotation is reversed.

In the seals that are described in U.S. Pat. No. 5,230,520 and manufactured commercially by Kalsi Engineering, any lubricant that is hydrodynamically wedged into the dynamic interfacial contact footprint (e.g. the dynamic sealing interface) has to cross a location of relatively high contact pressure that is the result of compression "edge effects." When the contact pressure is graphed, this high contact pressure appears like a wavy ridge that runs along the lubricant edge of the footprint.

In the present invention, lubricant that is hydrodynamically wedged into the interfacial contact footprint 16 at the elongated dimple 40 does not have to cross a ridge-like location of high contact pressure because the elongated dimple 40, and especially the dimple fillet 50CW and 50CCW thereof, can be easily shaped to produce a very gradual convergence with the relatively rotatable surface 5 to manage the magnitude and profile of the contact pressure, preventing a contact pressure ridge, and thereby achieving great hydrodynamic wedging efficiency.

The low torque provided by the present invention results in less self-generated heat which helps to minimize temperature related loss of modulus in the seal material. This helps to make the seal more extrusion resistant and less prone to classical "nibbling" or "extrusion damage," as borne out in comparative testing. Since extrusion damage can promote abrasive ingestion, and can also interrupt the lubricant film near the circular exclusionary geometry and cause additional friction and wear, the reduced torque provided by the present invention contributes significantly to longer seal life in adverse operating conditions.

In some equipment (such as oilfield downhole drilling mud motor sealed bearing assemblies), relatively high shaft deflection and other factors permit significant radial motion between the shaft and the seal housing, leading to accelerated extrusion damage. The increased extrusion resistance of the present invention will help to prolong seal life of such equipment. The increased lubrication of the present invention also helps to permit the high level of initial compression that is necessary to accommodate high levels of radial motion between the shaft and the seal housing.

In low differential pressure, un-cooled laboratory tests with an ISO 32 viscosity grade lubricant, seals constructed in accordance with the present invention had about half the torque of prior art seals constructed in accordance with FIG. 2 of U.S. Pat. No. 5,230,520, and were able to rotate twice as fast as the prior art seals before critical self-generated temperature was reached. The seals were tested on separate portions of the same shaft, with the same runout, and the same seal housing, with no cooling other than a stagnant room temperature air environment.

The design methodology for constructing the geometry of dynamic lip 4 that is described above in conjunction with FIGS. 1-1F is extremely flexible and can be easily modified to produce desired variations in footprint shape and contact pressure profile.

For example, the shape of footprint 16 shown in FIG. 2A can be achieved by causing the elongated dimple 40 to extend over a longer circumferential distance. For another example, the shape of footprint 16 in FIG. 2B can be achieved by having less curvature in primary curve 52, and having primary curve 52 extend over a longer circumferential portion of the clockwise wave 42CW or counter-clockwise wave 42CCW.

For maximum lubrication, the shape of footprint 16 in FIG. 2 is preferred to that of the footprint 16 in FIG. 2A because portions of the mouth flank edges 60CW and 60CCW (formed by the dimple flank 49 of elongated dimple 40) in FIG. 2A are nearly circumferentially oriented, and therefore will generate little or no hydrodynamic lubrication and are also not optimum for preventing side leakage of film.

For maximum lubrication, the shape of footprint 16 in FIG. 2 is also preferred to that of the footprint 16 in FIG. 2B. With the footprint 16 shown in FIG. 2, as the first fluid 6 that is wetting the surface of the relatively rotatable surface 5 impacts the edge of the footprint 16 at reentrant footprint edges 68CW or 68CCW, the first fluid 6 is more likely to enter the footprint 16 than it is to slip around circumferentially projecting edges 66CW or 66CCW because in order to slip around circumferentially projecting edges 66CW or 66CCW, the first fluid 6 would have to travel in a direction opposed to the direction of relative rotation. With the footprint 16 that is shown in FIG. 2B, any fluid slipping around the footprint 16 (instead of entering it) would still be traveling in the direction of relative rotation. Therefore, it is more likely that fluid will enter the footprint 16 shown in FIG. 2, compared to the footprint 16 shown FIG. 2B.

As previously stated, reentrant footprint edges 68CW and 68CCW are produced by compression of dimple flank 49 and dimple fillet 50CW and 50CCW against relatively rotatable surface 5. Preferably, dimple fillet 50CW and 50CCW are produced by projections on a mold that are subject to in-service wear. As the mold projections wear, the shape of footprint 16 will slowly change from that of FIG. 2 and eventually become more like that of FIG. 2B. The depth of dimple fillet 50CW and 50CCW is selected to maximize mold service life so that the mold will continue, over a long period of time, to produce seals that have a compressed footprint that has the desired reentrant footprint edges 68CW and 68CCW.

Figure 2C:
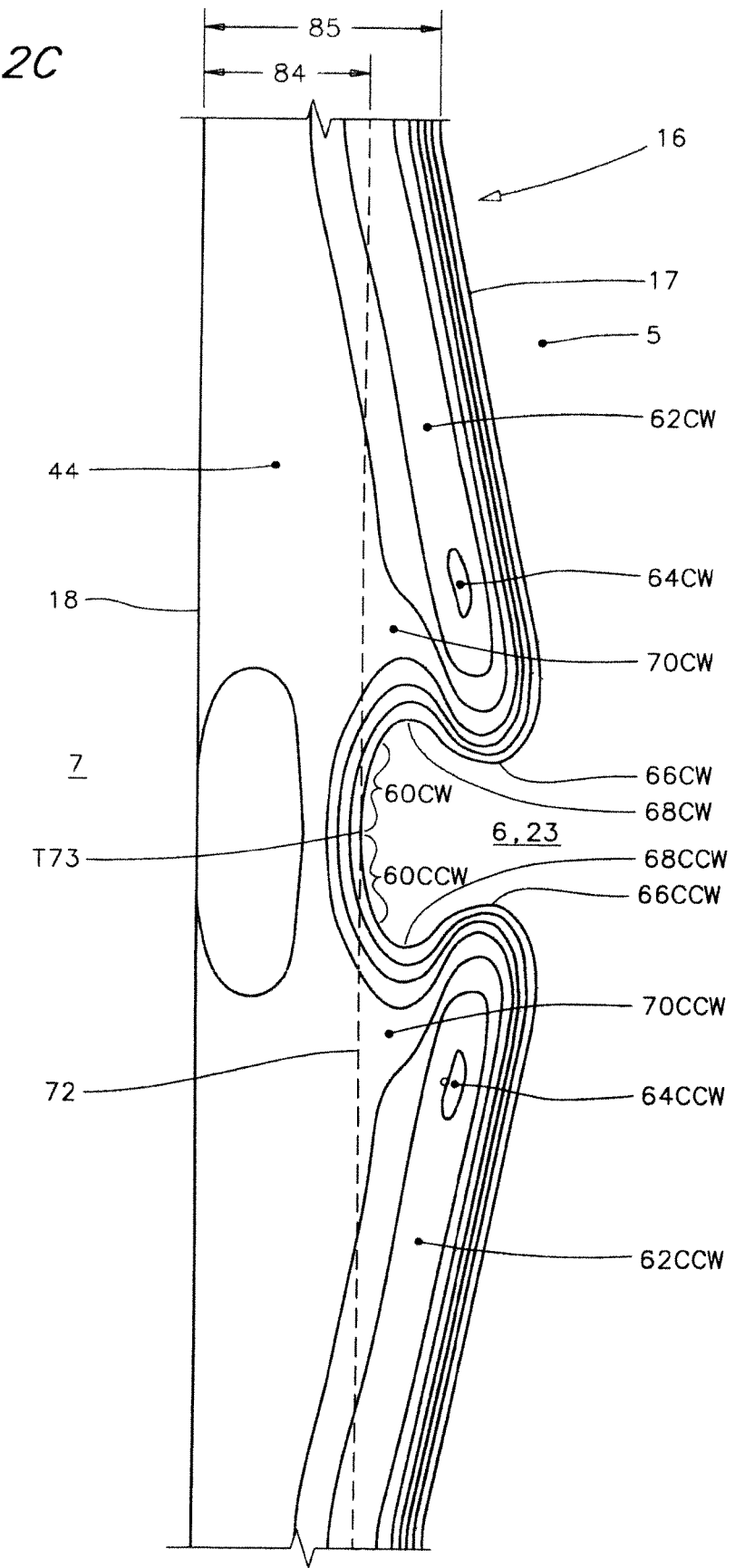
FIG. 2C is a view similar to FIG. 2 and shows a modified minimum diverter width and angle of elevated contact pressure zones to improve lubrication and reduce leakage.

In FIG. 2C, relatively rotatable surface 5, first footprint edge 17, second footprint edge 18, chamber 23, mouth flank edges 60CW and 60CCW, peak pressure locations 64CW and 64CCW, reentrant footprint edges 68CW and 68CCW, clockwise and counterclockwise footprint wave zones 70CW and 70CCW, and dashed delineation line 72 are labeled for orientation purposes. FIG. 2C shows a footprint 16 that is in all respects identical to FIG. 2, except that the size of minimum diverter width 85 is wider in FIG. 2C. If minimum mouth width 84 and minimum diverter width 85 were identical in size, more of the portions of elevated contact pressure zone 62CW and 62CCW that are located near minimum diverter width 85 would be within generally circular sealing band 44, and would therefore be more difficult to lubricate. By making minimum diverter width 85 larger than minimum mouth width 84, very little of elevated contact pressure zones 62CW and 62CCW lies within the more difficult to lubricate generally circular sealing band 44. By making minimum diverter width 85 larger than minimum mouth width 84, almost all of elevated contact pressure zones 62CW and 62CCW are lubricated very well because they are circumferentially in line with the hydrodynamic inlets that are formed between tangency location T73 and circumferentially projecting edges 66CW and 66CCW, respectively. The size ratio of minimum mouth width 84 and minimum diverter width 85 can also be used to manipulate the flushing rate of the seal. The closer that the size of the minimum diverter width 85 is to that of the minimum mouth width 84, the higher the flush rate of the first fluid 6 into the second fluid 7. The larger the size of the minimum diverter width 85 relative to the minimum mouth width, the lower the flush rate of the first fluid 6 into the second fluid 7.

Figure 3:
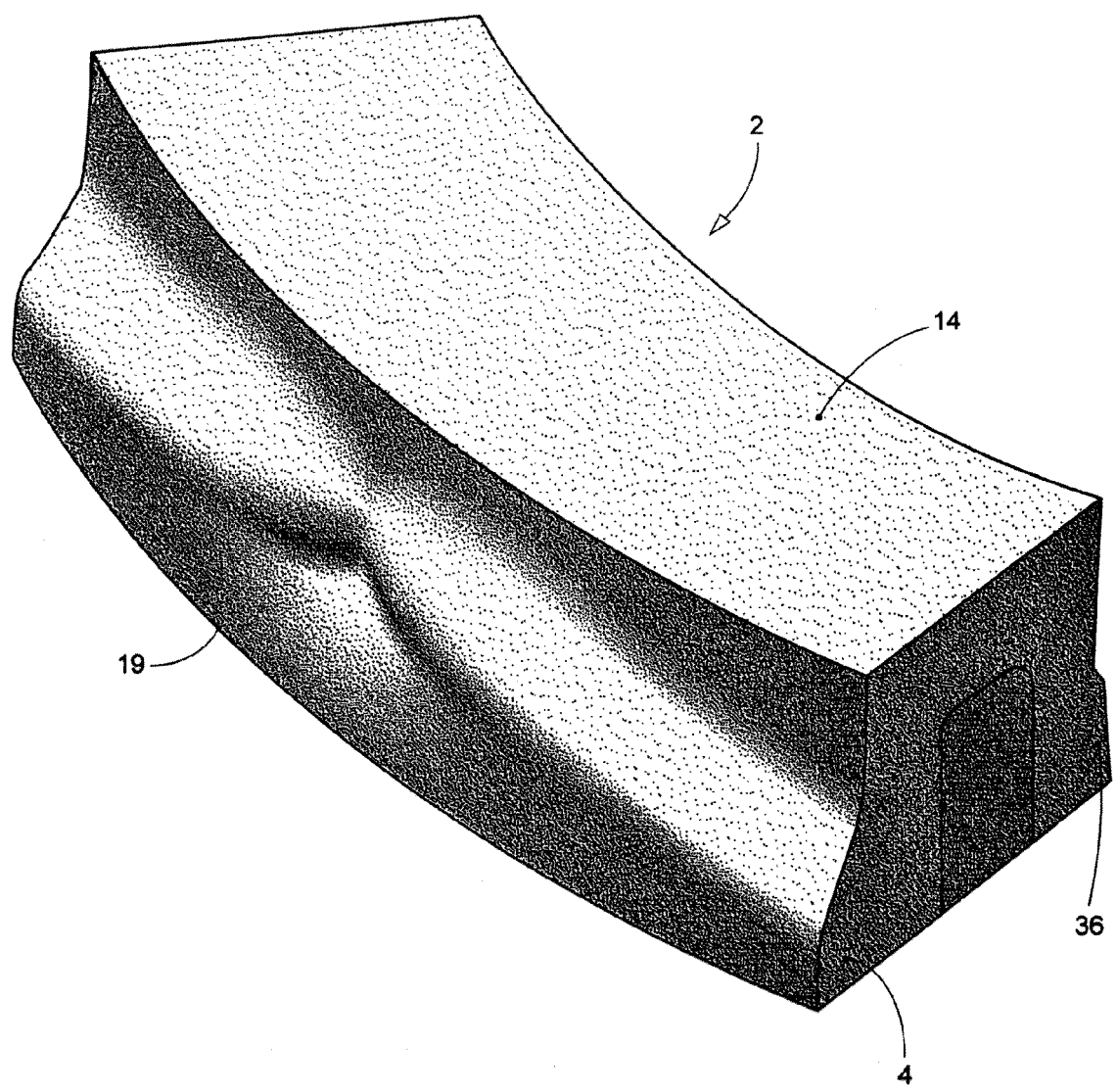
FIG. 3 is an enlarged fragmentary shaded perspective view of the hydrodynamic seal in an uncompressed state and configured for compression in a radial direction for sealing against a relatively rotatable surface of internal cylindrical form, such as a housing bore.
Figure 3A:
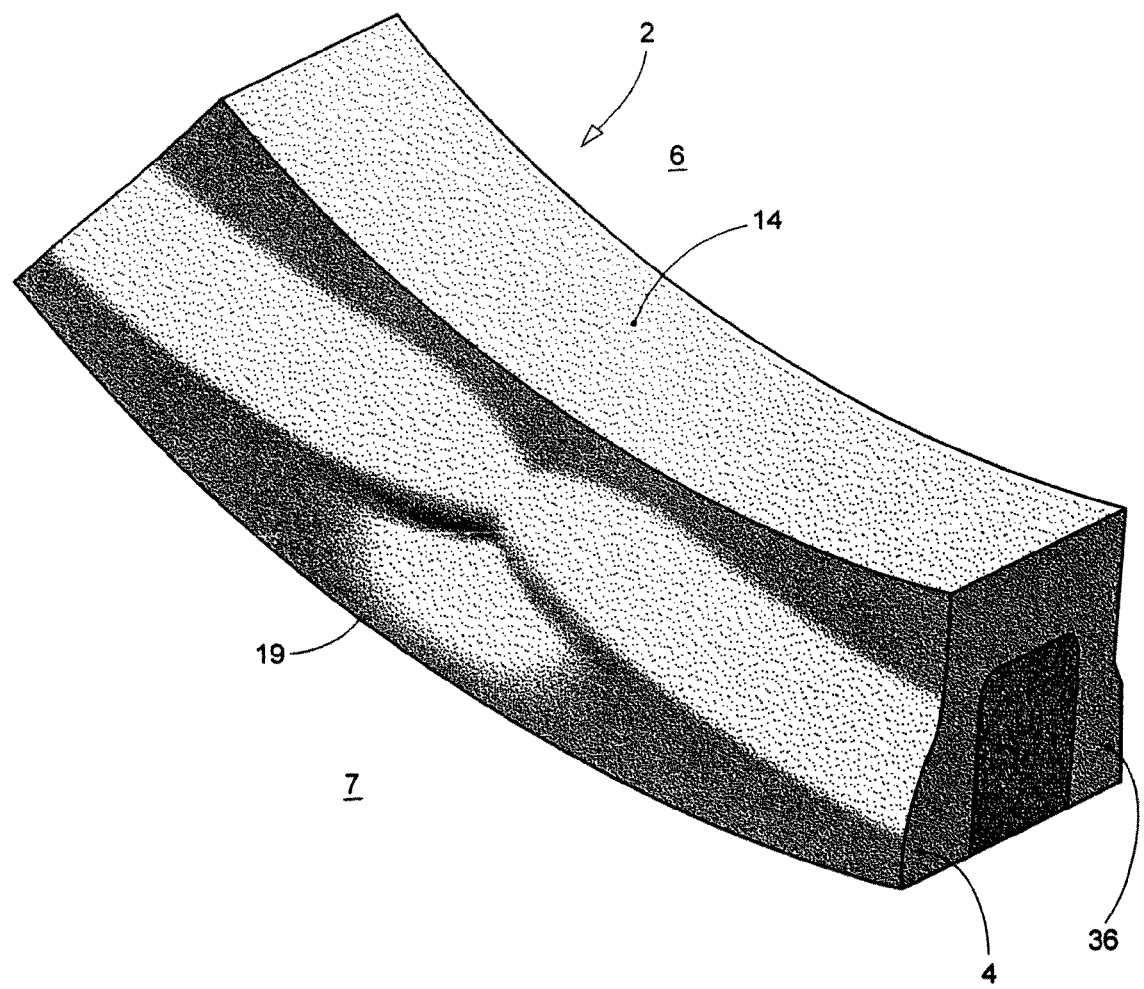
FIGS. 3A and 3B are fragmentary shaded perspective views of hydrodynamic seals in an uncompressed state and configured for compression in an axial direction for sealing against a relatively rotatable surface of substantially planar form, such as a shoulder of a shaft or housing.
Figure 3B:
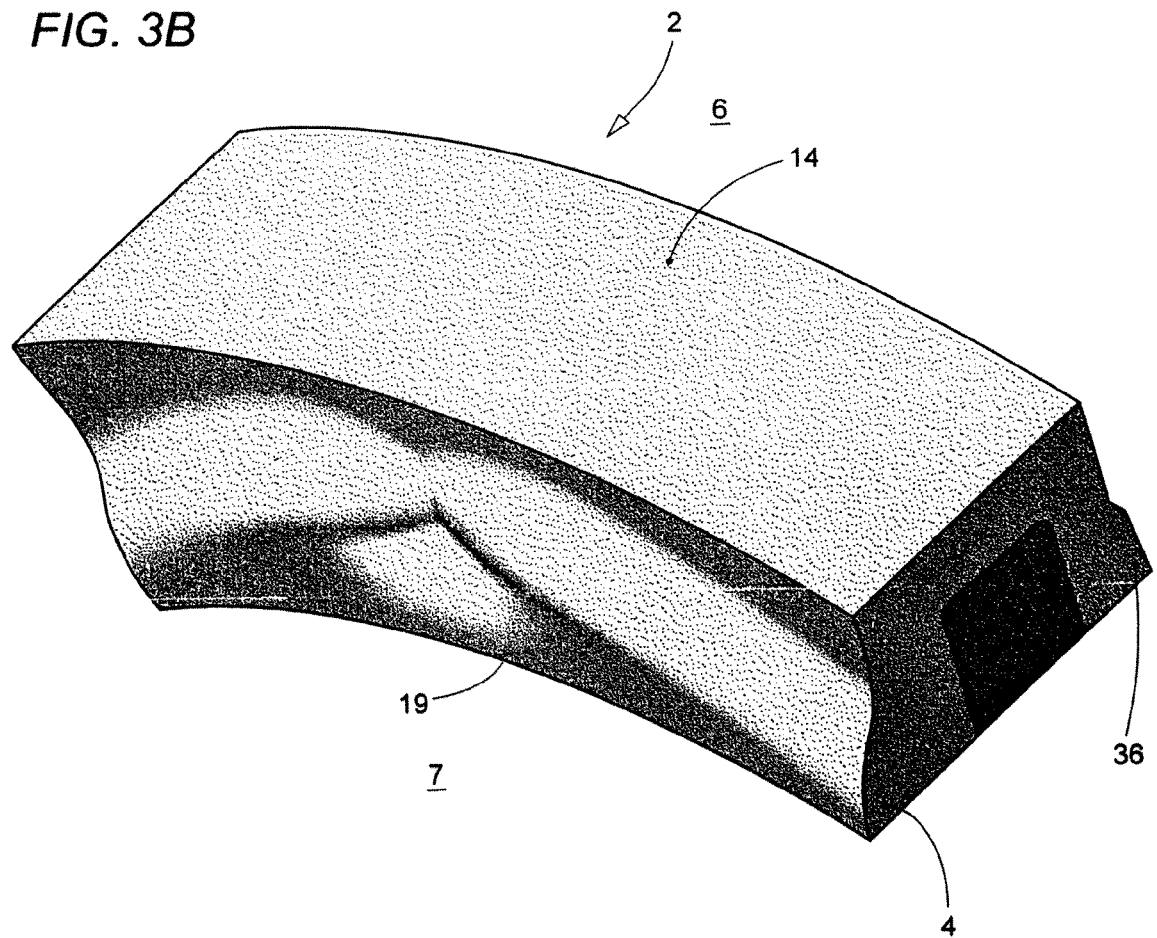

Description of FIGS. 3-3B

FIG. 3 is a fragmentary view of an uninstalled seal 2 as configured (by twisting or manufacture) for being compressed in a radial direction for sealing against a relatively rotatable surface of internal cylindrical form, such as a housing bore. Dynamic lip 4 is an outwardly oriented feature, and projecting static sealing lip 36 is a generally inwardly oriented feature. Dynamic lip 4 is larger in diameter than projecting static sealing lip 36. The first seal end 14 may have a substantially planar configuration as shown. Dynamic exclusionary intersection 19 is labeled for orientation purposes.

FIGS. 3A and 3B are fragmentary views of uninstalled seal 2 as configured (by twisting or manufacture) for being compressed in an axial direction for sealing against a relatively rotatable surface of substantially planar form (such as a shoulder of a shaft or housing), and clearly illustrate that the present invention may also be used in face-sealing arrangements. Dynamic lip 4 and projecting static sealing lip 36 are both generally axially oriented features. In FIG. 3A the dynamic exclusionary intersection 19 is positioned for having the second fluid 7 outside of dynamic lip 4, and for having first fluid 6, i.e. a lubricating fluid, toward the inside of dynamic lip 4. In FIG. 3B, the dynamic exclusionary intersection 19 is positioned for having the second fluid 7 inside of dynamic lip 4, and for having first fluid 6, i.e. a lubricating fluid, toward the outside of dynamic lip 4. The first seal end 14 may be of substantially cylindrical configuration as shown in FIGS. 3A and 3B. In FIG. 3A, the first seal end 14 forms the inner-most surface of the seal, and in FIG. 3B the first seal end 14 forms the outermost surface of the seal.

Description of FIGS. 4-9

FIGS. 4-9 are cross-sectional views taken at the center of the elongated dimple 40 that represent simplifications of the present invention. Several features in FIGS. 4-6 are numbered for the purpose of orienting the reader; namely: dynamic lip 4, first seal end 14, second seal end 15, dynamic exclusionary intersection 19 and static exclusionary intersection 38.

It can be appreciated that as a simplification, as shown in FIG. 4, the static sealing surface 20 of projecting static sealing lip 36 need not be sloped as shown in FIGS. 1A, 1B, 1D, 1E and 1F.

It can also be appreciated that, as a simplification, the projecting static sealing lip 36 shown in FIGS. 1A-1F can be eliminated altogether and the static sealing surface 20 is established simply by a peripheral surface of the seal that is in generally opposed relationship to the dynamic lip 4, as shown in FIG. 5.

Though the seal embodiments disclosed heretofore in FIGS. 1-5 are interference-type compressive seals that incorporate a dynamic lip 4 made from one material and an energizer 21 made from another material, such is not intended to limit the present invention in any manner whatsoever. It is intended that the hydrodynamic geometry of the dynamic lip 4 of the present invention may be adapted to various types of rotary seals, and may incorporate one or more seal materials or other components without departing from the spirit or scope of the invention.

In FIG. 6, the energizer 21 illustrated in FIGS. 1-5 has been eliminated as a simplification, leaving a void in the form of an annular recess 22 where the energizing section would otherwise be. The resulting seal is of the flexing-lip type as taught by commonly assigned U.S. Pat. No. 5,678,829. Annular recess 22 defines dynamic lip 4 and projecting static sealing lip 36 to be of the flexing lip variety. This simplification is more appropriate in applications where it is desirable to have very low interfacial contact pressure to achieve the lowest possible torque, but where exclusion of environmental abrasives is not an important concern.

The flexibility of dynamic lip 4 relieves some of the contact pressure at the interfacial contact footprint 16 between the dynamic lip 4 and the relatively rotatable surface 5 (See FIG. 1) that would otherwise occur if the seal were of the direct compression type (such as the seal of FIGS. 1-5), thereby helping to assure low torque. The flexible lip construction permits the use of relatively high modulus materials that would otherwise be unsuitable for use in a solid (ungrooved) monolithic seal due to the high interfacial contact pressure that would result with a solid seal.

The simplified seal 2 of FIG. 6 may be composed of any suitable sealing material, including elastomeric or rubber-like materials and various polymeric materials, however, it is preferred that the dynamic lip 4 be made from a reinforced material, such as a multiple ply fabric reinforced elastomer.

The seal embodiments of FIGS. 7-9 are also adapted to be received within a circular seal groove 26 and compressed between first machine component 8 and a relatively rotatable surface 5, as described above in conjunction with FIG. 1 (i.e., compressed between a peripheral wall 11 of seal groove 26 and a relatively rotatable surface 5).

In FIGS. 7-9, the energizer 21 and the annular recess 22 of FIGS. 1-5 have been eliminated as a simplification, and the seal is a solid (ungrooved) compression-type seal with a monolithic, one piece seal body 74, wherein the dynamic lip 4 and static sealing surface 20 are in generally opposed relation. With the exception of the unique hydrodynamic geometry of dynamic lip 4 of the present invention, the seal of FIGS. 7 and 8 are constructed generally in accordance with U.S. Pat. No. 5,230,520. In FIG. 7 the static sealing surface 20 is sloped. As a further simplification, the static sealing surface 20 is not sloped in FIG. 8. The sloped configuration of static sealing surface 20 in FIG. 7 increases compression and alters interfacial contact pressure distribution (compared to the seal of FIG. 8) in low differential pressure applications to reduce leakage of first fluid 6 and to improve exclusion of the second fluid 7.

FIG. 9 is a further simplification where the projecting static sealing lip 36 of FIGS. 7 and 8 has been eliminated and the static sealing surface 20 is defined by a non-projecting peripheral surface of seal 2. With the exception of the unique hydrodynamic geometry of dynamic lip 4 of the present invention, the seal of FIG. 9 is constructed generally in accordance with the teachings of U.S. Pat. No. 4,610,319.

It is preferred that the simplified seals of FIGS. 7-9 be formed from resilient material having a nominal hardness in the range of from about 70 to about 97 Durometer Shore A.

Compared to the prior art seals of single material construction, the seals of FIGS. 7-9 are better lubricated, and therefore compatible with a higher percentage of compression, and provide cooler operation, and therefore retain a relatively high modulus of elasticity for improved extrusion resistance. Description of the Alternate Embodiments of FIGS. 10-15B FIGS. 10-15A show rotary seals representing alternative embodiments of the present invention in their uncompressed state, wherein an energizer 21 is provided to spring-load the dynamic lip 4 against a relatively rotatable surface 5 (not shown). First seal end 14, which would be oriented toward the first fluid 6, is numbered for the purpose of orienting the reader. Dynamic exclusionary intersection 19 and the location of the first fluid 6 and second fluid 7 are also numbered for the purpose of orienting the reader.

Figure 10:
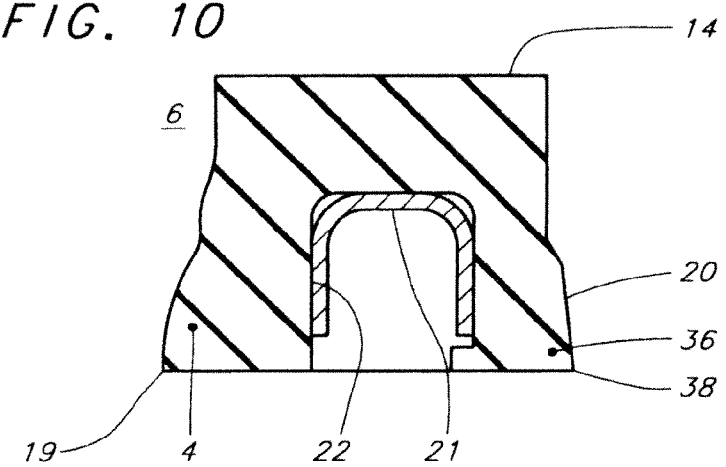
FIGS. 10, 11 and 12-12B are cross-sectional views of alternative embodiments of the hydrodynamic seal according to the present invention, the seals including a spring energizer to spring-load the dynamic lip against a relatively rotatable surface.
Figure 11:
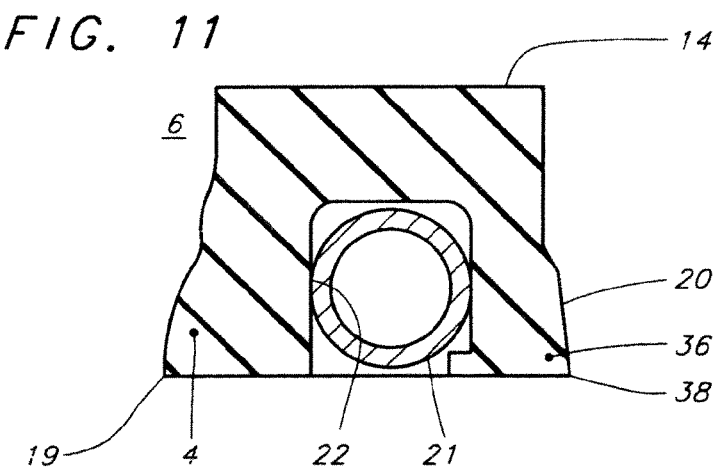

In FIGS. 10-12B, the dynamic lip 4 is made from sealing material having a modulus of elasticity, the energizer 21 is a spring having a modulus of elasticity that is greater than that used to form the dynamic lip 4, and the energizer 21 is located within annular recess 22. Springs are highly desirable for use as energizers in hydrodynamic seals because their high modulus of elasticity allows them to cause the dynamic lip 4 to follow relatively high levels of shaft deflection and runout, and because they are more resistant to high temperature compression set compared to many elastomeric energizers. In FIG. 10, the energizer 21 is a cantilever spring, in FIGS. 11 and 12B, the energizer 21 is a canted coil spring, and in FIGS. 12 and 12A, the energizer 21 is a garter spring.

The alternate embodiment of FIG. 12 shows that the region between tangency location T56 and dynamic exclusionary intersection 19 of dynamic lip 4 can be sloped if desired; in FIG. 12 this region is shown as being generally conical.

In FIGS. 10, 11, 12B and 13, the static sealing surface 20 is constructed of flexible sealing material. In FIGS. 12 and 12A, the seal 2 has a typical case 75, typical to garter spring energized, cantilever lip seals, and the static sealing surface 20 is part of the case 75. Typically, with such seal construction, the case 75 is pressed into the bore of a first machine component 8 (not shown) and the resulting interference fit (sometimes augmented by a coating such as gasket sealant) establishes a sealed relationship between static sealing surface 20 and the bore. FIG. 12 is configured for retaining a second fluid 7 having a higher pressure than the first fluid 6, while FIGS. 12A and 12B are configured for retaining a first fluid 6 having a higher pressure than the second fluid 7. In each case, the differential pressure acts interior of dynamic lip 4 to help to energize it against a mating relatively rotatable surface 5 (not shown).

The seal 2 of FIG. 13 forms a composite structure, per the teachings of U.S. Pat. No. 5,738,358, commonly assigned herewith, to help to control the hydrodynamic wedging activity by reducing the installed interfacial contact force between dynamic lip 4 and a relatively rotatable surface 5 (not shown). The dynamic lip 4 is made from a first sealing material layer having a modulus of elasticity, and the energizer 21 is made from a second sealing material layer having a modulus of elasticity that is typically less than that used to form the dynamic lip 4. For example, a 30-80 durometer Shore A elastomer could be used to form the energizer 21, and a sealing material having a hardness greater than 80 durometer Shore A could be used to form the dynamic lip 4 (such as an elastomer or a carbon-graphite reinforced PTFE plastic). Thus, the extrusion resistance at the dynamic lip 4 is controlled by its modulus of elasticity, but the interfacial contact pressure between the dynamic lip 4 and a relatively rotatable surface 5 (not shown) is controlled largely by the modulus of elasticity of the energizer 21. This provides excellent extrusion resistance and relatively low breakout and running torque. The low running torque minimizes running temperature and moderates temperature-related seal degradation. Further, the construction of FIG. 13 minimizes compression-induced distortion of the hydrodynamic geometry compared to the solid construction of FIGS. 7-9. In a seal of the type shown in FIG. 13, the interface between the materials forming the dynamic lip 4 and the energizer 21 can be of any suitable form.

It is widely understood that the higher the modulus of elasticity of the sealing material, the more resistant the seal is to high-pressure extrusion damage. In the seals of FIGS. 10-12B and the seals of other figures herein that employ an energizer, for best extrusion resistance the dynamic lip 4 is preferred to be constructed from a hard, relatively high modulus extrusion resistant material such as a flexible polymeric material, a high modulus elastomer such as one having a durometer hardness in the range of 80-97 Shore A, or a fabric, fiber or metal reinforced elastomer, or a high performance temperature-resistant plastic such as carbon-graphite reinforced PTFE, or polyester or polyimide-filled PTFE.

The seals of FIGS. 10, 11, 12B and 13 are illustrated with a static exclusionary intersection 38 and a projecting static sealing lip 36 that defines a static sealing surface 20 of sloping configuration. In FIG. 13, the energizer 21 defines the projecting static sealing lip 36 and static exclusionary intersection 38.

Figure 14:
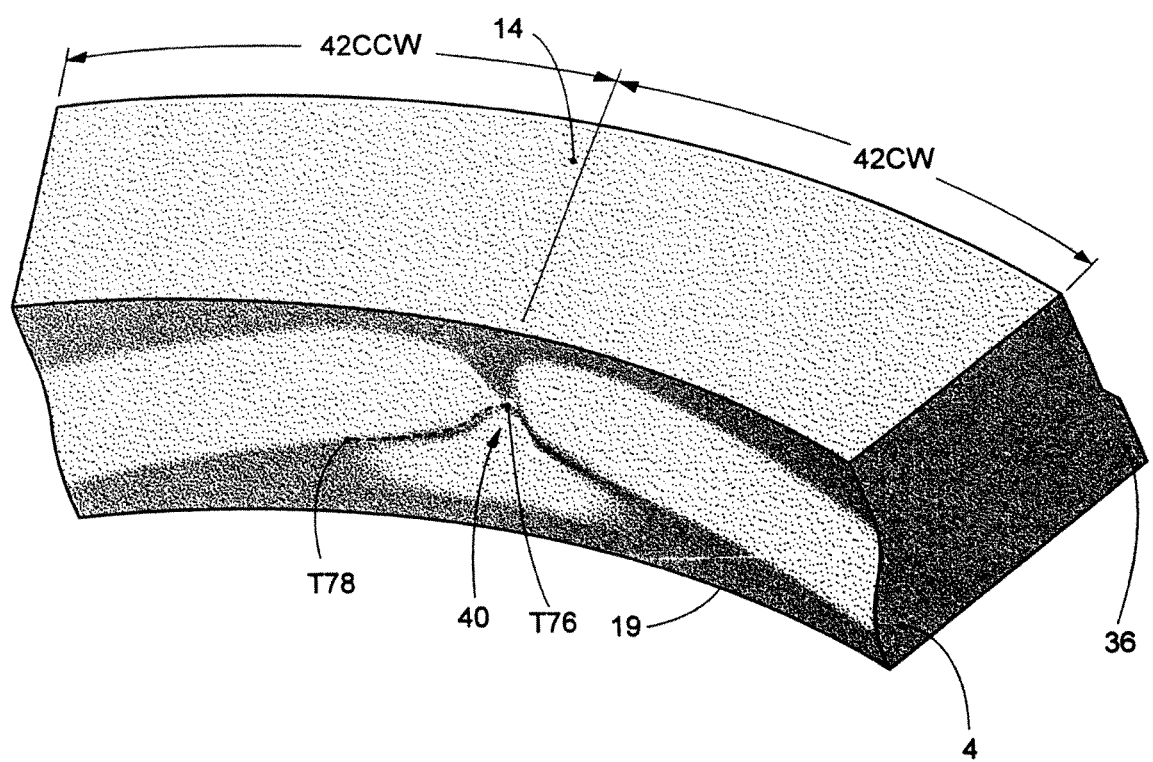
FIG. 14 is a fragmentary shaded perspective view of an alternative embodiment of the hydrodynamic seal of FIG. 1 in an uncompressed state and configured for radial compression, the view showing an elongated dimple and two complete waves of the dynamic lip, the elongated dimple being deeper for increased tolerance to thermal expansion and mold wear.

FIG. 14 shows an alternate embodiment where a compound curve (shown as a dashed line) extending from Point T78 to Point T76, and preferably made in accordance with the schematic of FIG. 16B, controls the curving shape of ramp section 48CCW (and/or ramp section 48CW) and allows the elongated dimple 40 to be deeper for increased tolerance to thermal expansion and mold wear. In FIG. 14, the dynamic lip 4, first seal end 14, dynamic exclusionary intersection 19 and projecting static sealing lip 36 are numbered to orient the reader.

Figure 15:
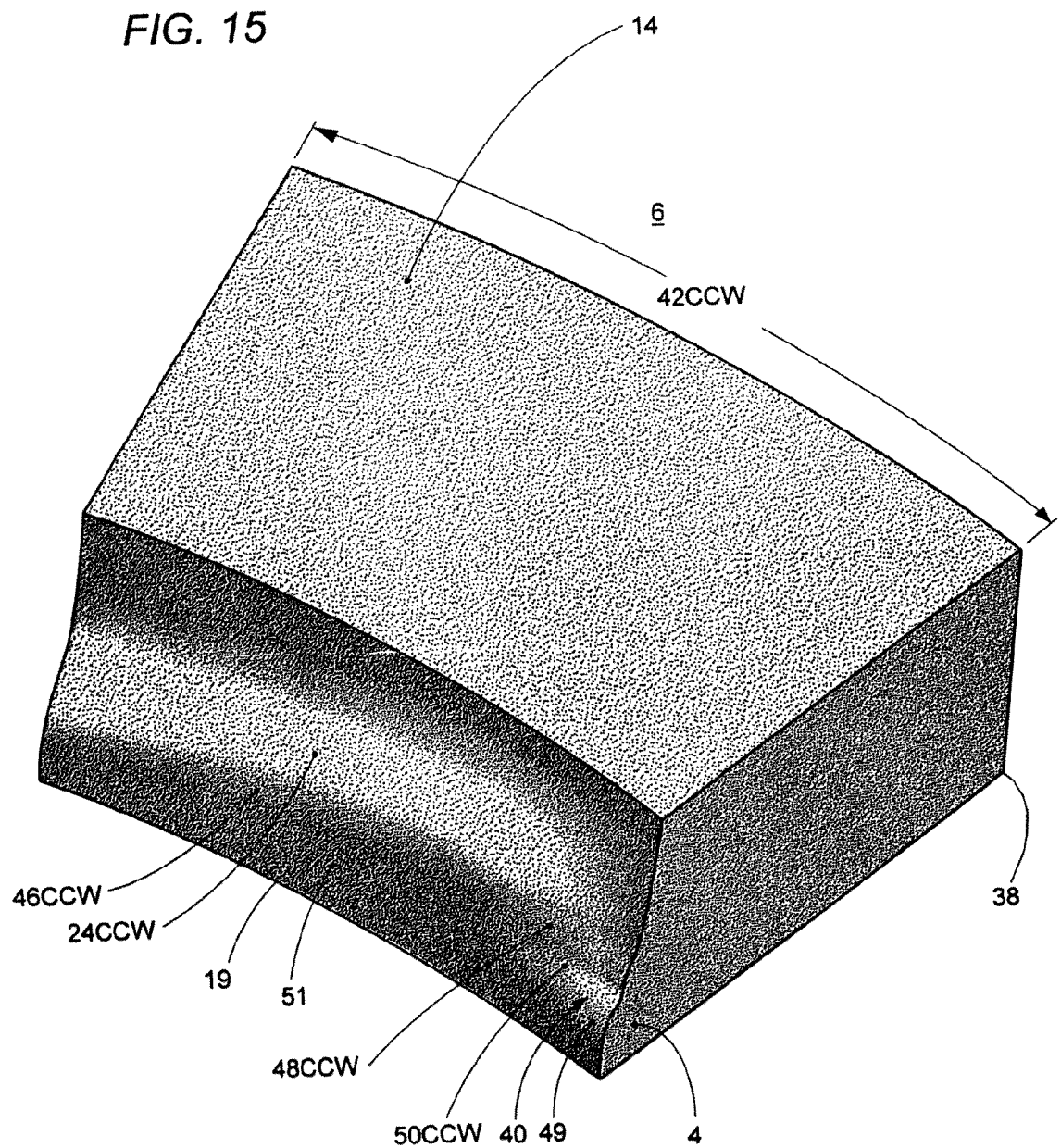
FIG. 15 is a fragmentary shaded perspective view of an alternative embodiment of the hydrodynamic seal of FIG. 1 showing a counter-clockwise wave and an elongated dimple.
Figure 15A:
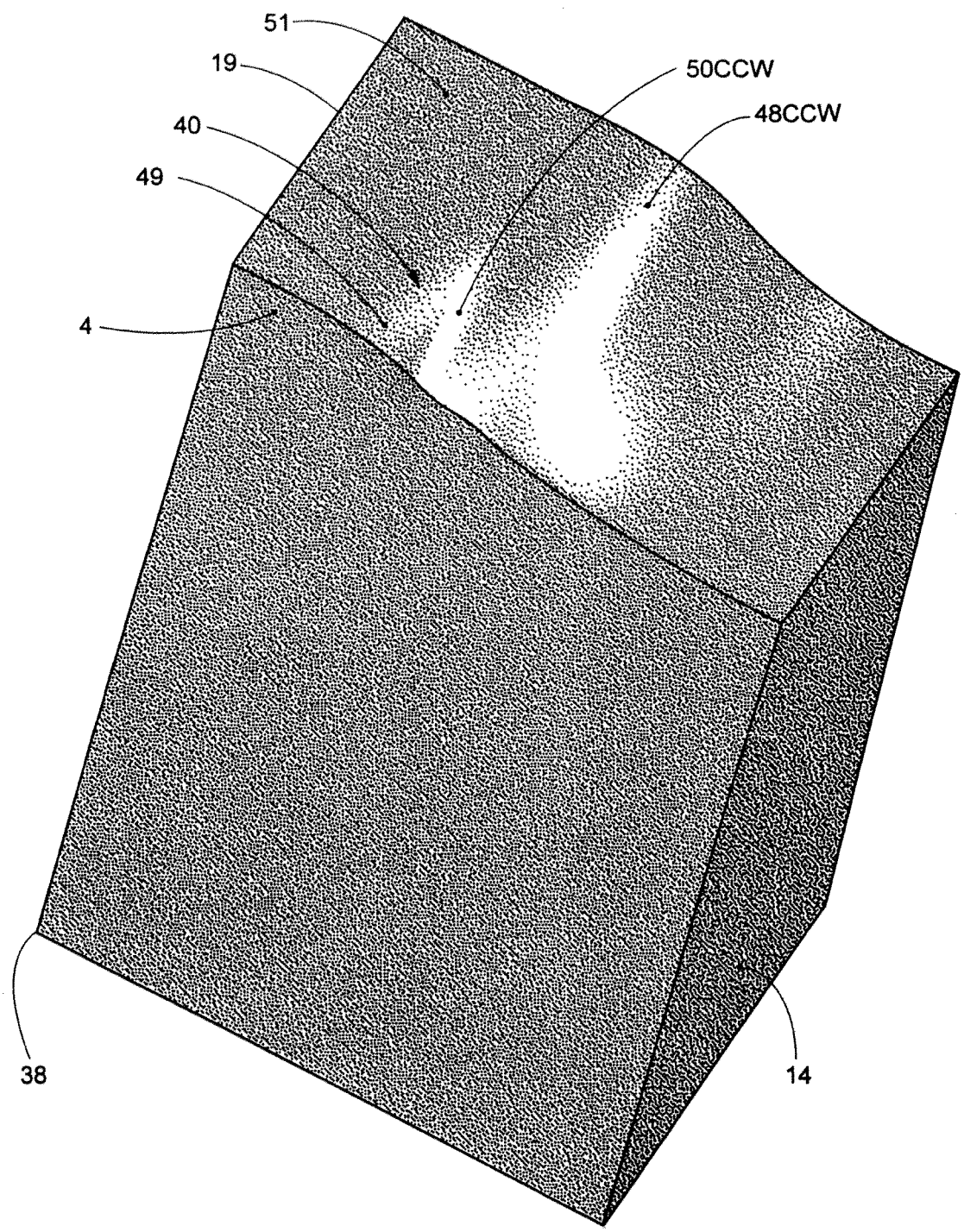
FIG. 15A is an enlarged portion of the hydrodynamic seal of FIG. 15 showing the hydrodynamic inlet portion of the wave.

FIGS. 15 and 15A are enlarged fragmentary shaded perspective views showing an alternate embodiment of an elongated dimple 40. FIG. 15 shows a complete counter-clockwise wave, and FIG. 15A is further enlarged and shows only the hydrodynamic inlet portion of that wave so that the elongated dimple 40 can be better understood. The ramp section 48CCW is circumferentially oriented, making it substantially aligned with dynamic exclusionary intersection 19, and therefore with the potential directions of relative rotation. For orientation purposes, the dynamic lip 4, static exclusionary intersection 38, first seal end 14, dimple flank 49 and dimple fillet 50CCW are labeled. As illustrated, the seal is configured for radial sealing wherein the dynamic lip 4 is oriented generally radially inward toward the theoretical centerline of the seal, and the static exclusionary intersection 38 is larger in diameter than the dynamic exclusionary intersection 19. Seal dynamic surface 51 may be slightly conical, if desired, or substantially cylindrical as shown.

Figure 15B:
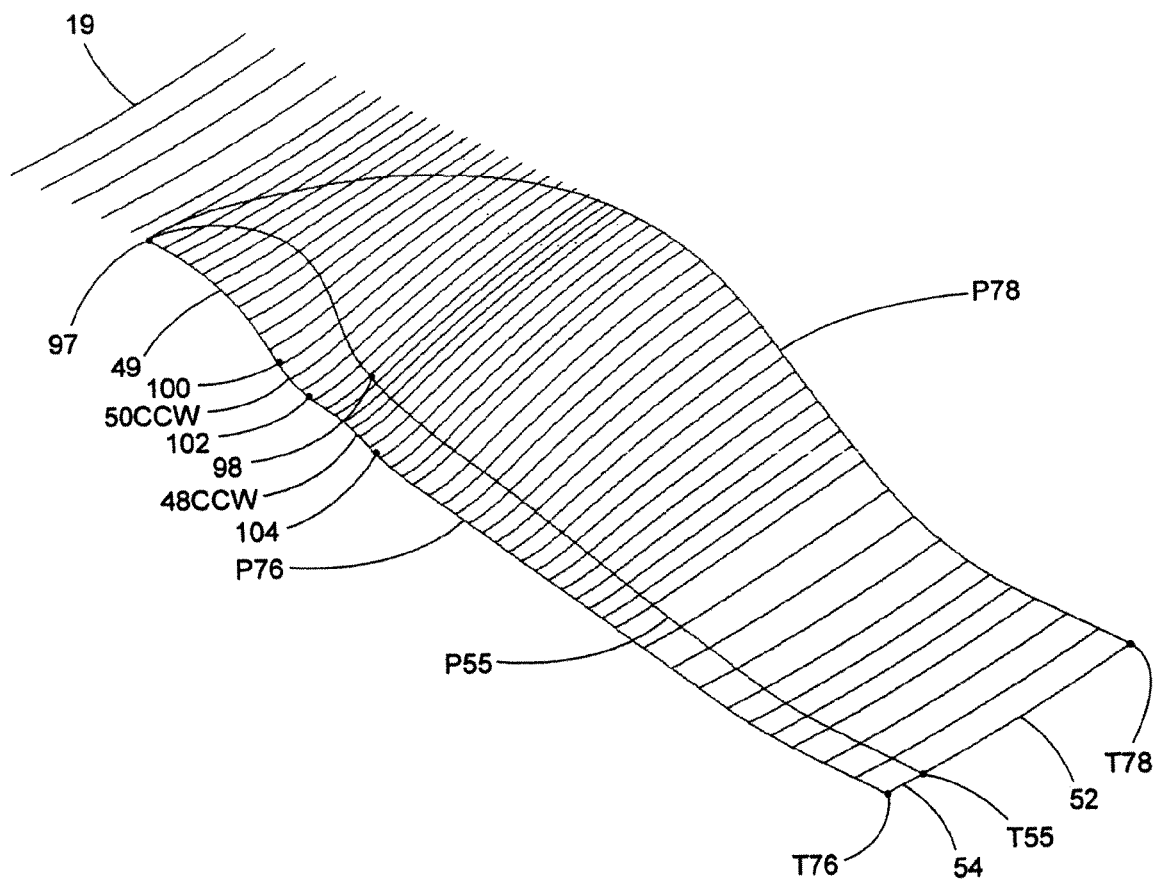
FIG. 15B is a map of the surface of the hydrodynamic inlet geometry shown in FIG. 15A.

FIG. 15B is a map of the surface of the hydrodynamic inlet geometry shown in FIG. 15A so that its shape can be more clearly understood. Construction profiles P76, P78 and tangency profile P55 are labeled as such, and serve as first and second boundaries establishing the circumferential extent of the hydrodynamic inlet for one wave. In other words, construction profile P76 and construction profile P78 represent the boundary of the counter-clockwise portion of the elongated dimple. Construction profile P78 is preferred to curve to meet construction profile P76 at location 97 so that when the seal is compressed against a relatively rotatable surface, a mouth flank edge 60CCW of curve-like configuration is formed (such as shown in FIGS. 2-2B). Construction profiles P76 and P78 have different profiles, and at least a portion of one is circumferentially remote from the other. Construction profile P76 forms a generally convex curve defining the local shape of dimple flank 49 between location 97 and location 100. Construction profile P76 preferably forms a generally concave curve between location 100 and location 102 that forms the local shape of dimple fillet 50CCW. Construction profile P76 forms a generally convex curve between location 102 and location 104 that defines the local shape of ramp section 48CCW. Dimple flank 49 is preferably tangent to dimple fillet 50CCW at location 100, and dimple fillet 50CCW is preferably tangent to ramp section 48CCW at location 102.

Construction profile P76 preferably represents a line of tangency or substantial tangency with the adjacent lip surface of the adjacent wave, which is preferably a mirror-image clockwise wave (not shown). To obtain a smooth surface within the interfacial contact footprint established by the hydrodynamic inlet geometry of FIGS. 15-15B, at least a portion of the hydrodynamic inlet is substantially tangent to adjacent lip surfaces at construction profiles P76 and P78. Construction profile P78 preferably represents a line of tangency or substantial tangency with the adjacent portion of the counter-clockwise wave 42CCW (see FIG. 15).

The mapping lines that are located between construction profiles P76 and P78 are parallel to dynamic exclusionary intersection 19, and map the surface of the elongated dimple 40 of FIGS. 15 and 15A. Each mapping line between construction profile P78 and tangency profile P55 is a primary curve 52 which, at its end points, is preferably tangent to adjacent lip surface geometry (i.e., at tangency locations T78 and T55). Each mapping line between construction profile P76 and tangency location T55 is a secondary curve 54 which, at its end points, is preferably tangent to adjacent lip surface geometry (i.e., at tangency locations T76 and T55). Collectively, the various primary curves 52 map a primary curved surface that is bounded by tangency profile P55 and construction profile P78. Collectively, the various secondary curves 54 map a secondary curved surface that is bounded by tangency profile P55 and construction profile P76. Preferably, at least a portion of the aforementioned primary curved surface is tangent or substantially tangent to the aforementioned secondary curved surface along tangency profile P55.

Tangency profile P55 is a line of substantial tangency between primary curve 52 and secondary curve 54 of each mapping line. As shown in FIG. 15B, the circumferential position of tangency profile P55 preferably varies positionally over at least part of the length of tangency profile P55.

Figure 16A:
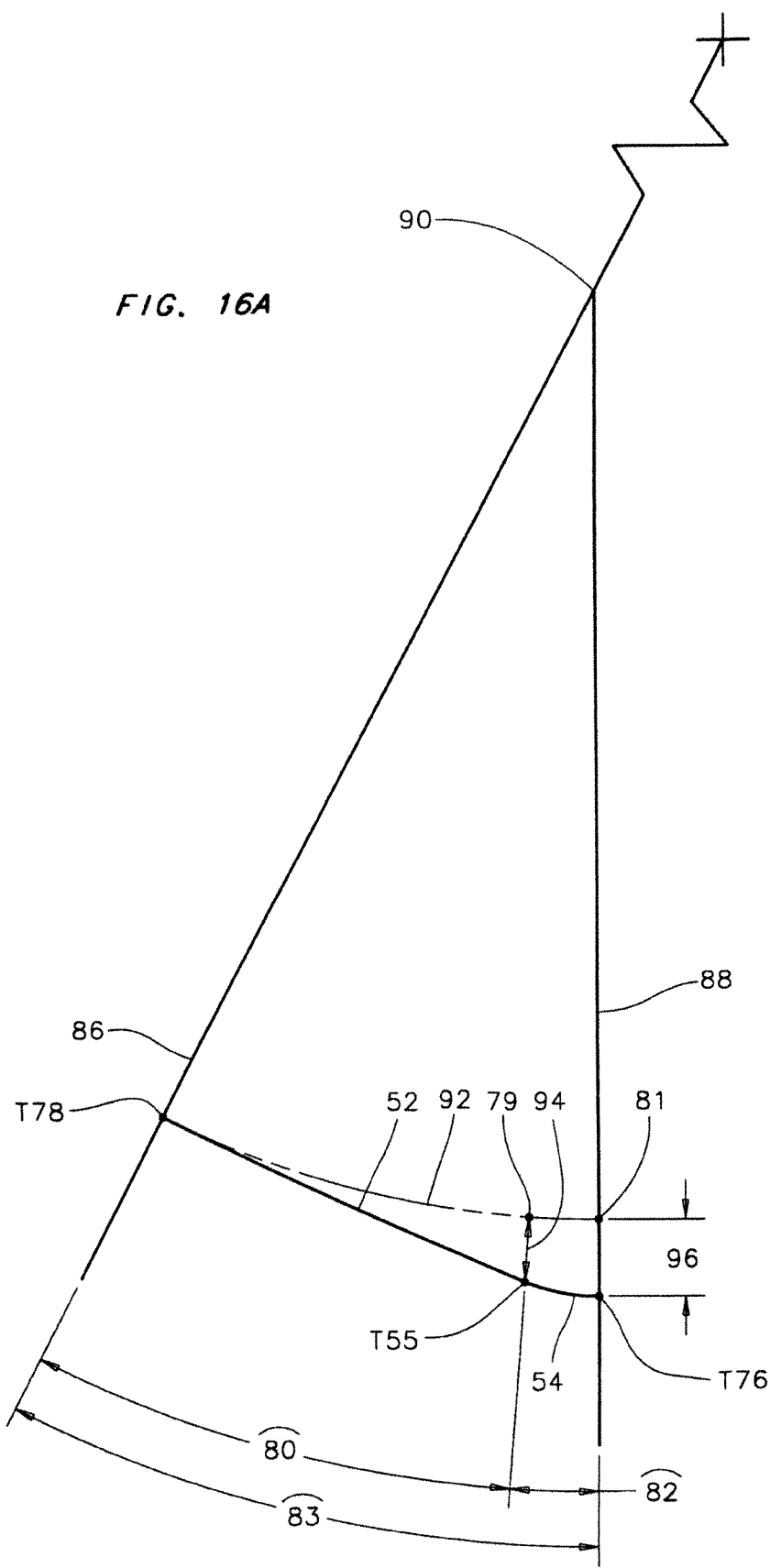
FIGS. 16-16C schematically illustrate a method of construction to make the mapping lines within the area bounded by construction profiles of FIG. 15B defining the surface of the elongated dimple shown in FIGS. 15 and 15A.
FIG. 16D schematically illustrates a construction method that can be used to establish the rate of variation of the variable curvature of the dimple flank 49 to thereby control the convergence of the dimple flank with a relatively rotatable surface.

One example of a construction technique for the mapping lines of FIG. 15B is shown in FIGS. 16 and 16A; this method automatically adjusts the curvature of primary curve 52 as a function of seal diameter, to maintain the same rate of convergence against the shaft over a family of different seal diameters that are sized to fit varying equipment envelope constraints.

The tangent radii construction method shown in FIG. 15B, and shown in greater detail in FIGS. 16 and 16A allows any two different profiles, such as, but not limited to, the construction profiles P76 and P78 of FIG. 15B, to be smoothly joined together in the circumferential direction to produce a hydrodynamic inlet geometry. A range of different performance characteristics can be obtained by manipulating the shapes of the construction profiles that are thus joined together.

Although FIGS. 14-15B show seals configured for sealing against an external cylindrical surface such as a shaft, the basic cross-sectional configurations are equally suitable (by twisting or manufacture) for being oriented for face sealing, or for sealing against an internal cylindrical surface, just as set forth in conjunction with the seal of FIGS. 1-1F.

Figure 16D:
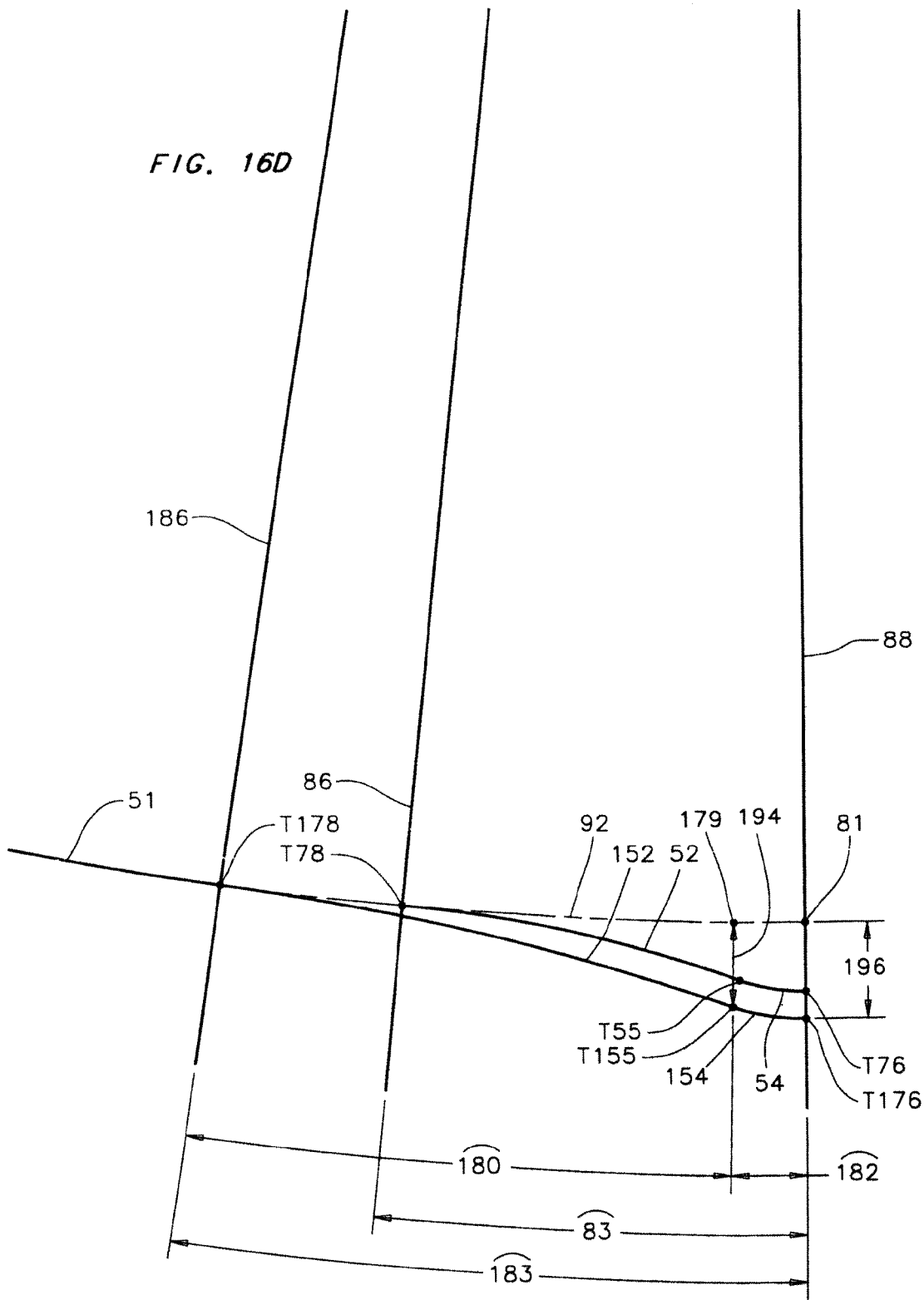
Figure 17:
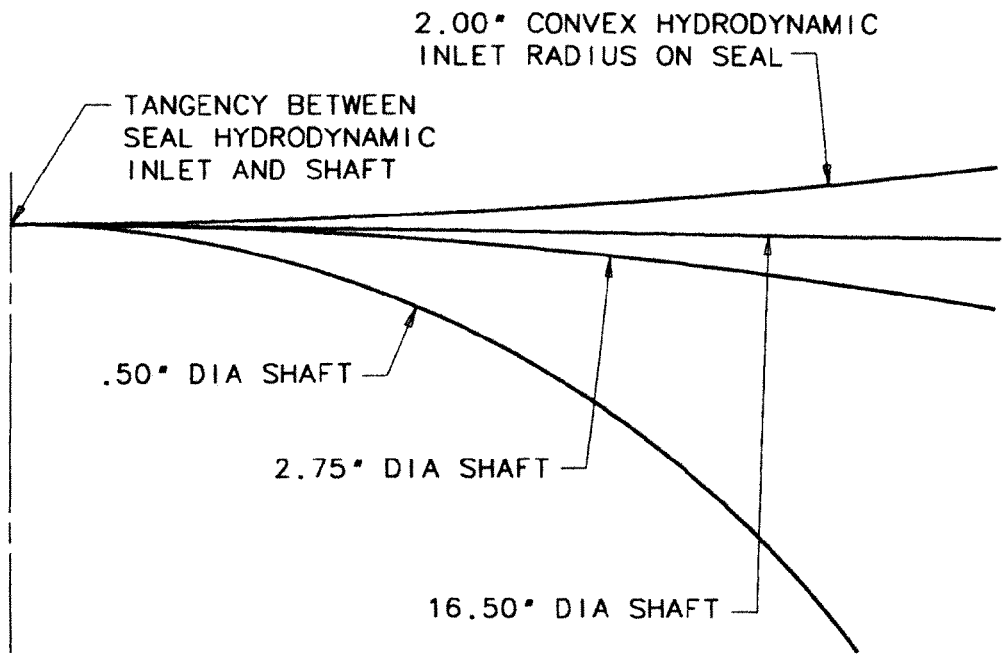
FIGS. 17 and 17A schematically illustrate the uncompressed relationship between various shaft diameters and circumferentially oriented hydrodynamic inlet radii.

Description of FIGS. 16-16D

FIGS. 16-16C schematically show a method of construction that can be used to make the mapping lines within the area bounded by construction profiles P76 and P78 of FIG. 15B that define the surface of the elongated dimple 40 shown in FIGS. 15 and 15A. The construction methods of FIGS. 16-16C can, in fact, be used to join any two construction profiles to form a hydrodynamic inlet, whether or not one of the construction profiles curves in the circumferential direction to touch the other. The construction method shown in FIGS. 16-16C can also be used to establish the compound curvature of ramp section 48CW of FIGS. 1-1F—in which case it would be most applicable to the foreshortened view of ramp section 48CW that is seen in FIG. 1B. In all cases, it is preferable that the construction method be laid out on a third angle projection plane that is at right angles to the theoretical axis of a seal configured for sealing against a relatively rotatable shaft (i.e., parallel with the first seal end 14 and dynamic exclusionary intersection 19 shown in FIG. 1A, 15 or 15A).

Construction line 86 and construction line 88, which are drawn for reference purposes, are radial lines extending from the theoretical centerline/axis 90 of the seal (see FIG. 16A). Construction line 88 of FIGS. 16-16C lies on the cutting plane of Section D-D of FIG. 1B. Theoretical arc 92 is a line that is tangent to primary curve 52, extending from construction line 86 to construction line 88. Theoretical arc 92 is representative of the diameter of the surface of the seal that is adjacent to primary curve 52 (for example see FIGS. 1A and 15). Primary curve 52 is preferably tangent to theoretical arc 92, and therefore tangent to the adjacent seal material that theoretical arc 92 represents. Primary curve 52 is preferably tangent to secondary curve 54 at tangency location T55.

The functions of secondary curve 54 are to prevent a sharp intersection between clockwise wave 42CW and counter-clockwise wave 42CCW (see FIG. 1A), and to provide a local dimple depth 96 to accommodate tolerances, compression variations and differential thermal expansion during seal operation, preventing total flattening of the geometry against the relatively rotatable surface 5. It is preferred that the aforementioned sharp intersection be avoided because sharp intersections sometimes lead to rubber fatigue in rotary seals, and because the mold geometry that produces sharp intersections wears quickly and can increase the dimensions of a seal in a way that may impair its performance when high levels of seal thermal expansion, axial seal loading, compression or media-induced seal swelling are present.

Primary curve 52 establishes a rate of convergence between ramp sections 48CW and/or 48CCW and relatively rotatable surface 5 as viewed in the circumferential direction (see FIGS. 1 and 17). The rate of convergence is a critical aspect of hydrodynamic performance because it controls the rate of increase in contact pressure (known as DPDX) in the circumferential direction between dynamic lip 4 and the relatively rotatable surface 5.

Figure 17A:
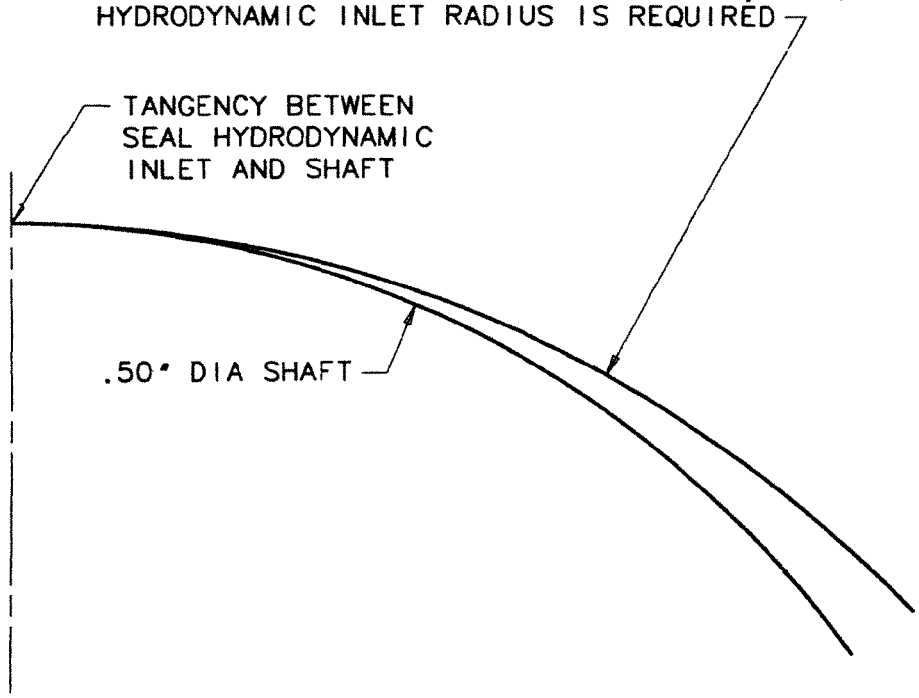

For example, if the size of primary curve 52 is kept the same on a family of radial seals of different diameters that seal against a shaft (as described previously in conjunction with FIG. 17, to fit various equipment envelope constraints), the rate of convergence with the relatively rotatable surface 5 of the shaft changes as a function of the diameter of relatively rotatable surface 5. For a given size primary curve 52, the larger the shaft, the more gradual the rate of convergence becomes, making the primary curve 52 a more efficient hydrodynamic wedging geometry. Conversely, the smaller the shaft becomes for a given size primary curve 52, the less gradual the rate of convergence becomes, making the primary curve 52 a less efficient hydrodynamic wedging geometry. The use of a fixed curvature across a family of seal diameters, causing changing convergence across a family of seals, is a fault of the prior art, as described in conjunction with FIG. 17. In the preferred embodiment of the present invention, the rate of convergence is approximately the same across a family of seal diameters so that the hydrodynamic geometry retains the same hydrodynamic wedging efficiency across the family of seal diameters, allowing similar hydrodynamic performance across a family of seal diameters. This concept is described in some detail in conjunction with FIGS. 17 and 17A.

In the geometry shown in FIGS. 16-16C, the rate of convergence of relatively rotatable surface 5 with either the hydrodynamic inlet of FIGS. 15-15B, or the ramp sections 48CW, 48CCW of FIGS. 1-1F, can be held substantially constant over a family of radial seals of different diameters if the primary arc depth 94 and primary arc length 80 of primary curve 52 are held constant. Primary arc length 80 is not an angle, but rather an arc length dimension that is measured along theoretical arc 92 from tangency location T78 to location 79. Likewise, secondary arc length 82 is not an angle, but rather an arc length dimension that is measured along theoretical arc 92 from location 79 to location 81. Combined arc length 83 is the sum of primary arc length 80 and secondary arc length 82.

Using the construction shown schematically in FIGS. 16 and 16A, a preferred way to hold the rate of convergence substantially constant over a family of radial seals of different diameters having the same local dimple depth 96 is to keep combined arc length 83 substantially constant over the family of seal diameters, while also keeping the ratio of secondary arc length 82 divided by combined arc length 83 substantially constant. If the local dimple depth 96 varies from seal to seal, the primary curve 52 geometry will have to be adjusted accordingly to maintain the same convergence from seal to seal.

With the aforementioned constraints on primary arc depth 94 and primary arc length 80 (to achieve similar convergence across a family of seals), a subtle point to be considered is that if primary curve 52 is constructed tangent to theoretical arc 92, then primary curve 52 (and ramp section 48CW) has a generally convex shape in larger diameter seals (as shown in FIG. 16), and has a generally concave shape in smaller diameter seals (as shown in FIG. 16A), and thus maintains substantially the same rate of convergence between ramp section 48CW and relatively rotatable surface 5 across a family of different diameters of radial seals, regardless of the circumferential length of the wave. Thus, for a given rate of curvature, there may be a seal diameter that results in primary curve 52 being a straight line (an infinitely sized curve); larger diameter seals having a generally convex primary curve 52; and smaller diameter seals having a generally concave primary curve 52. If primary curve 52 has a concave shape, then the dimple fillet will also have a generally concave shape when viewed in a circumferentially oriented transverse cross-section. Thus, at least part of the hydrodynamic inlet formed by the elongated dimple will have a generally concave shape when viewed in a circumferentially oriented transverse cross-section.

For example, if a family of seals were patterned after a prototype seal with a 2.75" inside diameter having a primary curve 52 with a 0.5" convex radius, the primary curve 52 on a 0.6" inside diameter seal would be approximately a 1.468" concave radius, and the primary curve 52 on a 16.5" diameter seal would be approximately a 0.383" convex radius. The primary curve 52 of all the aforementioned family of seals would have the substantially same rate of convergence with their respective shafts even though their actual curvatures were different and even though some were convex and some were concave.

Referring back to FIG. 15B, the positional variation of tangency profile P55 is because the ratio of secondary arc length 82 divided by combined arc length 83 varies sinusoidally from one mapping line to the next, from a ratio of 0.5 at the location 97 where construction profiles P76 and P78 touch, to a smaller ratio at location 98 where profile P55 becomes nearly parallel to profile P76. This sinusoidal ratio variation helps to produce the un-faceted, smoothly contoured dimple fillet 50CCW that is shown in FIGS. 15 and 15A.

For the elongated dimple construction shown in FIGS. 15 and 15A and produced by the map lines of FIG. 15B, the primary curve 52 is generally convex at some locations and generally concave at others, depending on the local primary arc length 80 and primary arc depth 94. For example, several of the primary curves 52 that are located near location 97 are clearly concave, while those that are farther away from location 97 are clearly convex.

Thus, the exact convergence with the shaft will vary from one map line to the next of FIG. 15B. Importantly, the convergence from one map line to another is repeatable from one seal diameter to another so long as primary arc length 80 and primary arc depth 94 remain the same, or so long as the combined arc length 83 and the ratio of secondary arc length 82 divided by combined arc length 83 at any given map line location remains the same across a family of different seal diameters.

Referring back to FIGS. 1-1F, convergence of the elongated dimple 40 with the relatively rotatable surface 5 in the circumferential direction is controlled by three interdependent elements; the ramp sections 48CW and 48CCW, the dimple flank 49, and the dimple fillets 50CW and 50CCW. The method for controlling the convergence between relatively rotatable surface 5 and the ramp sections 48CW and 48CCW over a family of different seal diameters has already been described above. Assuming that the ramp convergence is also the same, the circumferential convergence between the relatively rotatable surface 5 and the dimple flank 49 of FIGS. 1-1F can be maintained across a family of different seal diameters if the variation in size of the generally convex curve between T56 and T57 of the dimple flank 49 surface, is the same across the family of different diameter seals, and takes place over the same circumferential distance. The convergence between the relatively rotatable surface 5 and the dimple fillets 50CW and 50CCW of FIGS. 1-1F can be maintained across a family of different seal diameters if the variation in size of the dimple fillet 50CW, 50CCW, is the same across the family of different diameter seals, and takes place over the same circumferential distance.

Primary curve 52 and secondary curve 54 may take any suitable form without departing from the spirit or scope of the invention, such as a radius, a portion of an ellipse, a portion of a sine wave curve, a portion of a parabolic curve, a portion of a cycloid curve, a portion of witch/versiera curves, a combination of curves, a combination of curves and straight lines (e.g. infinite curves), etc.

For example, in FIG. 16B secondary curve 54 is illustrated as an S-curve, facilitating a deeper local dimple depth 96, while in FIGS. 16 and 16A, secondary curve 54 is illustrated as a circular arc. In FIGS. 16-16C, primary curve 52 is illustrated as a circular arc that is illustrated at exactly the same size in FIGS. 16-16C. The center of primary curve 52 lies along construction line 86 in FIGS. 16-16C. The center of secondary curve 54 is located along construction line 88 in FIGS. 16-16A. For the purposes of this specification, when referencing construction line 86 and construction line 88, they are considered to be straight lines having infinite length, extending beyond the illustration.

The construction method shown in FIG. 16B was used to create the elongated dimple 42 shown in FIG. 14. It can be appreciated that with the construction method shown in FIG. 16B, a local dimple depth 96 of any desired depth can be created.

In FIG. 16C, the shape of secondary curve 54 can be used to distance the primary curve 52 from construction line 88 if desired, it being understood that adjacent waves that are formed using this method would still be in abutting relation due to the dimple flank 49 (dimple flank 49 is shown in other figures; for example see FIG. 1A).

The construction method that is shown in FIG. 16D can be used to establish the rate of variation of the variable curvature of the dimple flank 49 (such as shown in FIGS. 1-1F) and thereby control the convergence of the dimple flank 49 with the relatively rotatable surface 5, and also thereby control an important factor that influences the convergence between the relatively rotatable surface 5 and the dimple fillet 50CW and 50CCW.

It is preferable that the construction method of FIG. 16D be laid out on a third angle projection plane that is at right angles to the theoretical axis of a seal configured for sealing against a relatively rotatable shaft (i.e., parallel with the first seal end 14 and dynamic exclusionary intersection 19 shown in FIG. 1A, 15 or 15A).

For orientation of the reader, certain items that were described in conjunction with FIG. 16 are labeled in FIG. 16D; to wit: primary curve 52, secondary curve 54, tangency location T55, tangency location T76, tangency location T78, location 81, combined arc length 83, construction line 86, construction line 88 and theoretical arc 92. In addition to these items, FIG. 16D also shows a primary flank curve 152 that is substantially tangent to a secondary flank curve 154 at tangency location T155, and tangent to theoretical arc 92 and seal dynamic surface 51 at tangency location T178. Primary flank curve 152 and secondary flank curve 154 represent the location of the theoretical intersections between multi-function edges 46CW and 46CCW and dimple flank 49 (these theoretical intersections are blended by dimple fillet 50CW and 50CCW; see FIGS. 1-1F). The aforementioned theoretical intersections are located where multi-function edges 46CW and 46CCW and dimple flank 49 would intersect if their curved surfaces were extended to meet at a sharp corner, instead of being blended by dimple fillet 50CW and 50CCW.

Construction line 186, which is drawn for reference purposes, is a radial line extending from the theoretical centerline/axis of the seal. The rate of convergence of the dimple flank 49 with relatively rotatable surface 5 can be held substantially constant over a family of radial seals of different diameters if the arc depth 194 and arc length 180 of primary flank curve 152 are held constant. Arc length 180 is not an angle, but rather an arc length dimension that is measured along theoretical arc 92 from tangency location T178 to location 179. Likewise, arc length 182 is not an angle, but rather an arc length dimension that is measured along theoretical arc 92 from location 179 to location 81. Combined arc length 183 is the sum of arc length 180 and arc length 182. Typically, combined arc length 183 is greater than combined arc length 83. If desired, combined arc length 183 and/or combined arc length 83 may extend all the way to the low point in the wave that is located at cutting plane F-F in FIG. 1B.

In practice, a preferred way to hold the rate of convergence of the dimple flank 49 substantially constant over a family of radial seals of different diameters that have the same curve depth 196, using the construction shown schematically in FIG. 16D, is to keep combined arc length 183 substantially constant over the family of seal diameters while also keeping the ratio of arc length 182 divided by combined arc length 183 substantially constant. If the curve depth 196 varies from seal to seal, the primary flank curve 152 geometry will have to be adjusted accordingly to maintain the same convergence from seal to seal.

With the aforementioned constraints on arc depth 194 and arc length 180 (to achieve similar convergence across a family of seals), a subtle point to be considered is that if primary flank curve 152 is constructed tangent to theoretical arc 92, then primary flank curve 152 has a generally convex shape in larger diameter seals (as shown in FIG. 16D), and has a generally concave shape in smaller diameter seals, and thus maintains substantially the same rate of convergence between dimple flank 49 and relatively rotatable surface 5 across a family of different diameters of radial seals, regardless of the circumferential length of the wave. Thus, for a given rate of curvature, there may be a seal diameter that results in primary flank curve 152 being a straight line (an infinitely sized curve); larger diameter seals having a generally convex primary flank curve 152; and smaller diameter seals having a generally concave primary flank curve 152.

Primary flank curve 152 and secondary flank curve 154 may take any suitable form without departing from the spirit or scope of the invention, such as a radius, a portion of an ellipse, a portion of a sine wave curve, a portion of a parabolic curve, a portion of a cycloid curve, a portion of witch/versiera curves, a combination of curves, a combination of curves and straight lines (e.g. infinite curves), etc. For example, secondary flank curve 154 could be the same general shape as the secondary curve 54 shown in FIG. 16B or 16C.

For the purpose of this specification, the seal cross-sectional depth is the distance between static sealing surface 20 and seal dynamic surface 51, as typically measured between dynamic exclusionary intersection 19 and static exclusionary intersection 38 in the uncompressed condition of seal 2. It has previously been noted that for the same dimensional compression, interference-type seals with a smaller cross-sectional depth have a much higher percentage of compression (compared to seals with a larger cross-sectional depth), and therefore have much higher interfacial contact pressure, which makes smaller cross-section seals more difficult to lubricate. For example, a 0.212" cross-section seal with 0.023" compression has about 52% more contact pressure than a 0.335" cross-section seal with 0.026" compression. It has also been previously noted that a hydrodynamic inlet that maintains substantially the same rate of convergence over a family of seals of different diameters is an improvement over the prior art. An additional, fundamental improvement over the prior art is to decrease the rate of convergence between the seal hydrodynamic inlet and the shaft (i.e., make the convergence more gentle) in smaller cross-section seals, to provide a stronger hydrodynamic wedging action to compensate for the increased interfacial contact pressure that occurs with smaller cross-section seals. In other words, in a family of seals that includes seals of different cross-sectional depths to fit varying equipment envelope constraints, it is preferable that the rate of convergence of the hydrodynamic inlet be more gradual in smaller cross-section seals to compensate for the increased contact pressure caused by the smaller cross-sectional depth, in order to provide the same level of lubricating effectiveness over the family of different seal cross-sections.

CONCLUSION

In view of the foregoing it is evident that the present invention is one that is well adapted to attain all of the objects and features hereinabove set forth, together with other objects and features which are inherent in the apparatus disclosed herein.

Even though several specific hydrodynamic rotary seal and seal gland geometries are disclosed in detail herein, many other geometrical variations employing the basic principles and teachings of this invention are possible.

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A hydrodynamic rotary seal for location by a machine component for dynamic sealing engagement with a relatively rotatable surface and for serving as a partition between a first fluid of a lubricant supply and a second fluid, the hydrodynamic rotary seal comprising a generally ring-shape body of resilient sealing material, said generally ring-shape body comprising:
    axial extremities defining first and second body ends;
    a static sealing surface adapted to form a sealing interface with the machine component;
    a generally circumferential dynamic lip located inward from said static sealing surface, at least a portion of said dynamic lip adapted to form a sealing interface with the relatively rotatable surface to define an interfacial contact footprint between said dynamic lip and the relatively rotatable surface,
    wherein during relative rotation between said dynamic lip and the relatively rotatable surface while in use, the interfacial contact footprint is a dynamic sealing interface with sliding occurring between said dynamic lip and the relatively rotatable surface, and in the absence of relative rotation, the interfacial contact footprint is a static sealing interface;
    said dynamic lip comprising:
        a first lip side arranged to face the first fluid;
        a second lip side arranged to face the second fluid;
        a dynamic exclusionary intersection of abrupt generally circular form;
        a dynamic surface axially located between said dynamic exclusionary intersection and said first body end, said dynamic surface having a circular end at said second lip side, and said dynamic exclusionary intersection formed at an intersection of said dynamic surface and said second lip side;
        a wave having a wave flank on said first lip side and a multi-function edge, said wave flank axially located between said multi-function edge and said first body end, said multi-function edge extending in a generally circumferential direction, at least a portion of said multi-function edge skewed with respect to said dynamic exclusionary intersection, at least a portion of said multi-function edge axially located between said wave flank and said dynamic surface, at least a portion of said multi-function edge having a convex curve profile when viewed in longitudinal cross-section, and at least a portion of said multi-function edge substantially tangent to said dynamic surface when viewed in longitudinal cross-section;
        said multi-function edge having an end portion in the circumferential direction defining a ramp section and an end of said multi-function edge, said ramp section extending in a generally circumferential direction, at least a portion of said ramp section skewed with respect to said dynamic exclusionary intersection, said end located axially farther from said dynamic exclusionary intersection than the remainder of said ramp section, said end recessed relative to said dynamic surface and being the most recessed of said multi-function edge;
        a dimple having a dimple flank with a generally convex curvature when viewed in longitudinal cross-section, the curvature of said dimple flank varies along at least part of a length of said multi-function edge with said dimple flank becoming less curved as said dimple flank forms a smooth transition with said dynamic surface in the circumferential direction, at least a portion of said dimple located between said dynamic exclusionary intersection and said ramp section; and
        said dimple having a dimple fillet located at least partially between said ramp section and said dimple flank, at least a portion of said dimple fillet recessed relative to said ramp section and recessed relative to said dynamic surface, a line of substantial tangency being located along at least part of said multi-function edge, at least part of said line of substantial tangency being a location of substantial tangency between said multi-function edge and said dynamic surface and at least a part of said line of substantial tangency being a location of substantial tangency between said ramp section of said multi-function edge and said dimple fillet.

2. The hydrodynamic rotary seal of claim 1, wherein said wave abuts another wave at an abutting location, and both said waves share a common cross-sectional profile at the abutting location.

3. The hydrodynamic rotary seal of claim 1, wherein said dynamic lip having another wave on said first lip side that includes another dimple adapted to provide gradual convergence with the relatively rotatable surface in a circumferential direction.

4. The hydrodynamic rotary seal of claim 1, wherein said convex curve profile of at least a portion of said multi-function edge having a curvature size that varies along at least part of the length of said multi-function edge, said curve profile having less curvature as said multi-function edge comes nearer to said dynamic exclusionary intersection.

5. The hydrodynamic rotary seal of claim 1, wherein substantially all of said ramp section being skewed with respect to said dynamic exclusionary intersection.

6. The hydrodynamic rotary seal of claim 1, wherein at least part of said dimple having a concave curved profile when viewed in longitudinal cross-section.

7. The hydrodynamic rotary seal of claim 1, wherein said dynamic lip having a second wave on said first lip side, said second wave having an edge, and at least a portion of said edge having a convex curve profile when viewed in longitudinal cross-section, said edge having a length, and said curve profile of said edge having a curvature size that varies along at least part of the length of said edge.

8. The hydrodynamic rotary seal of claim 1, wherein said dynamic lip having a second wave on said first lip side, said second wave having an edge that is skewed with respect to said dynamic exclusionary intersection, and at least a portion of said edge having a curve profile when viewed in longitudinal cross-section, and said curve profile of said edge being generally convex.

9. The hydrodynamic rotary seal of claim 1, wherein said dynamic lip having a second wave on said first lip side having a length, said second wave having an edge that is skewed with respect to said dynamic exclusionary intersection, and at least a portion of said edge having a curve profile when viewed in longitudinal cross-section, and said curve profile of said edge having a curvature size which varies sinusoidally along at least part of said length of said second wave.

10. A hydrodynamic rotary seal for location by a machine component for dynamic sealing engagement with a relatively rotatable surface and serving as a partition between a first fluid of a lubricant supply and a second fluid, comprising:
a static sealing surface adapted to form a sealing interface with the machine component;
a generally circular dynamic lip comprising at least two hydrodynamic waves, at least a portion of said dynamic lip defining a dynamic surface adapted to form a sealing interface with the relatively rotatable surface, wherein at least one of said hydrodynamic waves comprises:
a multi-function edge having a convex profile when viewed in longitudinal cross-section, said multi-function edge having first and second circumferentially spaced ends, the portion of said multi-function edge near said first circumferentially spaced end forming a ramp section, wherein at least a portion of said ramp section substantially level with said dynamic surface and at least a portion of said ramp section sloping away from said dynamic surface in the direction of said first circumferentially spaced end, a portion of said ramp section located nearest to said first circumferentially spaced end of said multi-function edge being closer to said static sealing surface compared to said second circumferentially spaced end of said multi-function edge;
a dimple including a dimple flank having a generally convex curve profile when viewed in longitudinal cross-section, said dimple being formed in part by said ramp section; and
said dimple including a dimple fillet located between said ramp section and said dimple flank when viewed in longitudinal cross-section, said dimple fillet having a generally concave profile when viewed in longitudinal cross-section and having a sloping profile in the circumferential direction, said dimple fillet being substantially tangent to said dimple flank and said ramp section when viewed in longitudinal cross-section.

11. The rotary seal of claim 10, wherein said at least one of said hydrodynamic waves has a length, and said generally convex curve profile of said dimple flank has a size that increases along at least part of said length of said wave.

12. The rotary seal of claim 10, wherein said at least one of said hydrodynamic waves has a length and said dimple fillet has a size that increases along at least part of said length of said wave.

13. The rotary seal of claim 10, wherein at least a portion of said multi-function edge is skewed with respect to a direction of relative rotation.

14. The rotary seal of claim 10, wherein substantially all of said multi-function edge is skewed with respect to a direction of relative rotation.

15. The rotary seal of claim 10, wherein said multi-function edge has a length and said multi-function edge is curved when viewed in longitudinal cross-section and the curvature varies along at least part of the length of said multi-function edge.

16. The rotary seal of claim 10, wherein at least a part of said ramp section is adapted to slope toward the relatively rotatable surface and at least a part of said ramp section is adapted to be compressed against the relatively rotatable surface.

17. A hydrodynamic rotary seal for dynamic sealing engagement with a relatively rotatable surface and for serving as a partition between a first fluid of a lubricant supply and a second fluid, comprising:
a generally circular dynamic lip comprising at least two hydrodynamic waves, at least a portion of said dynamic lip defining a dynamic surface adapted to form a sealing interface with the relatively rotatable surface, wherein at least one of said hydrodynamic waves comprising:
a multi-function edge having first and second circumferentially spaced ends, at least a portion of said multi-function edge substantially tangent to said dynamic surface when viewed in longitudinal cross-section, at least a portion of said multi-function edge near said first circumferentially spaced end forming a ramp section, at least a portion of said ramp section sloping away from said dynamic surface in a generally circumferential direction, a portion of said ramp section located nearest said second circumferentially spaced end of said multi-function edge being level with said dynamic surface;
a dimple formed at least in part by said ramp section and said dimple including a dimple flank that has a generally convex curve profile when viewed in longitudinal cross-section;
said dimple including a dimple fillet located between said ramp section and said dimple flank when viewed in longitudinal cross-section, said dimple fillet having a generally concave profile when viewed in longitudinal cross-section and having a sloping profile in a circumferential direction, said dimple fillet being substantially tangent to said dimple flank and said ramp section when viewed in longitudinal cross-section; and said at least two hydrodynamic waves abutting each other at an abutting location and sharing the same cross-sectional profile at said abutting location.

18. The hydrodynamic rotary seal of claim 17, wherein said at least two hydrodynamic waves are selected from the group consisting of clockwise hydrodynamic waves and counterclockwise hydrodynamic waves.

19. A hydrodynamic rotary seal for dynamic sealing engagement with a relatively rotatable surface and for serving as a partition between a lubricant of a lubricant supply and an environment, and for retaining a volume of the lubricant, the hydrodynamic rotary seal comprising:
  a generally circumferential dynamic lip, at least a portion of said dynamic lip defining a dynamic surface adapted to establish contacting relation with the relatively rotatable surface to define an interfacial contact footprint between said dynamic lip and the relatively rotatable surface,
  wherein during relative rotation between said dynamic lip and the relatively rotatable surface while in use, the interfacial contact footprint is a dynamic sealing interface with sliding occurring between said dynamic lip and the relatively rotatable surface, and in the absence of relative rotation, the interfacial contact footprint is a static sealing interface;
  said dynamic lip comprising:
    a first lip side adapted to face the lubricant;
    a second lip side adapted to face the environment;
    a hydrodynamic wave having a wave flank and a multi-function edge extending in a generally circumferential direction, at least a portion of said multi-function edge being skewed with respect to a direction of relative rotation, said multi-function edge having an end portion including an end of said multi-function edge in the generally circumferential direction, said end portion of said multi-function edge forming a ramp section in the generally circumferential direction, said ramp section sloping in the generally circumferential direction relative to said dynamic surface, wherein said ramp section adjacent said multi-function edge end being entirely recessed relative to said dynamic surface;
    said hydrodynamic wave having a dimple between said ramp section and said second lip side, said dimple being formed in part by a dimple flank having a convex cross-section when viewed in longitudinal cross-section and said ramp section, said dimple having a surface recessed relative to said dynamic surface and a portion of said dimple surface recessed relative to said ramp section, said dimple adapted to be exposed to the lubricant of the lubricant supply, at least a portion of said dimple having a sloping profile in the circumferential direction forming a smooth transition with said dynamic surface, said sloping profile adapted to provide gradual convergence with the relatively rotatable surface in the circumferential direction.

20. The hydrodynamic rotary seal of claim 19, wherein said dynamic lip defines a second hydrodynamic wave.

21. The hydrodynamic rotary seal of claim 19, wherein said dynamic lip defines a second hydrodynamic wave, at least a portion of said second hydrodynamic wave having a sloping profile in a second circumferential direction which is adapted for providing gradual convergence with the relatively rotatable surface in the second circumferential direction.

22. A hydrodynamic rotary seal for location by a machine component for dynamic sealing engagement with a relatively rotatable surface and for serving as a partition between a lubricant of a lubricant supply and an environment, the hydrodynamic rotary seal comprising a generally ring-shape body of resilient sealing material, said generally ring-shape body comprising:
  axial extremities defining first and second body ends;
  a static sealing surface adapted to form a sealing interface with the machine component;
  a generally circumferential dynamic lip located radially inward from said static sealing surface and having at least two narrower axial lip locations and at least one wider axial lip location, at least a portion of said dynamic lip adapted to establish a sealing interface with the relatively rotatable surface, said dynamic lip comprising:
    a dynamic surface facing radially inward and having a circular end proximate said second body end;
    a dynamic exclusionary intersection of abrupt generally circular form at said circular end of said dynamic surface;
    a wave flank adapted to generally face the lubricant and located between said first body end and said dynamic surface, said wave flank radially outward of said dynamic surface and at least a portion of said wave flank skewed with respect to said dynamic exclusionary intersection;
    a generally circumferentially oriented multi-function edge defining an end at an end portion of said multi-function edge, at least a portion of said multi-function edge skewed with respect to said dynamic exclusionary intersection, at least a portion of said multi-function edge has a convex curve profile when viewed in longitudinal cross-section, at least a portion of said multi-function edge located between said dynamic surface and said wave flank, said end portion of said multi-function edge forming a ramp section sloping radially outward in the direction of said multi-function edge end such that said ramp section is most radially outward at said end of said multi-function edge and said multi-function edge end is radially outward of said dynamic surface;
    a generally circumferentially oriented dimple, at least a portion of said dimple located between said ramp section and said dynamic exclusionary intersection, at least a portion of said dimple recessed relative to said ramp section and recessed relative to said dynamic surface, said dimple having a convex dimple flank when viewed in longitudinal cross-section, said dimple defining a hydrodynamic inlet, at least a portion of said dimple having a curved profile in a generally circumferential direction, said curved profile adapted for providing gradual convergence with the relatively rotatable surface in the circumferential direction for wedging a film of the lubricant into the sealing interface with the relatively rotatable surface.

23. A hydrodynamic rotary seal for dynamic sealing engagement with a relatively rotatable surface, comprising:
  a radially inward-facing dynamic surface adapted to form a sealing interface with the relatively rotatable surface;
  a hydrodynamic inlet for providing hydrodynamic wedging activity, said hydrodynamic inlet comprising:
    a generally circumferentially oriented multi-function edge defining an edge end at an end portion of said multi-function edge, said multi-function edge being generally convex when viewed in longitudinal cross-section, said end portion of said multi-function edge forming a radially sloped ramp section in a generally circumferential direction, wherein a portion of said ramp section nearest said edge end is recessed relative to said dynamic surface and a portion of said ramp section most distant from said edge end is level with said dynamic surface;

a dimple flank having a generally convex profile when viewed in longitudinal cross-section, said dimple flank located axially between said dynamic surface and said ramp section; and a dimple formed in part by said ramp section and said dimple flank, said dimple having a dimple fillet located at least partially between said sloped ramp section and said dimple flank, at least a portion of said dimple fillet recessed relative to said ramp section and recessed relative to said dynamic surface, and at least a portion of said dimple having a sloping profile in a circumferential direction, said sloping profile adapted for providing gradual convergence with the relatively rotatable surface in the circumferential direction.

24. The rotary seal of claim 23, wherein said generally convex profile of said dimple flank has a variable curvature.

25. The rotary seal of claim 23, wherein said dimple fillet has a concave profile when viewed in longitudinal cross-section, said dimple fillet having a variable curvature.

26. A hydrodynamic rotary seal for location by a machine component for dynamic sealing engagement with a relatively rotatable surface and serving as a partition between a first fluid of a lubricant supply and a second fluid, the rotary seal having a generally ring-shaped body comprising:

a lubricant end and an environment end in generally opposed relation;

a static sealing surface adapted to form a sealing interface with the machine component;

a circumferential dynamic lip comprising:
a substantially circular dynamic surface adapted to form a sealing interface with the relatively rotatable surface, said dynamic surface in generally opposed relation to said static sealing surface;

a hydrodynamic wave having a multi-function edge that has a curved surface when viewed in longitudinal cross-section, at least a portion of said multi-function edge being skewed relative to said environment end of said body, a multi-function edge first end in a circumferential direction being more distant axially from said environment end compared to a multi-function edge second end in a circumferential direction, said first and second ends of said multi-function edge being spaced circumferentially from one another, a portion of said multi-function edge near said first end forming a ramp section having a ramp section surface adapted to curve toward and into contact with the relatively rotatable surface, a portion of said ramp section that is spaced away from said first end being even with said dynamic surface, another portion of said ramp section that is nearer to said first end being recessed relative to said dynamic surface, said ramp section surface of said multi-function edge curving increasingly closer to said static sealing surface as said ramp section surface becomes more distant from said second end of said multi-function edge;

a dimple having a surface recessed relative to said dynamic surface, said dimple including a dimple flank having a generally convex curve profile when viewed in longitudinal cross-section and a dimple fillet located between said ramp section and said dimple flank, said dimple fillet having a generally concave curve profile when viewed in longitudinal cross-section and having a sloping profile in the circumferential direction, said dimple fillet being tangent to said dimple flank and said ramp section when viewed in longitudinal cross-section and forming at least part of a hydrodynamic inlet.

27. A hydrodynamic rotary seal for location by a machine component for dynamic sealing engagement with a relatively rotatable surface and serving as a partition between a first fluid of a lubricant supply and a second fluid, the hydrodynamic rotary seal of the elastomeric sealing element type having a static sealing surface for providing a static sealing interface with the machine component and having a generally circumferential dynamic lip with a substantially circular dynamic surface for providing a dynamic sealing interface with the relatively rotatable surface, said dynamic lip having a first fluid side and a second fluid side, said dynamic lip further comprising:

a hydrodynamic wave having a multi-function edge that approaches closest to said second fluid side at an end of said hydrodynamic wave, at least a portion of said multi-function edge forming a ramp section in a generally circumferential direction sloping away from said dynamic surface and becoming closer to said static sealing surface as it becomes farther from said end of said hydrodynamic wave;

a dimple having a surface recessed relative to said dynamic surface, said dimple including a dimple flank having a generally convex curve profile when viewed in longitudinal cross-section and a dimple fillet located between said ramp section and said dimple flank, said dimple fillet having a generally concave curve profile when viewed in longitudinal cross-section and having a sloping profile in the circumferential direction, said dimple fillet being tangent to said dimple flank and said ramp section and forming at least part of a hydrodynamic inlet.

28. A hydrodynamic rotary seal for location by a machine component for dynamic sealing engagement with a relatively rotatable surface and serving as a partition between a first fluid of a lubricant supply and a second fluid, the rotary seal comprising:

a generally ring-shaped body of sealing material;

a static sealing surface defined by said generally ring-shaped body of sealing material, said static sealing surface adapted to form a sealing interface with the machine component;

a generally circumferential dynamic lip defined by said generally ring-shaped body, said dynamic lip defining a generally circular dynamic surface adapted to form a sealing interface with the relatively rotatable surface, said dynamic surface in generally opposed relation to said static sealing surface, said dynamic lip having a lubricant side and an environment side;

a multi-function edge defined by said dynamic lip and extending in a generally circumferential direction, at least a portion of said multi-function edge being skewed with respect to said environment side of said dynamic lip, at least a portion of said multi-function edge having a convex curve profile when viewed in longitudinal cross-section, said multi-function edge defining an edge end at an end portion of said multi-function edge in the generally circumferential direction, said end portion of said multi-function edge forming a ramp section sloping radially outward to said edge end in the generally circumferential direction such that said ramp section is most radially outward at said edge end, at least a part of said ramp section having a convex curve profile when viewed in longitudinal cross-section, and said ramp section is more axially distant from said environment side of said dynamic lip than the remaining portion of said multi-function edge;

said dynamic lip comprising a dimple having a surface recessed relative to said dynamic surface and a portion of said dimple surface recessed relative to said ramp section, said dimple adapted to be exposed to the first fluid of the lubricant supply, at least a portion of said dimple having a sloping profile forming a smooth transition with said dynamic surface in the circumferential direction, said dimple being formed in part by said ramp section and a dimple flank having a convex shape when viewed in longitudinal cross-section.

29. The hydrodynamic rotary seal of claim 27, wherein said dimple flank is substantially tangent with said dynamic surface when viewed in longitudinal cross-section.

30. The hydrodynamic rotary seal of claim 27, wherein said dimple flank tangentially joins said dynamic surface in the circumferential direction.

31. The hydrodynamic rotary seal of claim 29, wherein said dimple flank tangentially joins said dynamic surface in the circumferential direction.

32. The hydrodynamic rotary seal of claim 27, wherein the curvature size of said dimple fillet is in the range of about $1/10$ to $1/2$ the curvature size of said dimple flank in an axial direction.

* * * * *